(12) United States Patent
Ramadass et al.

(10) Patent No.: US 11,996,254 B2
(45) Date of Patent: *May 28, 2024

(54) ACTIVE METAL FUSES FOR DC-EOS AND SURGE PROTECTION

(71) Applicant: Texas Instruments Incorporated, Dallas, TX (US)

(72) Inventors: Yogesh K. Ramadass, San Jose, CA (US); Ujwal Radhakrishna, San Jose, CA (US); Vinod Kuniganahalli Rai, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,298

(22) Filed: Jul. 3, 2023

(65) Prior Publication Data

US 2023/0343539 A1 Oct. 26, 2023

Related U.S. Application Data

(62) Division of application No. 17/490,157, filed on Sep. 30, 2021, now Pat. No. 11,721,510.

(51) Int. Cl.
*H01H 85/048* (2006.01)
*H01H 85/00* (2006.01)
*H01H 85/02* (2006.01)
*H02H 9/04* (2006.01)

(52) U.S. Cl.
CPC ...... *H01H 85/048* (2013.01); *H01H 85/0052* (2013.01); *H01H 85/0241* (2013.01); *H02H 9/042* (2013.01)

(58) Field of Classification Search
CPC ............. H01H 85/048; H01H 85/0052; H01H 85/0241; H02H 9/042
USPC ........................................................ 361/104
See application file for complete search history.

(56) References Cited

U.S. PATENT DOCUMENTS

2002/0027758 A1* 3/2002 Oglesbee ............ H02J 7/00304
361/104
2014/0266564 A1* 9/2014 Enriquez .............. H01H 85/175
337/295

FOREIGN PATENT DOCUMENTS

| DE | 4433503 A1 * | 3/1995 | ........... H01G 9/0003 |
| JP | 2002017040 A | 1/2002 | |
| JP | 2012038638 A * | 2/2012 | |
| JP | 2012038638 A | 2/2012 | |
| WO | WO2014175379 A1 | 10/2014 | |

OTHER PUBLICATIONS

Machine translation of Miyawaki Japanese Patent Document JP 2012-038638 A Feb. 2012 (Year: 2012).*

(Continued)

*Primary Examiner* — Kevin J Comber
(74) *Attorney, Agent, or Firm* — Frank D. Cimino

(57) ABSTRACT

A method comprises: forming a first metallization layer on a semiconductor die, the first metallization layer including a metal fuse; and forming a second metallization layer on the first metallization layer, in which the second metallization layer includes a thermal conductor spaced from the metal fuse, and the first metallization layer is between the second metallization layer and the semiconductor die.

15 Claims, 45 Drawing Sheets

(56) References Cited

OTHER PUBLICATIONS

Machine translation of Kuriyama German Patent Document DE 4433503 A1 Mar. 1995 (Year: 1995).*
Machine translation of Dexerials Corp International Patent Document WO2014175379 A1 Oct. 2014 (Year: 2014).
Machine translation of Kyocera Corp Japanese Patent Document JP2012038638 A Feb. 2012 (Year: 2012).
Machine translation of Matsushita Electric Ind Co Ltd Japanese Patent Document JP2002017040 A Jan. 2002 (Year: 2002).
"TPS2663x 60-V, 6-A Power Limiting, Surge Protection Industrial eFuse", Texas Instruments product data sheet SLVSE94E, Sep. 2018, revised Mar. 2020.

* cited by examiner

ACTIVE METAL FUSES FOR DC-EOS AND SURGE PROTECTION

CROSS-REFERENCE TO RELATED APPLICATIONS

The present application is a divisional of U.S. patent application Ser. No. 17/490,157, which was filed Sep. 30, 2021, is titled "ACTIVE METAL FUSES FOR DC-EOS AND SURGE PROTECTION," and is hereby incorporated herein by reference in its entirety.

BACKGROUND

Electronic devices and circuits are often subjected to electrical stress events, including DC electrical over-stress (DC-EOS) events. Protective circuitry, such as fuses, can interrupt current flow to a protected device or circuit in response to the level of current flow. Fuse performance can be characterized in terms of DC blow out current (IDC, BO) as well as current squared-time ($I^2t$) ratings, but passive fuses optimized or designed for one of these specifications often cannot meet the other. System protection can be provided by separately optimized surge protectors and fuses connected in series, but this increases cost and circuit area.

SUMMARY

In one aspect, an electronic device includes an input, an output, a metal fuse, and a thermal conductor. The metal fuse has a first end and a second end. The first end of the metal fuse is coupled to the input, and the second end of the metal fuse is coupled to the output. The thermal conductor is spaced from the metal fuse and is thermally coupled to the metal fuse.

In another aspect, an electronic device includes an input, an output, a metal fuse, a resistor, and a heat control transistor. The metal fuse has a first end and a second end. The first end of the metal fuse is coupled to the input, and the second end of the metal fuse coupled to the output. The resistor has a first terminal and a second terminal. The first terminal of the resistor is coupled to the second end of the metal fuse, and the resistor is thermally coupled to the metal fuse. The heat control transistor has a first terminal and a second terminal. The first terminal of the heat control transistor is coupled to the second terminal of the resistor. The second terminal of the heat control transistor is coupled to a reference terminal of the electronic device.

In another aspect, an electronic device includes an input, an output, a metal fuse, a resistor, a heat control transistor, and a heat controller. The metal fuse is coupled between the input and the output. The resistor is coupled between the metal fuse and the heat control transistor. The heat control transistor is coupled between the resistor and a reference terminal of the electronic device. The heat controller is configured to control a heater current of the heat control transistor.

In yet another aspect, a system includes an electronic fuse device and a protected integrated circuit (IC). The electronic fuse device includes an input, an output coupled to the protected IC, a metal fuse, a resistor, a heat control transistor, and a heat controller. The metal fuse is coupled between the input and the output. The resistor is coupled between the metal fuse and the heat control transistor; the heat control transistor coupled between the resistor and a reference terminal of the electronic fuse device. The heat controller is configured to control a heater current of the heat control transistor.

DETAILED DESCRIPTION

Figure 1:
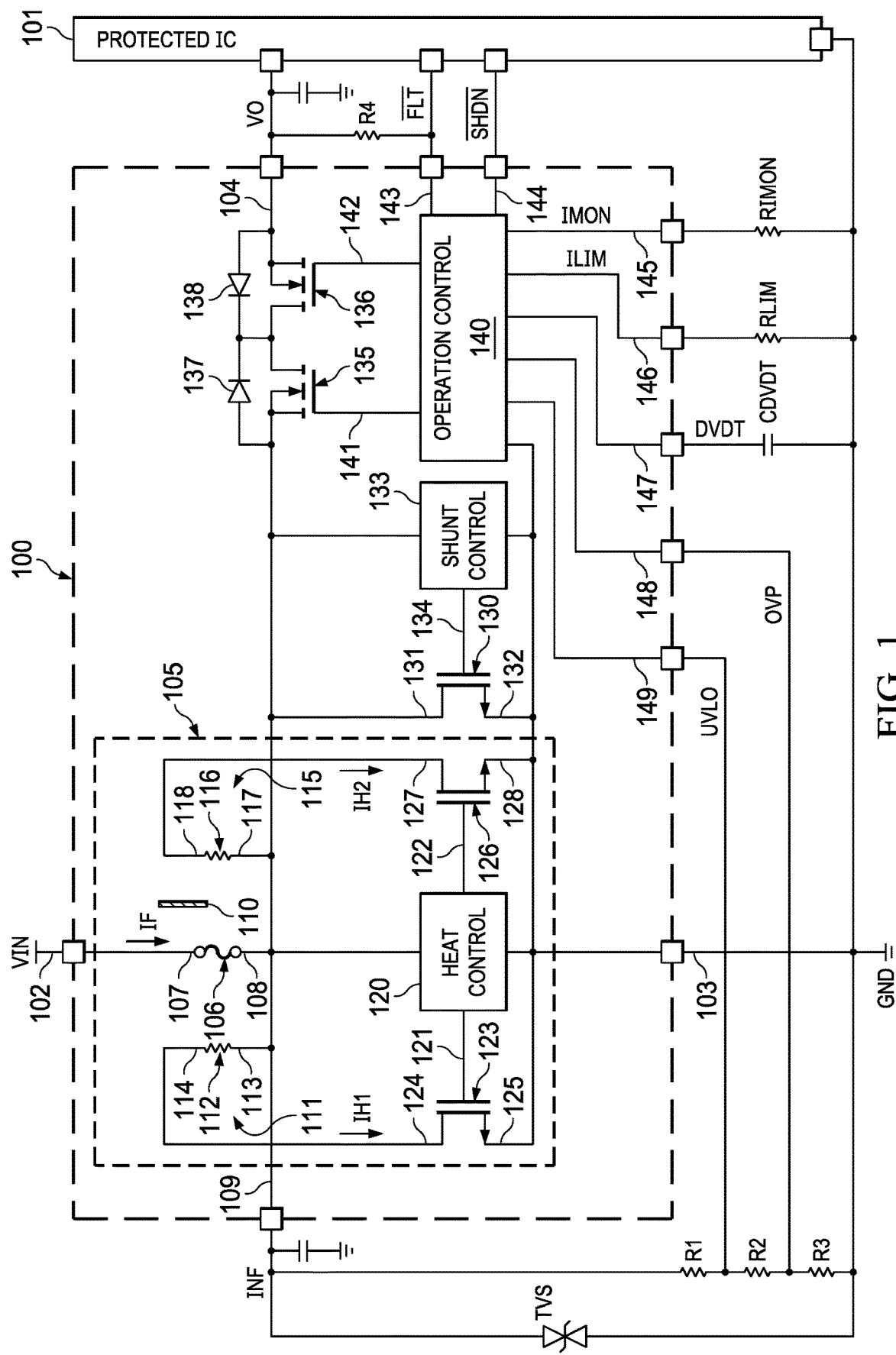
FIG. 1 is a schematic diagram of an integrated power limiting, surge protection electronic device with integrated shutdown field effect transistors (FETs), a controlled shunt FET, and a fuse circuit having a metal fuse, a thermal conductor, and side and upper active heaters proximate the metal fuse.

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled to a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

Referring initially to FIGS. 1, 1A, 1B, and 1C, FIG. 1 shows a system with an electronic device 100, also referred to as an electronic fuse device, which includes integrated power limiting and surge protection. The electronic device 100 provides electronic fuse (efuse) protection for a protected integrated circuit (IC) 101 to accommodate potentially length DC-EOS events with slow blow-out (BO) performance, as well as surge event protection to survive high current, short duration surge events. The electronic device 100 is an integrated circuit having an internal semiconductor die and a molded or ceramic package structure (not shown in FIG. 1). The electronic device 100 also includes externally accessible conductive terminals which can be soldered to a host printed circuit board (PCB, not shown) along with other components, such as the illustrated protected IC 101. A multilevel metallization structure of the semiconductor die has conductive features in one or more levels thereof to provide a metal fuse as well as a conductor that is thermally coupled to the metal fuse to provide a thermal capacitance with respect to the temperature of the metal fuse, as well as one or more heating resistors thermally coupled to the metal fuse to facilitate tailored balancing of the surge and DC-EOS protection parameters, including the DC blow out current (IDC, BO) and the $I^2t$ ratings for sustaining transients.

The electronic device includes an input 102 adapted to be coupled (e.g., by host PCB traces) to a power supply to receive an input voltage signal VIN, for example, a positive voltage with respect to a ground reference GND. The electronic device 100 includes a terminal for connecting the ground reference of the host PCB to a reference node 103 of the electronic device 103. The example electronic device 100 has an output 104 adapted to be coupled to a supply input of the protected IC 101 to supply an output voltage signal VO to power the protected IC 101.

The electronic device 100 includes a fuse circuit 105. The fuse circuit 105 in this example includes a metal fuse 106 having a first end 107 and a second end 108. The metal fuse 106 is formed as a metal structure in the multilevel metallization structure of the semiconductor die of the electronic device 100. The metal fuse 106 is coupled between the input 102 and the output 104 and operates to conduct a fuse current IF. The first end 107 of the metal fuse 106 is coupled to the input 102. The second end 108 of the metal fuse 106 is coupled to the output 104. In one example, the second end 108 of the metal fuse 106 is directly coupled to the output 104. In the illustrated example, the second end 108 of the metal fuse 106 is coupled to the output 104 through back-to-back transistors and associated diodes described further below. The second end 108 of the metal fuse 106 is coupled to a node 109 of the electronic device 100. The node 109 is coupled to a terminal of the electronic device 100 to provide a voltage signal INF to external circuits that corresponds the input voltage signal VIN minus a voltage of the metal fuse 106. The system in FIG. 1 includes a transient voltage suppressor TVS coupled between the node 109 and the ground reference GND.

The fuse circuit 105 also includes a thermal conductor 110 formed as a metal structure in the multilevel metallization structure of the semiconductor die of the electronic device 100. In one example, the thermal conductor 110 is formed as a thick metal cap above at least a portion of the metal fuse 106 in the electronic device 100. The thermal conductor 110 is spaced apart from the metal fuse 106 and is electrically isolated from the metal fuse 106. The thermal conductor 110 is thermally coupled to the metal fuse 106. The thermal coupling of the thermal conductor 110 to the metal fuse 106, as used herein, means that the thermal conductor 110 is located proximate the metal fuse 106 such that the thermal conductor 110 provides additional thermal capacitance with respect to the temperature of the metal fuse 106.

In operation, the thermal coupling of the thermal conductor 110 to the metal fuse 106 dampens temperature changes of the metal fuse 106, for example, in response to increased fuse current IF flowing in the metal fuse 106. The increased thermal capacitance increases the $I^2t$ capacity of the fuse circuit 105, for example, to survive higher amplitude current surges, for example, as tested per the international electrotechnical commission's international standard on surge immunity IEC61000-4-5 standard for surges caused by external shorting of the transient voltage suppressor TVS. The additional thermal capacitance provided by the thermal coupling of the thermal conductor 110 to the metal fuse 106 also increases the DC blow-out current IDC, BO of the fuse circuit 105.

The electronic device 100 also includes a first heater 111. The first heater 111 includes a resistor 112. The resistor 112 has a first terminal 113 and a second terminal 114. The first terminal 113 of the resistor 112 is coupled to the second end 108 of the metal fuse 106. The resistor 112 thermally coupled to the metal fuse 106. The thermal coupling of the resistor 112 to the metal fuse 106, as used herein, means that the resistor 112 is located proximate the metal fuse 106 such that a threshold amount of a first heater current IH1 flowing through the resistor 112 increases the temperature of the metal fuse 106 and a lower or zero first heater current IH1 does not increase the fuse temperature, and the spatial proximity of the resistor 112 increases the thermal capacitance with respect to the temperature of the metal fuse 106. For example, the thermal coupling of the resistor 112 to the metal fuse 106 dampens temperature changes of the metal fuse 106, in addition to any heating effect of the flow of the first heater current IH1 through the resistor 112.

The electronic device 100 in FIG. 1 also includes a second heater 115. The second heater 115 includes a second resistor 116 having a first terminal 117 and a second terminal 118. The first terminal 117 of the second resistor 116 is coupled to the second end 108 of the metal fuse 106. The second resistor 116 is thermally coupled to the metal fuse 106. The thermal coupling of the second resistor 116 to the metal fuse 106, as used herein, means that the second resistor 116 is located proximate the metal fuse 106 such that a threshold amount of a second heater current IH2 flowing through the second resistor 116 increases the temperature of the metal fuse 106 and a lower or zero second heater current IH2 does not increase the fuse temperature, and the spatial proximity of the second resistor 116 increases the thermal capacitance with respect to the temperature of the metal fuse 106. For example, the thermal coupling of the second resistor 116 to the metal fuse 106 dampens temperature changes of the metal fuse 106, in addition to any heating effect of the flow of the second heater current IH2 through the second resistor 116.

The electronic device 100 also includes a heat controller 120 having a first output 121 and a second output 122. The heat controller 120 is a circuit having electronic components, such as transistors, resistors, capacitors, etc., configured to perform the functions described herein, and the heat controller 120 is configurable or programmable in certain implementations. The heat controller 120 is coupled to the node 109 of the electronic device 100. The electronic device 100 in this example includes a heat control transistor 123 coupled to the heat controller 120 and the resistor 112. The heat controller 120 is configured to control the first heater current IH2 by controlling the heat control transistor 123. The heat control transistor 123 has a first terminal 124, a second terminal 125, and a control terminal coupled to the first output 121 of the heat controller 120. In one example, the heat control transistor 123 is a field effect transistor (FET), the first terminal 124 is a drain, the second terminal 125 is a source, and the control terminal is a gate. The heat controller 120 in this example is configured to generate a gate control signal at the first output 121 to control the heat control transistor 123 and to control the first heater current IH1 flowing through the resistor 112. As shown in FIG. 1, the first terminal 124 of the heat control transistor 123 is coupled to the second terminal 114 of the resistor 112, and the second terminal 125 of the heat control transistor 123 is coupled to the reference terminal 103 of the electronic device 100.

The electronic device 100 in this example also includes a second heat control transistor 126 coupled to the heat controller 120 and the second resistor 116. The heat controller 120 is configured to control the second heater current IH2 by controlling the second heat control transistor 126. The second heat control transistor 126 has a first terminal 127, a second terminal 128, and a control terminal coupled to the second output 122 of the heat controller 120. In one example, the second heat control transistor 126 is a field effect transistor, the first terminal 127 is a drain, the second terminal 128 is a source, and the control terminal is a gate. The heat controller 120 in this example is configured to generate a second gate control signal at the first output 121 to control the second heat control transistor 126 and to control the second heater current IH2 flowing through the second resistor 116. As shown in FIG. 1, the first terminal 127 of the second heat control transistor 126 is coupled to the second terminal 118 of the second resistor 116, and the second terminal 128 of the second heat control transistor 126 is coupled to the reference terminal 103 of the electronic device 100.

The electronic device 100 in this example also includes shunt circuitry configured to selectively shunt or redirect some or all of the fuse current IF to the reference terminal 103 of the electronic device 100, for example, to protect the protected IC 101 from excessive current flow at the output 104. The shunt circuitry in one example includes a shunt transistor 130 (e.g., FET) having a first terminal (e.g., drain) 131 coupled to the node 109 of the electronic device 100, a second terminal (e.g., source) coupled to the reference terminal 103 of the electronic device 100, and a control terminal (e.g., gate). The shunt circuitry also includes a shunt controller 133 having an output 134 couped to the control terminal of the shunt transistor 130. The shunt controller 133 is a circuit having electronic components, such as transistors, resistors, capacitors, etc., configured to perform the functions described herein, and the shunt controller 133 is configurable or programmable in certain implementations. In another example, the shunt circuitry is omitted.

The electronic device 100 includes transistors 135 and 136 (e.g., shutdown transistors) coupled back-to-back between the metal fuse 106 and the output 104. The electronic device also includes diodes 137 and 138 coupled in parallel with the respective transistors 135 and 136 between the metal fuse 106 and the output 104. The transistors 135 and 136 in one example are n-channel FETs controlled by an operation controller 140 of the electronic device 100. A source of the transistor 135 is coupled to the second terminal 108 of the fuse 106. A drain of the transistor 135 is coupled to a drain of the transistor 136. A source of the transistor 136 is coupled to the output 104. In this configuration, the second terminal 108 of the fuse 106 is coupled through the transistors 135 and 136 to the output 104. An anode of the diode 137 is coupled to the source of the transistor 135, and a cathode of the diode 137 is coupled to the drains of the transistors 135 and 136. An anode of the diode 138 is coupled to the output 104, and a cathode of the diode 138 is coupled to the drains of the transistors 135 and 136.

The operation controller 140 is a circuit having electronic components, such as transistors, resistors, capacitors, etc., configured to perform the functions described herein, and the operation controller 140 is configurable or programmable in certain implementations. The operation controller 140 has a first control output 141 and a second control output 142 coupled to control (e.g., gate) terminals of the respective transistors 135 and 136. The operation controller 140 is configured in one example to selectively turn the transistors 135 and 136 on to allow current flow from the second terminal 108 of the fuse 106 (e.g., from the node 109) to the output 104 during powered operation of the electronic device 100.

In one example, the operation controller 140 is configured to selectively turn one or both of the transistors 135 and 136 off in response to certain circuit conditions, such as receipt by the operation controller 140 of a shutdown command or signal from the protected IC 101. The electronic device 100 in this example includes terminals coupled to a signal output 143 and a signal input 144 of the operation controller 140. These terminals are coupled to corresponding signal outputs of the protected IC 101 in the system of FIG. 1. The operation controller 140 is configured to provide a fault event indicator signal (e.g., labeled FLT') as an active low voltage signal at the signal output 143 in response to detection of a fault event associated with the input voltage signal VIN or other detected faults in the system, such as an under-voltage, an over-voltage, excessive current, etc. A pullup resistor R4 is coupled between the signal output 143 and the output 104. The operation controller 140 is configured to monitor an active low shutdown signal (e.g., labeled SHDN') at the signal input 144 from the protected IC 101, and in response to receiving an active shutdown signal, the operation controller 140 puts the electronic device 100 into a low-power shutdown mode. In response to receiving a toggle signal at the signal input 144, the operation controller 140 resets the electronic device 100 where the electronic device 100 was previously latched in the shutdown mode due to a previous detected fault condition.

The system in FIG. 1 also includes passive circuit components coupled to respective terminals and associated signal inputs 146, 147, 148, and 149, and a signal output 145 of the operation controller 140. A series resistor circuit including a resistor R1, a resistor R2, and a resistor R3 is coupled in parallel with the transient voltage suppressor TVS between the second terminal 108 of the fuse 106 and the reference node 103. A node that joins the resistors R1 and R2 provides an undervoltage lockout voltage signal (e.g., labeled UVLO) to the signal input 149 of the operation controller 140. A node that joins the resistors R2 and R3 provides an overvoltage protection signal to the signal input 148 of the operation controller 140. A capacitor (e.g., labeled CDVDT) is coupled between the reference node 103 and the signal input 147 of the operation controller 140 to provide a DVDT signal monitored by the operation controller 140. The resistor RLIM sets an overload and short circuit current limit implemented by the operation controller 140. A current limit detection resistor RLIM is coupled between the reference node 103 and the signal input 146 of the operation controller 140, to provide a current limit monitoring signal ILIM that is monitored by the operation controller 140.

The operation controller 140 provides a current monitor output signal IMON at the signal output 145 to a resistor RIMON that is coupled between the signal output 145 and the reference node 103. The operation controller 140 provides (e.g., sources) a scaled down ratio of current through the shutdown FETs 135 and 136 is the current monitor output signal IMON, and the resistor RIMON provides a corresponding voltage signal. In one example, one or more of the heat controller 120, the shunt controller 133 and the operation controller 140 are integrated with one another. In this or another example, the operation controller 140 provides one or more control signals to one or both of the heat controller 120 and the shunt controller 133. In these or another example, the operation controller 140 receives one or more signals from one or both of the heat controller 120 and the shunt controller 133.

Figure 1A:
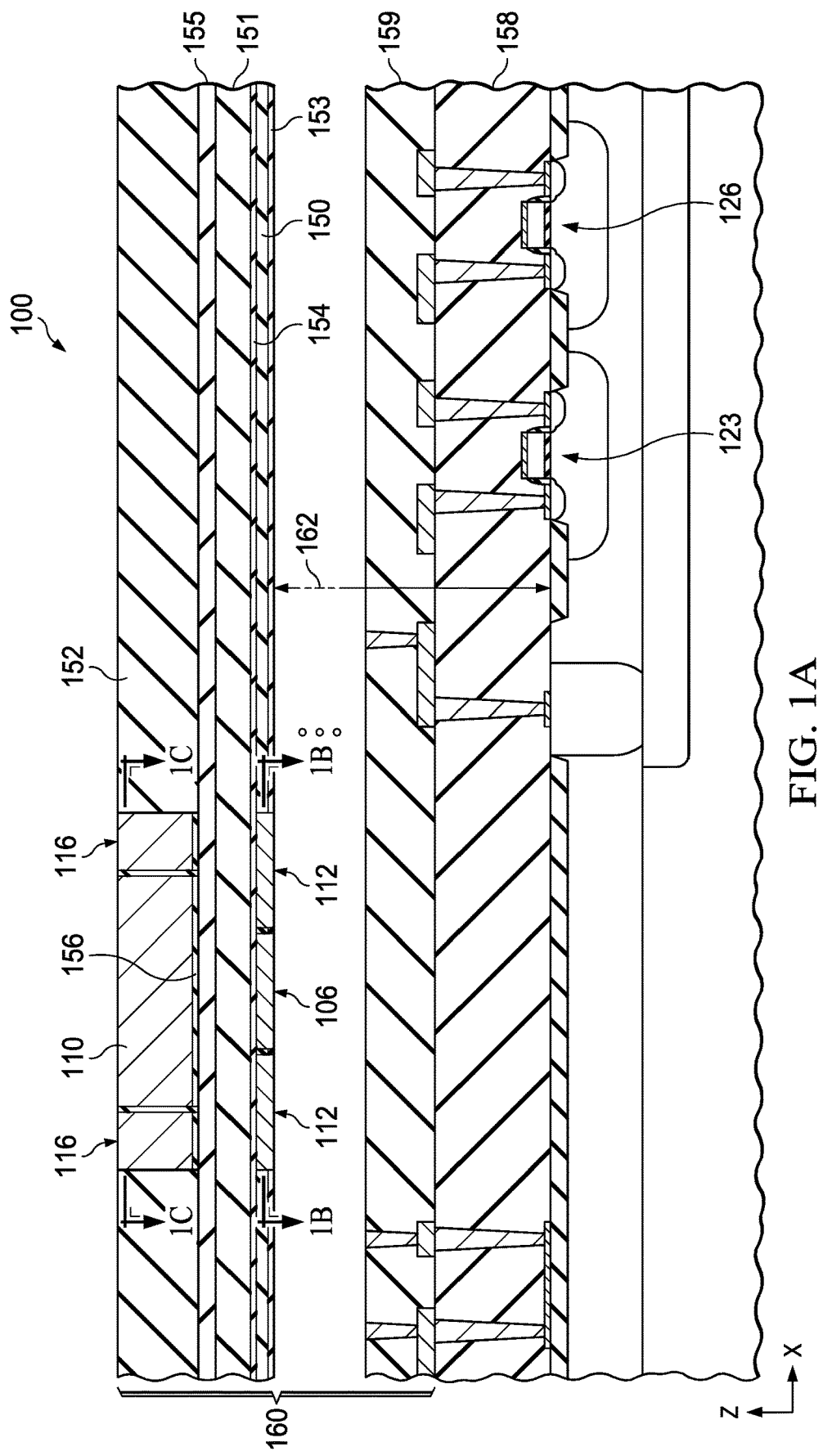
FIG. 1A is a partial sectional side elevation view of the electronic device of FIG. 1 taken along line 1A-1A of FIGS. 1B and 1C.
Figure 1B:
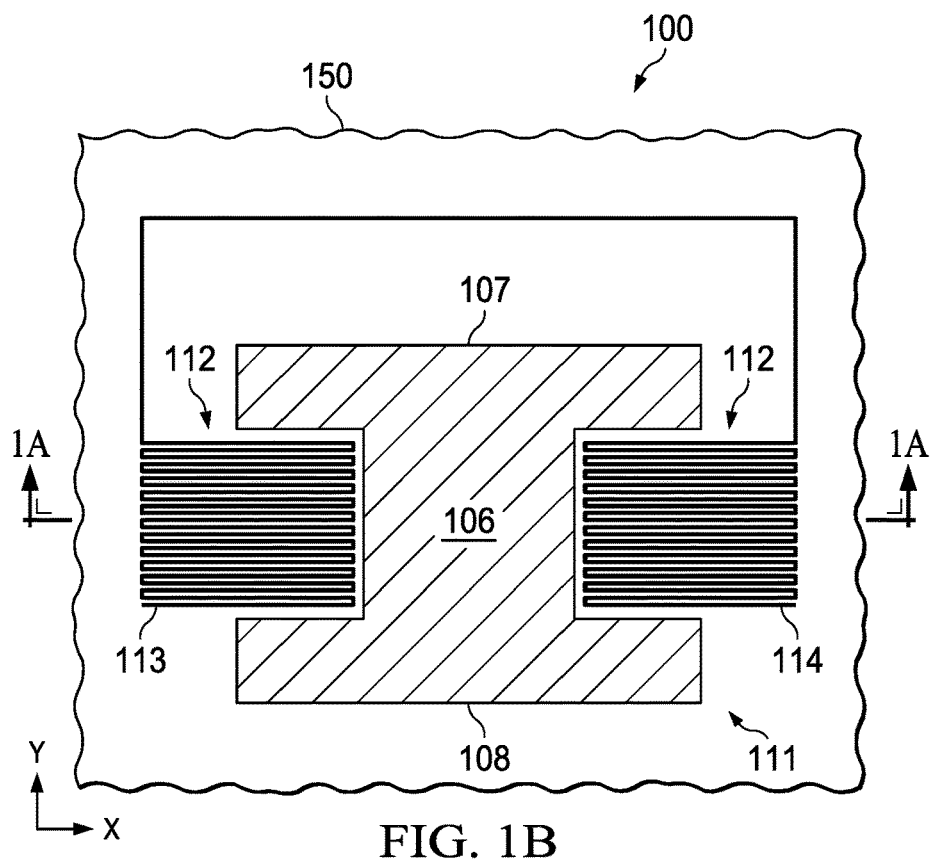
FIG. 1B is a partial sectional top plan view of the electronic device of FIG. 1 taken along line 1B-1B of FIG. 1A.
Figure 1C:
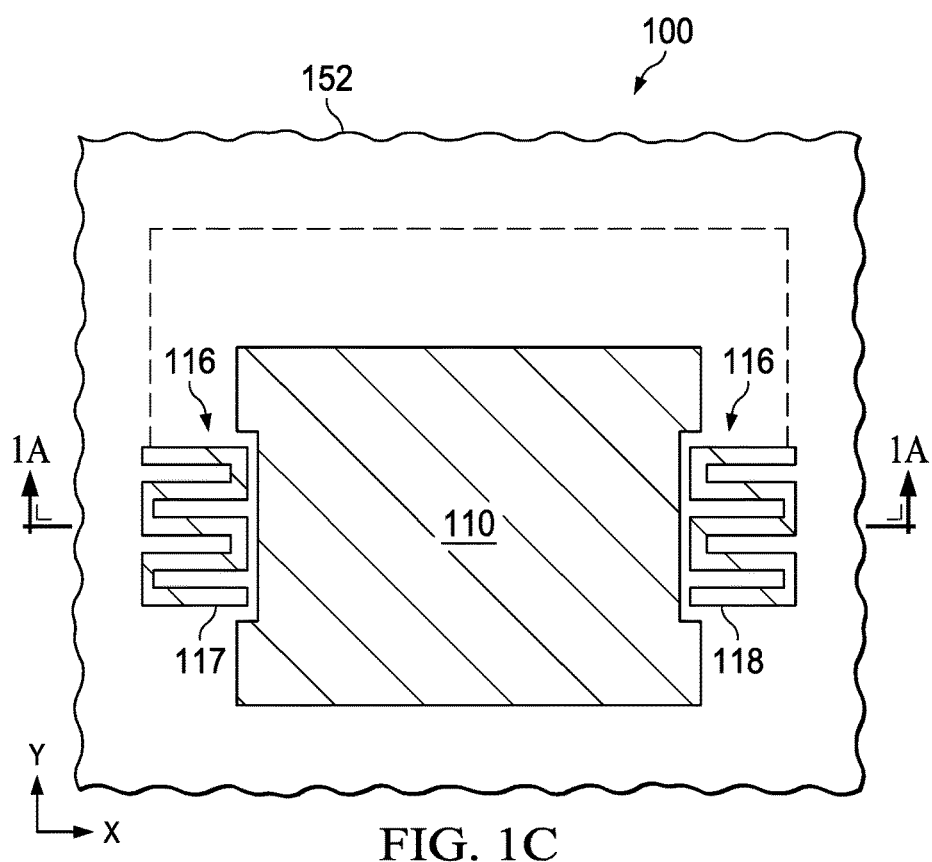
FIG. 1C is another partial sectional top plan view of the electronic device of FIG. 1 taken along line 1C-1C of FIG. 1A.

FIGS. 1A-1C show details of an example implementation in which the metal fuse 106, the thermal conductor 110, and the resistors 112 and 116 are integrated into a multilevel metallization structure of a semiconductor die in the electronic device 100. FIG. 1A shows a partial side view of the electronic device 100 taken along line 1A-1A of FIGS. 1B and 1C. FIG. 1B shows a partial top view of the electronic device 100 taken along line 1B-1B of FIG. 1A. FIG. 1C shows another partial top view of the electronic device 100 taken along line 1C-1C of FIG. 1A. The electronic device 100 includes electronic components, such as transistors, resistors, capacitors fabricated on or in a semiconductor structure of a starting wafer, which is subsequently separated or singulated into individual semiconductor dies that are separately packaged to produce integrated circuit products.

In this example, transistors (e.g., the example transistors 123 and 126) are fabricated on or in a semiconductor body, such as a silicon or silicon-on-insulator (SOI) wafer with or without a top epitaxial silicon upper layer, and with suitable wells, implanted regions, and field oxide or shallow trench isolation (STI) structures.

A multilevel metallization structure is formed on or over a top side of the wafer. FIG. 1A shows one example, in which the metal fuse 106, the thermal conductor 110, and the resistors 112 and 116 of the fuse circuit are formed as conductive metal features in two adjacent metallization levels. In the illustrated example, the metal fuse 106, the thermal conductor 110, and the resistors 112 and 116 are formed in the uppermost two levels of the structure. In other examples, the thermal conductor 110, and the resistors 112 and 116 of the fuse circuit are formed in a single level of a metallization structure, which need not be the uppermost level. In another implementation, the thermal conductor 110, and the resistors 112 and 116 of the fuse circuit are formed in two metallization levels that are not adjacent. In this or another example, the thermal conductor 110, and the resistors 112 and 116 of the fuse circuit are formed in two adjacent or non-adjacent levels that do not include the uppermost level of a multilevel metallization structure.

As shown in FIG. 1A, the multilevel metallization structure includes a first level 150 with conductive metal features (e.g., that are or include copper, aluminum, or other conductive metal having a thickness of approximately 3 µm) that form the metal fuse 106 and the resistor 112, as well as a dielectric material (e.g., silicon dioxide ($SiO_2$)). In one implementation, the first level 150 is formed using damascene fabrication processing steps. FIG. 1B shows a partial sectional top view of the first level 150 including the metal fuse 106 and the resistor 112. The metal fuse 106 in this example has an "I" shape, and the resistor 112 includes serpentine shaped terms that extend inward toward the narrower portions of the metal fuse 106 between the wider first and second ends 107 and 108 of the I-shaped metal fuse 106. The resistor 112 in this example includes multiple turns of a serpentine heating resistor shape on either side of the narrow body portion of the metal fuse 106 to selectively heat portions of the metal fuse 106 when current flows through the resistor 112. In other examples, the metal fuse 106 and/or the resistor 112 have different forms and shapes. Another dielectric layer 151 (e.g., $SiO_2$ with a thickness of approximately 1.8 µm) is formed above the first level 150.

A second level 152 has conductive metal features (e.g., that are or include copper, aluminum, or other conductive metal having a thickness of approximately 10 µm) that form the thermal conductor 110 and the second resistor 116, as well as a dielectric material (e.g., $SiO_2$) FIG. 1C shows a partial sectional top view of the second level 152 including the thermal conductor 110 and the second resistor 116. The thermal conductor 110 in this example has an "I" shape, and the second resistor 116 includes serpentine shaped terms that extend inward toward the narrower portions of the thermal conductor 110. In other examples, the thermal conductor 110 and/or the second resistor 116 have different forms and shapes.

In one implementation, the second level 152 is the uppermost metallization level as shown in FIG. 1A. The second level 152 in one example is covered with one or more overlying transition metal layers (not shown), such as a layer of nickel (Ni) having a thickness of approximately 3 µm formed on a top side of the second level 152, as well as a layer of palladium (Pd) having a thickness of approximately 0.3 µm formed over the nickel later. In one example, a silicon nitride (SiN) layer 153 having a thickness of approximately 0.16 μm extends under a portion of the dielectric material of the first level 150, and a second silicon nitride layer 154 having a thickness of approximately 0.16 μm extends between the first level 150 and the dielectric layer 151. A silicon nitride layer 155 extends between the dielectric layer 151 and the second level 152. This example also includes titanium tungsten (TiW) features having a thickness of approximately 0.3 μm underneath the conductive metal features that form the thermal conductor 110 and the second resistor 116 of the second level 152 for connection to tungsten vias (not shown) that extend between the first and second levels.

In the illustrated example, a pre-metal dielectric (PMD) layer 158 (e.g., SiO$_2$) extends on or over the top side of the isolation structures, transistors 123, 126 and the semiconductor die, and tungsten or other conductive contacts connect terminals of the transistors to and overlying first level of the metallization structure, which includes conductive trace features and conductive contacts in an inter-layer dielectric (ILD) layer 159 (e.g., SiO$_2$) One or more additional levels of the multilevel metallization structure are formed in a stacked arrangement between the ILD layer 159 and the silicon nitride layer 153, the details of which are not shown in FIG. 1A.

The ILD layer 159 and the first and second levels 150 and 152 in this example form a stacked multilevel metallization structure 160 of the semiconductor die of the electronic device 100. In other implementations, the multilevel metallization structure has more or fewer levels. The PMD layer 158, the ILD layer 159, and any intervening metallization levels between the ILD layer 159 and the silicon nitride layer 153 provide a gap distance 162 (e.g., approximately 6.4 μm) between the lower side of the metal fuse 106 and the top side of the semiconductor die. In another example, the multilevel metallization structure is fabricated to replace a portion of the dielectric layers 158 and 159 below all or a portion of the lower side of the metal fuse 106 to leave and airgap between the lower side of the metal fuse 106 and the top side of the semiconductor die. In one example, the air gap has a depth 162 (e.g., approximately 6.4 μm) along the Z direction in the drawings and has lateral widths along the X and Y directions of approximately 100 μm generally conforming to a 100 μm long and 100 μm wide metal fuse 106.

In one implementation, the electronic device 100 includes conductive features such as bond pads (not shown) extending on an upper side of the semiconductor die. One or more such bond pads are electrically connected to terminals (e.g., IC pins) of the electronic device 100 by wire bonding or other suitable electrical connection process and structure during device packaging. The bond pads operate as connection points for bond wires in the finished electronic device 100, as well as for test connections during wafer probe testing before the wafer is singulated into individual semiconductor dies.

In the example of FIGS. 1-1C, the first level 150 extends between the dielectric structure 158, 159 and the second level 152, the first level 150 includes the metal fuse 106 and the resistor 112, and the second level 152 includes the thermal conductor 110 and the second resistor 116. This configuration provides thermal coupling between the metal fuse 106 and the thermal conductor 110 for increased thermal capacitance to dampen changes in the temperature of the metal fuse 106. In addition, the metal fuse 106 is thermally coupled to the resistors 112 and 116, and the heat controller 120 and the transistors 123, 126 (e.g., FIG. 1) facilitate controlled heating of the metal fuse 106. This example combination of the thermal conductor 110 and the first and second resistors 112, 116 facilitate control of the performance of the metal fuse 106 during operation of the electronic device 100 with respect to DC blow out current (IDC, BO) and I$^2$t. In certain implementations, moreover, the operation controller 140 and/or the heat controller 120 provide dynamic control of the heater currents IH1 and IH2 such that the performance of the metal fuse 106 adapts to sensed operating conditions, such as voltage and current levels. Moreover, the heater currents IH1 and IH2 are configurable during manufacturing in certain implementations, for example, by programming the operation controller 140 and/or the heat controller 120 for a specific end-use application of the finished electronic device 100, thereby facilitating different electronic fuse performance depending on the configuration or programming. In one example, the heat controller 120 is configured to control the heater currents IH1 and IH2 of the respective heat control transistors 123 and 126 during operation of the electronic device 100.

Figure 2:
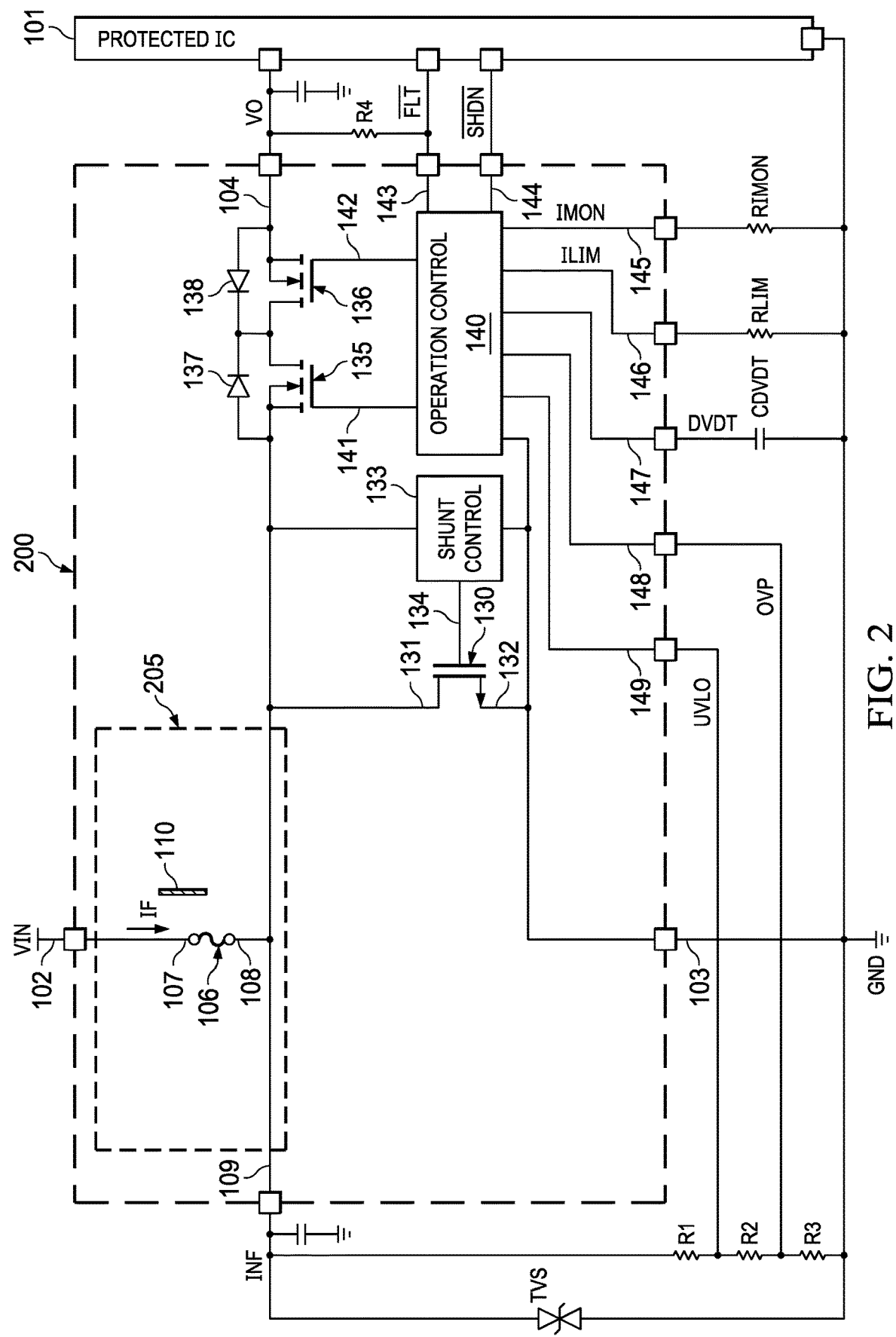
FIG. 2 is a schematic diagram of an integrated power limiting, surge protection electronic device with integrated shutdown field effect transistors, a controlled shunt FET, and a fuse circuit having a metal fuse and a thermal conductor.
Figure 2A:
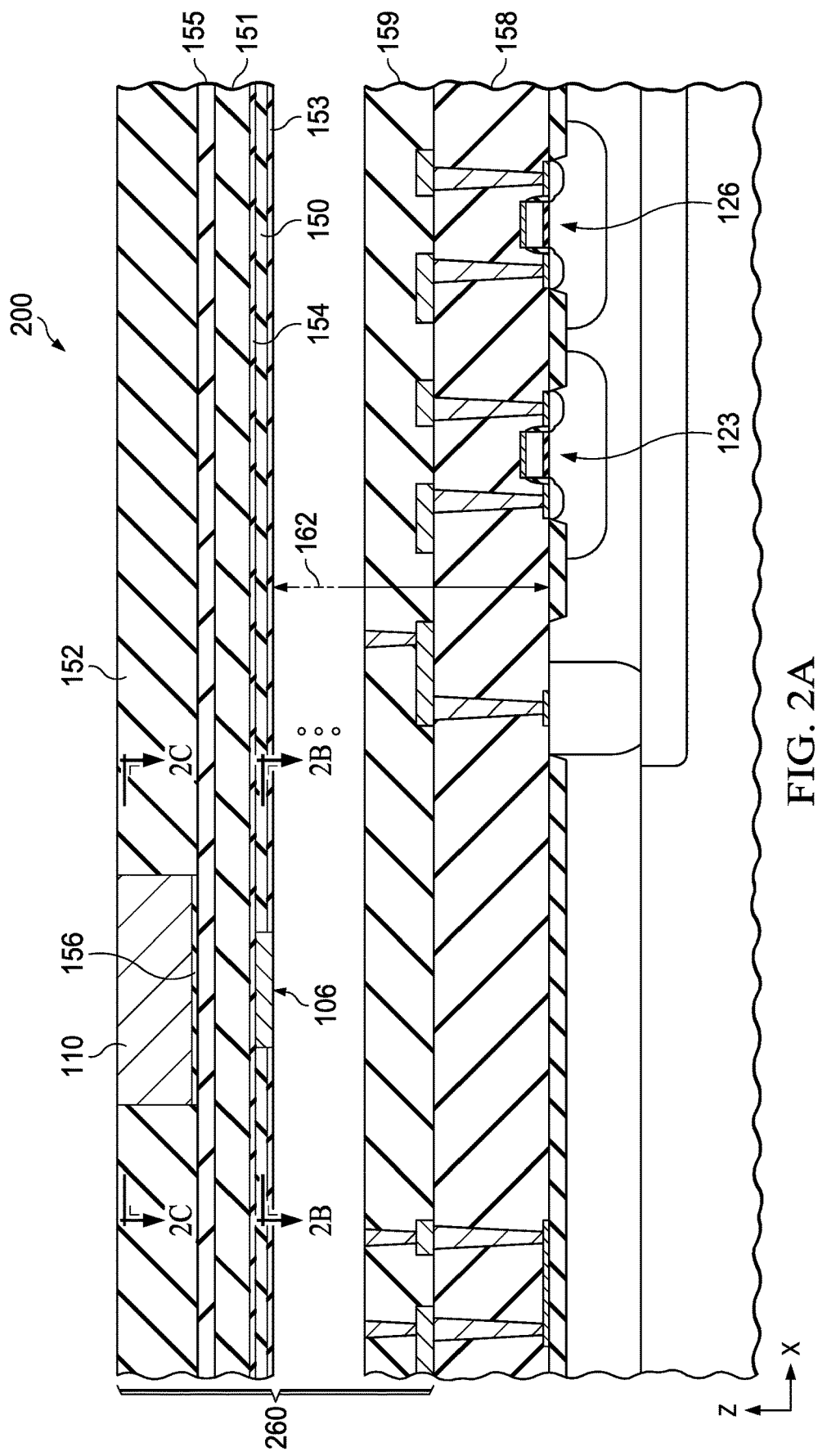
FIG. 2A is a partial sectional side elevation view of the electronic device of FIG. 2 taken along line 2A-2A of FIGS. 2B and 2C.
Figure 2B:
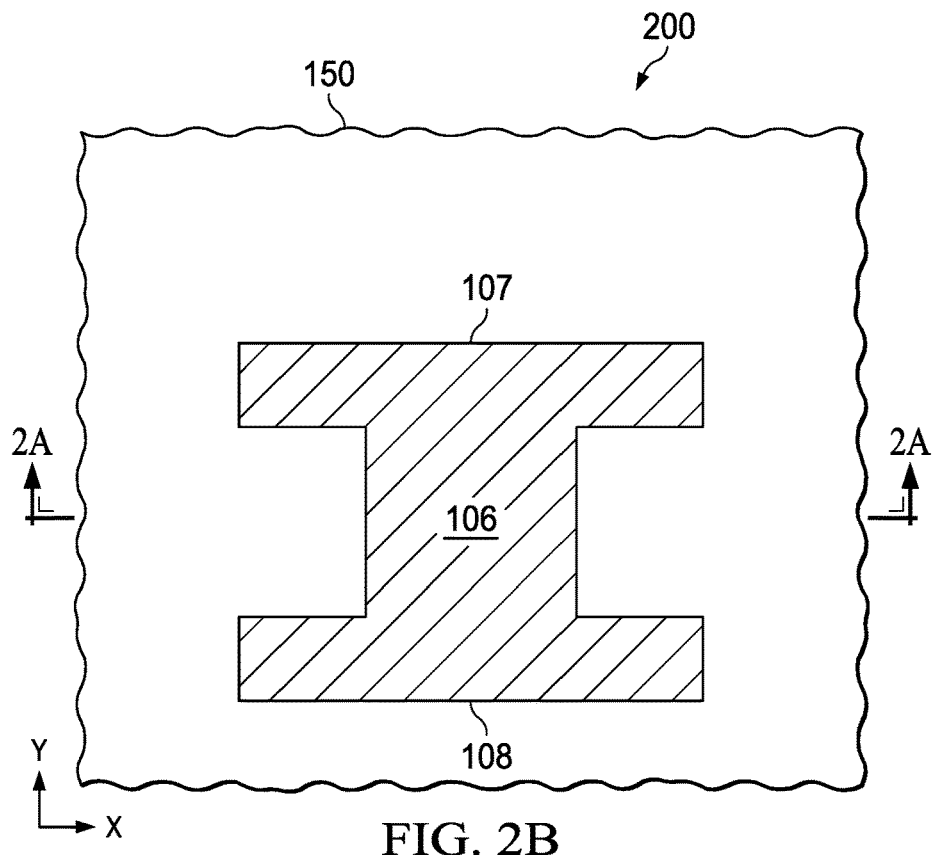
FIG. 2B is a partial sectional top plan view of the electronic device of FIG. 2 taken along line 2B-2B of FIG. 2A.
Figure 2C:
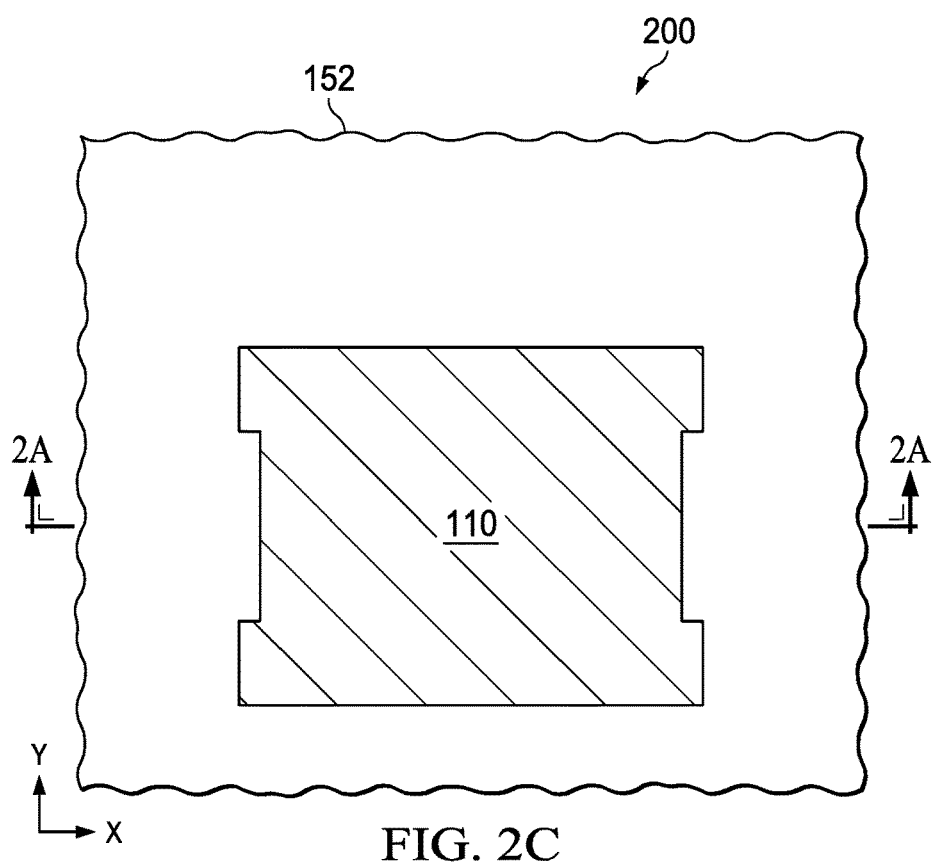
FIG. 2C is another partial sectional top plan view of the electronic device of FIG. 2 taken along line 2C-2C of FIG. 2A.

Referring now to FIGS. 2-2C, FIG. 2 shows another example integrated power limiting, surge protection electronic device 200 with integrated shutdown field effect transistors, a controlled shunt FET, and a fuse circuit having a metal fuse and a thermal conductor. FIG. 2A shows a partial side view of the electronic device 200 taken along line 2A-2A of FIGS. 2B and 2C. FIG. 2B shows a partial top view of the electronic device 200 taken along line 2B-2B of FIG. 2A. FIG. 2C shows another partial top view of the electronic device 200 taken along line 2C-2C of FIG. 2A. The electronic device 200 in this example includes similarly numbered components and structures as described above in connection with the electronic device 100 of FIGS. 1-1C. The electronic device 200 includes a fuse circuit 205 with the metal fuse 106 and the thermal conductor 110 as described above, but this example does not include thermally coupled resistors and heat control transistors. As shown in FIGS. 2A-2C, the electronic device 200 includes a multilevel metallization structure 260 having the metal fuse 106 in the first level 150, and the thermal conductor 110 in the second level 152.

Figure 3:
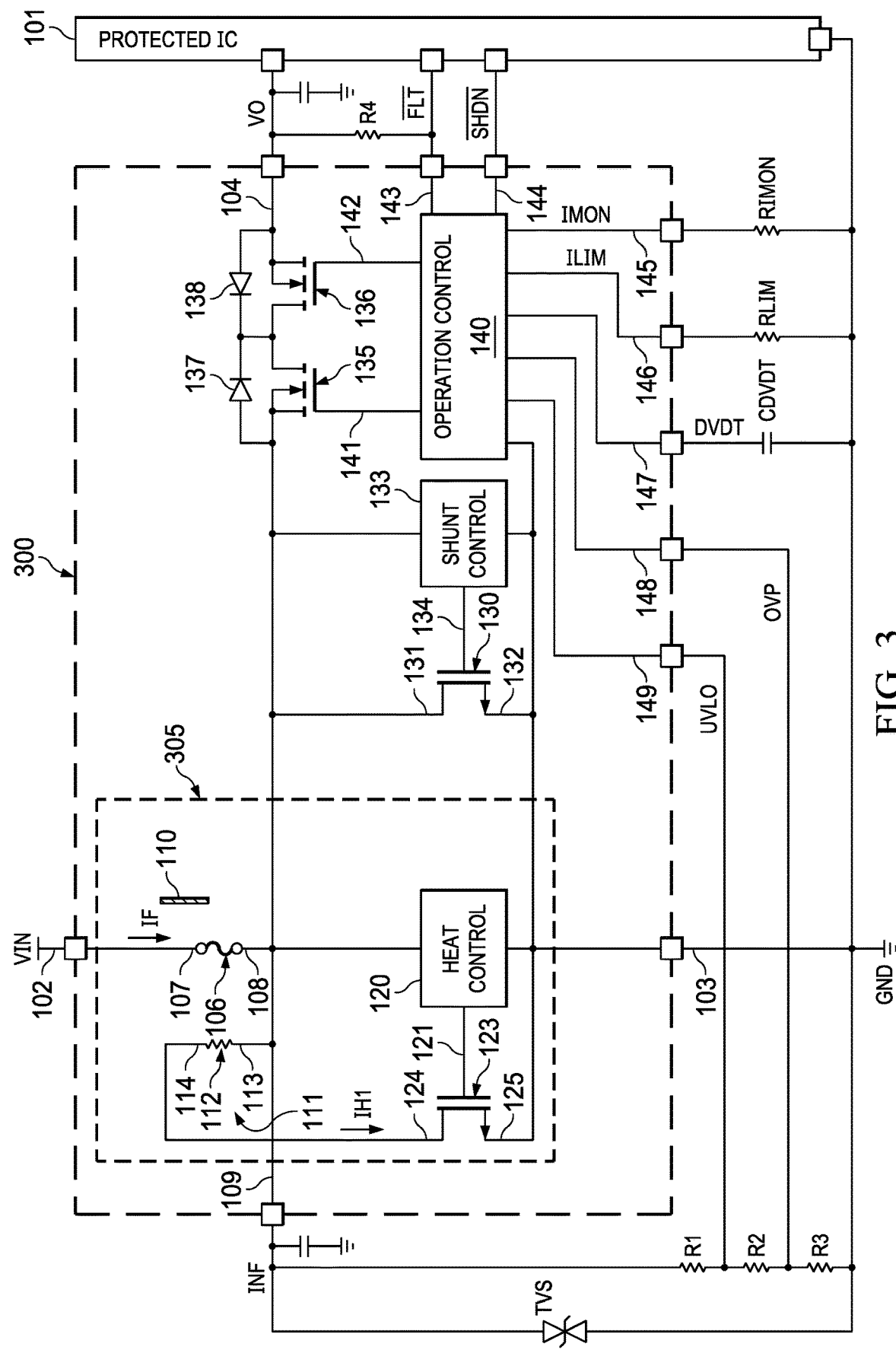
FIG. 3 is a schematic diagram of an integrated power limiting, surge protection electronic device with integrated shutdown field effect transistors, a controlled shunt FET, and a fuse circuit having a metal fuse, a thermal conductor, and a side heater proximate the metal fuse.
Figure 3A:
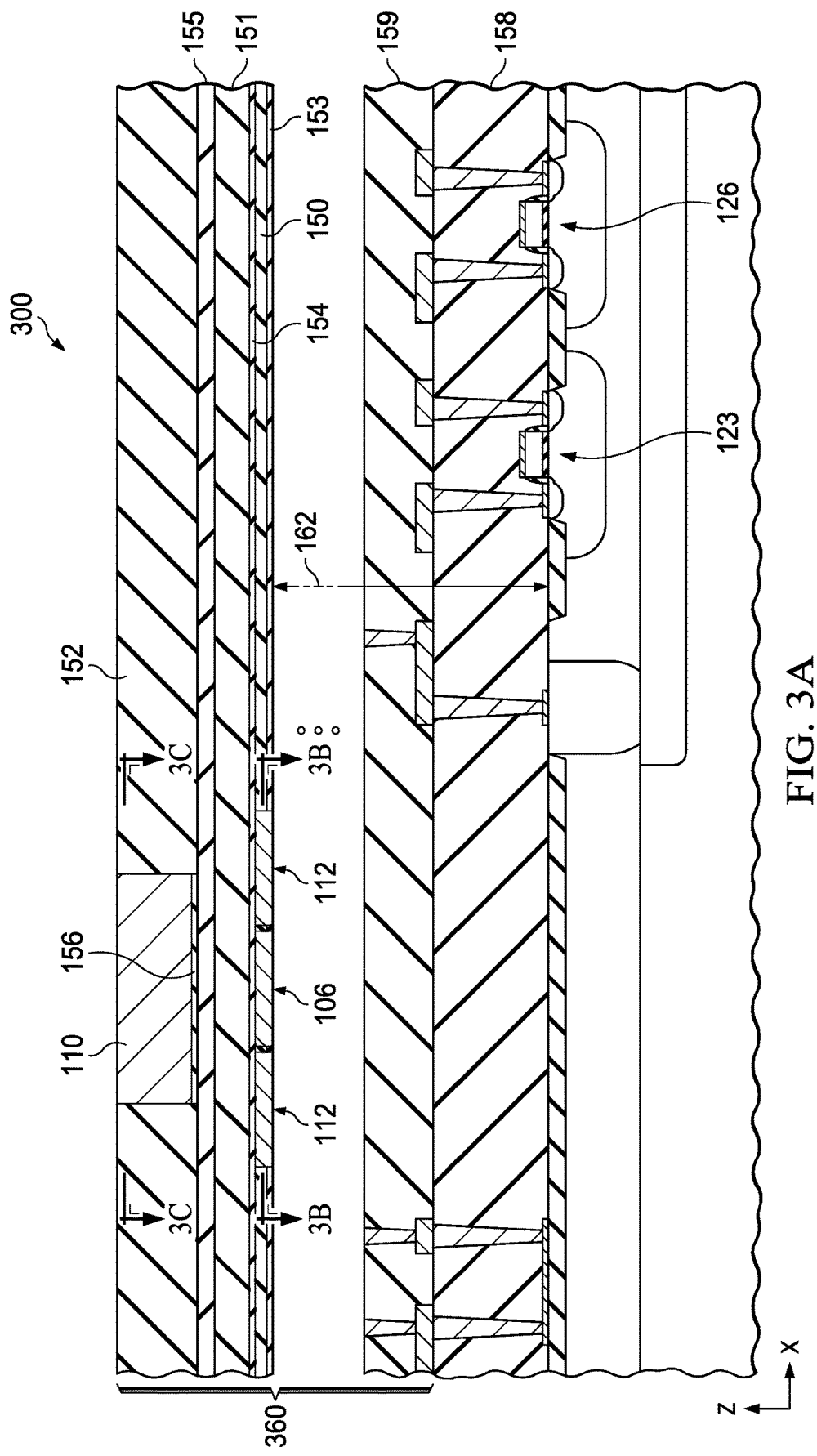
FIG. 3A is a partial sectional side elevation view of the electronic device of FIG. 3 taken along line 3A-3A of FIGS. 3B and 3C.
Figure 3B:
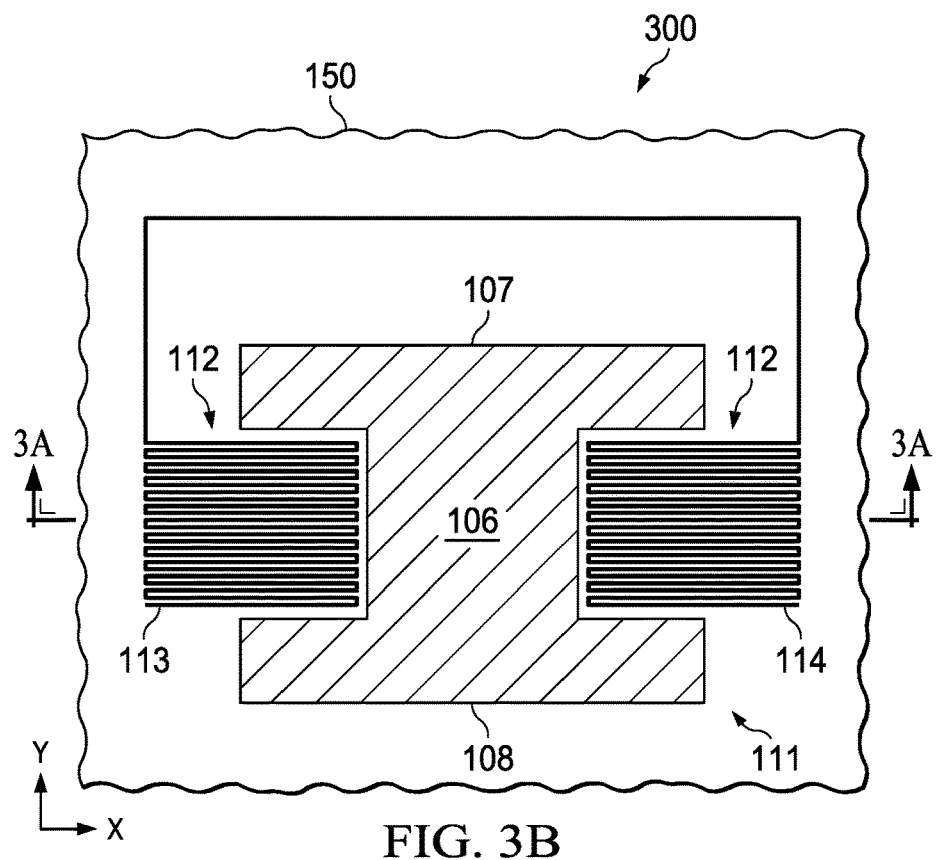
FIG. 3B is a partial sectional top plan view of the electronic device of FIG. 3 taken along line 3B-3B of FIG. 3A.
Figure 3C:
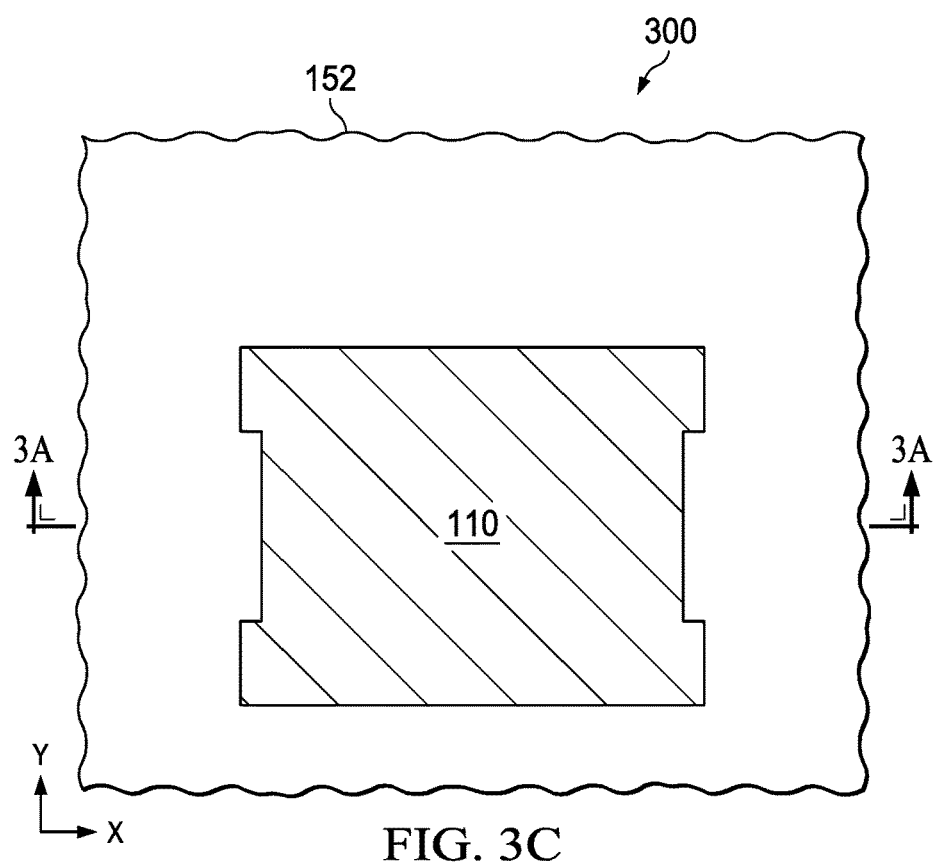
FIG. 3C is another partial sectional top plan view of the electronic device of FIG. 3 taken along line 3C-3C of FIG. 3A.

Referring now to FIGS. 3-3C, FIG. 3 shows another example integrated power limiting, surge protection electronic device 300 with integrated shutdown field effect transistors, a controlled shunt FET, and a fuse circuit having a metal fuse, a thermal conductor, and a side heater proximate the metal fuse. FIG. 3A shows a partial side view of the electronic device 300 taken along line 3A-3A of FIGS. 3B and 3C. FIG. 3B shows a partial top view of the electronic device 300 taken along line 3B-3B of FIG. 3A. FIG. 3C shows another partial top view of the electronic device 300 taken along line 3C-3C of FIG. 3A. The electronic device 300 in this example includes similarly numbered components and structures as described above in connection with the electronic device 100 of FIGS. 1-1C. The electronic device 300 includes a fuse circuit 305 with the metal fuse 106, the thermal conductor 110, the resistor 112, the controller 120 and the heat control transistor 123 as described above, but this example does not include the second resistor or the second heat control transistor. As shown in FIGS. 3A-3C, the electronic device 300 includes a multilevel metallization structure 360 having the metal fuse 106 and the resistor 112 in the first level 150, and the thermal conductor 110 in the second level 152.

Figure 4:
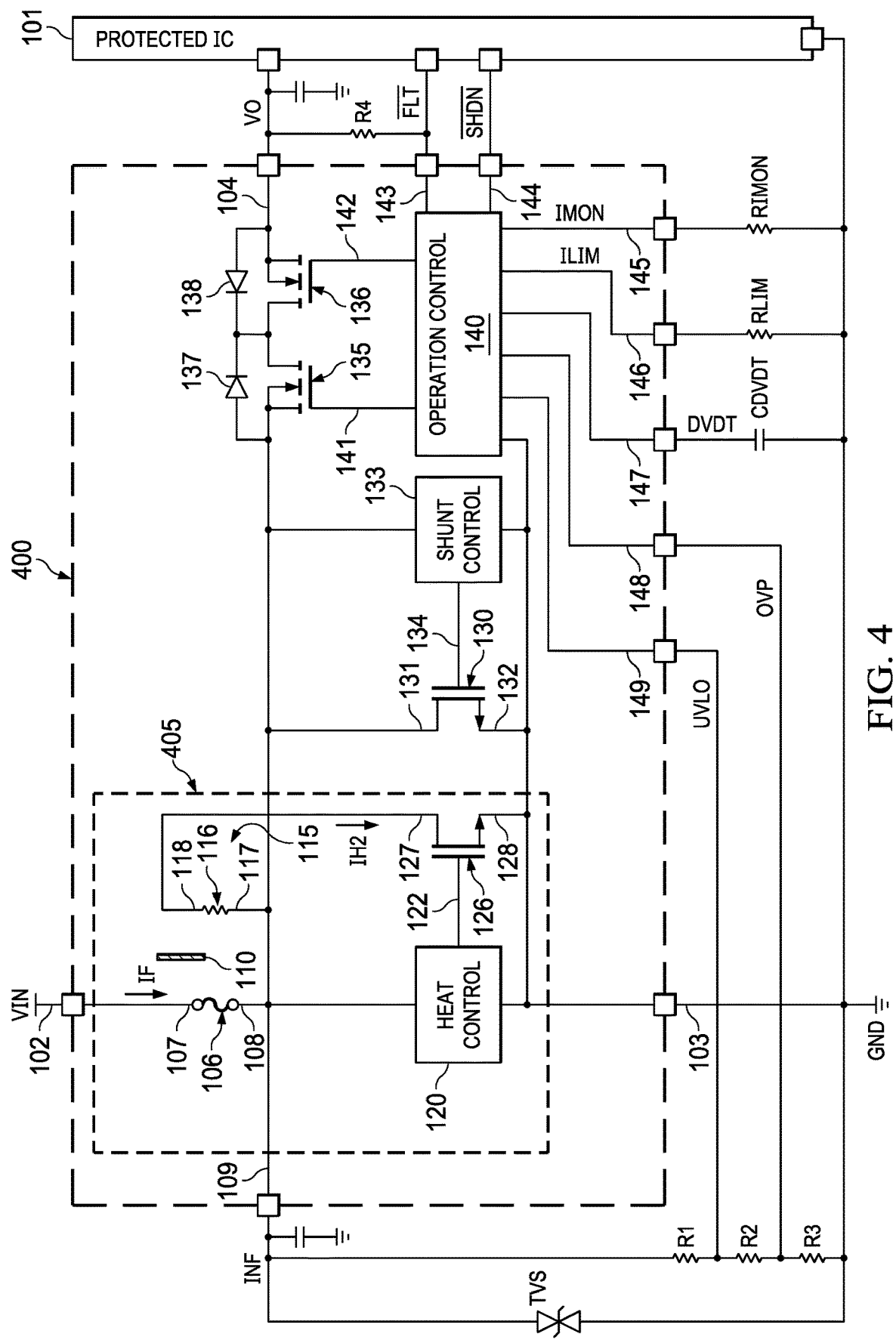
FIG. 4 is a schematic diagram of an integrated power limiting, surge protection electronic device with integrated shutdown field effect transistors, a controlled shunt FET, and a fuse circuit having a metal fuse, a thermal conductor, and an upper active heater proximate the metal fuse.
Figure 4A:
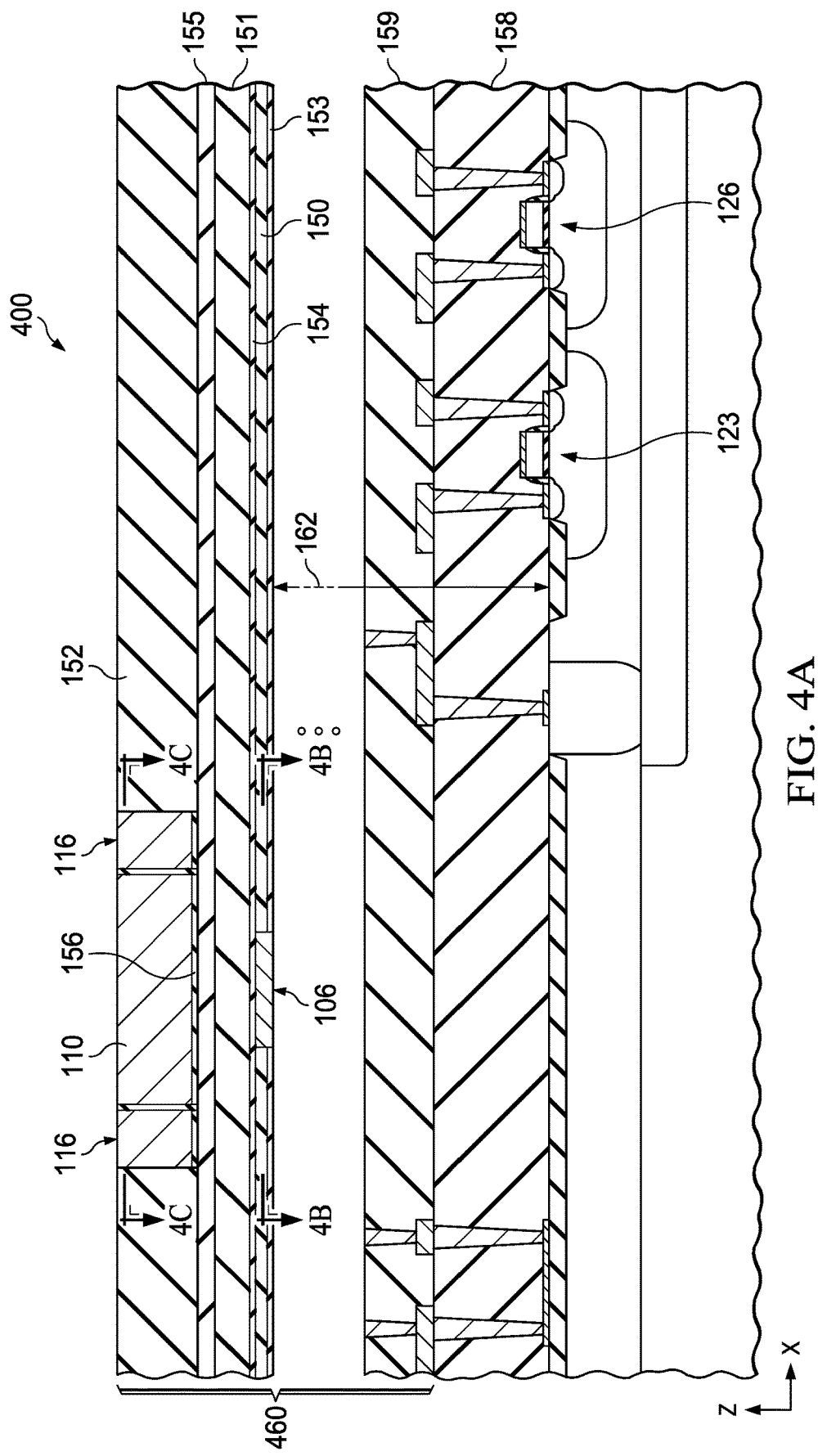
FIG. 4A is a partial sectional side elevation view of the electronic device of FIG. 4 taken along line 4A-4A of FIGS. 4B and 4C.
Figure 4B:
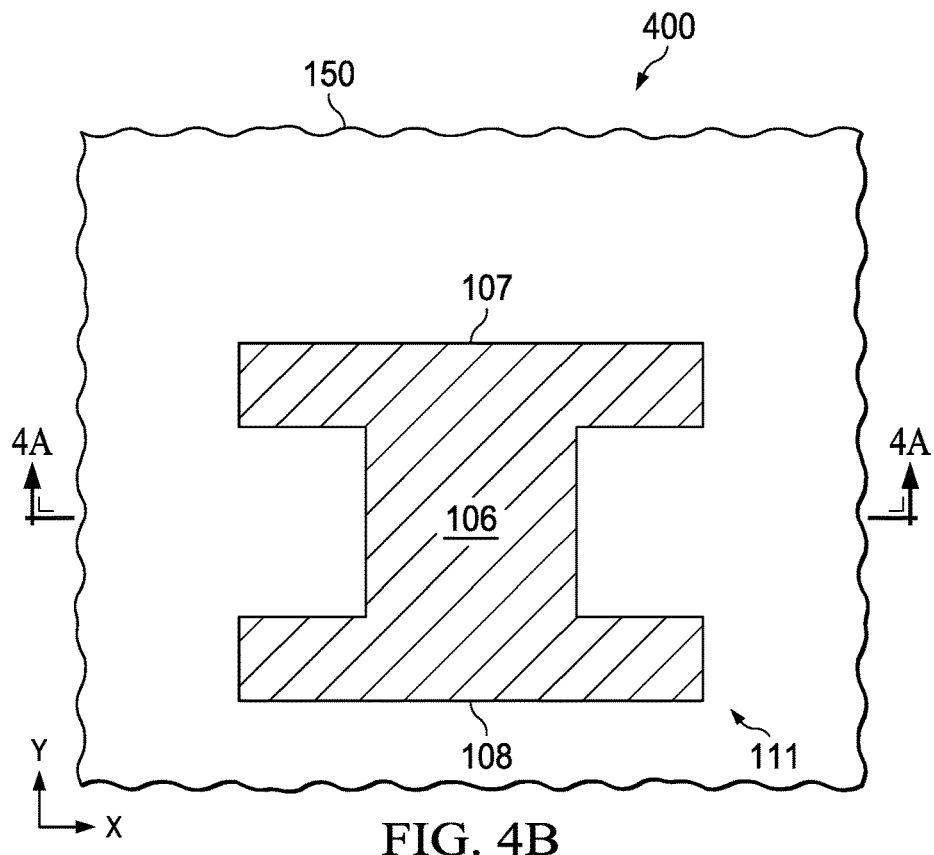
FIG. 4B is a partial sectional top plan view of the electronic device of FIG. 4 taken along line 4B-4B of FIG. 4A.
Figure 4C:
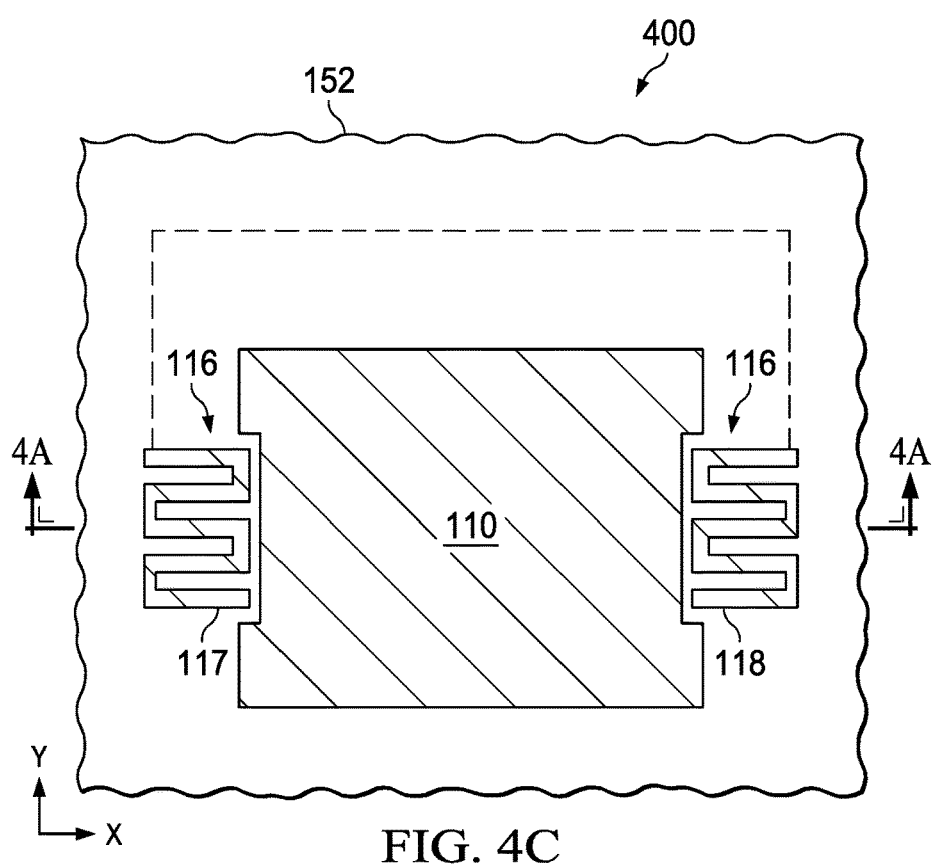
FIG. 4C is another partial sectional top plan view of the electronic device of FIG. 4 taken along line 4C-4C of FIG. 4A.

Referring now to FIGS. 4-4C, FIG. 4 shows another example integrated power limiting, surge protection electronic device 400 with integrated shutdown field effect transistors, a controlled shunt FET, and a fuse circuit having a metal fuse and a thermal conductor proximate the metal fuse. FIG. 4A shows a partial side view of the electronic device of FIG. 4 taken along line 4A-4A of FIGS. 4B and 4C. FIG. 4B shows a partial top view of the electronic device of FIG. 4 taken along line 4B-4B of FIG. 4A. FIG. 4C shows another partial top view of the electronic device of FIG. 4 taken along line 4C-4C of FIG. 4A. The electronic device 400 in this example includes similarly numbered components and structures as described above in connection with the electronic device 100 of FIGS. 1-1C. The electronic device 400 includes a fuse circuit 405 with the metal fuse 106, the thermal conductor 110, and the second resistor 116 as described above, but this example does not include the first level resistor or the first control transistor. As shown in FIGS. 4A-4C, the electronic device 400 includes a multilevel metallization structure 460 having the metal fuse 106 in the first level 150, and the thermal conductor 110 and the second resistor 116 in the second level 152.

Figure 5:
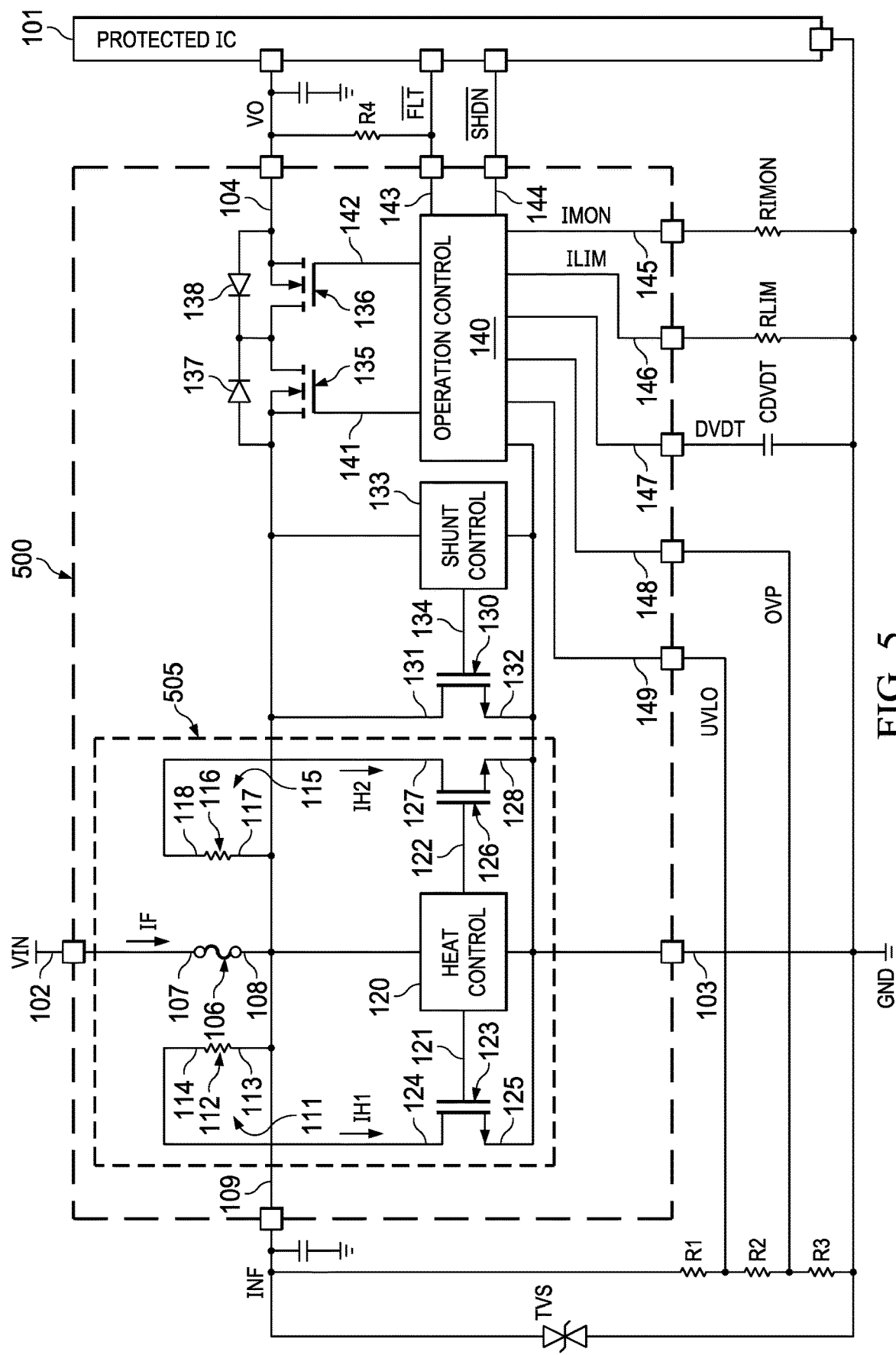
FIG. 5 is a schematic diagram of an integrated power limiting, surge protection electronic device with integrated shutdown field effect transistors, a controlled shunt FET, and a fuse circuit having a metal fuse and side and upper active heaters proximate the metal fuse.
Figure 5A:
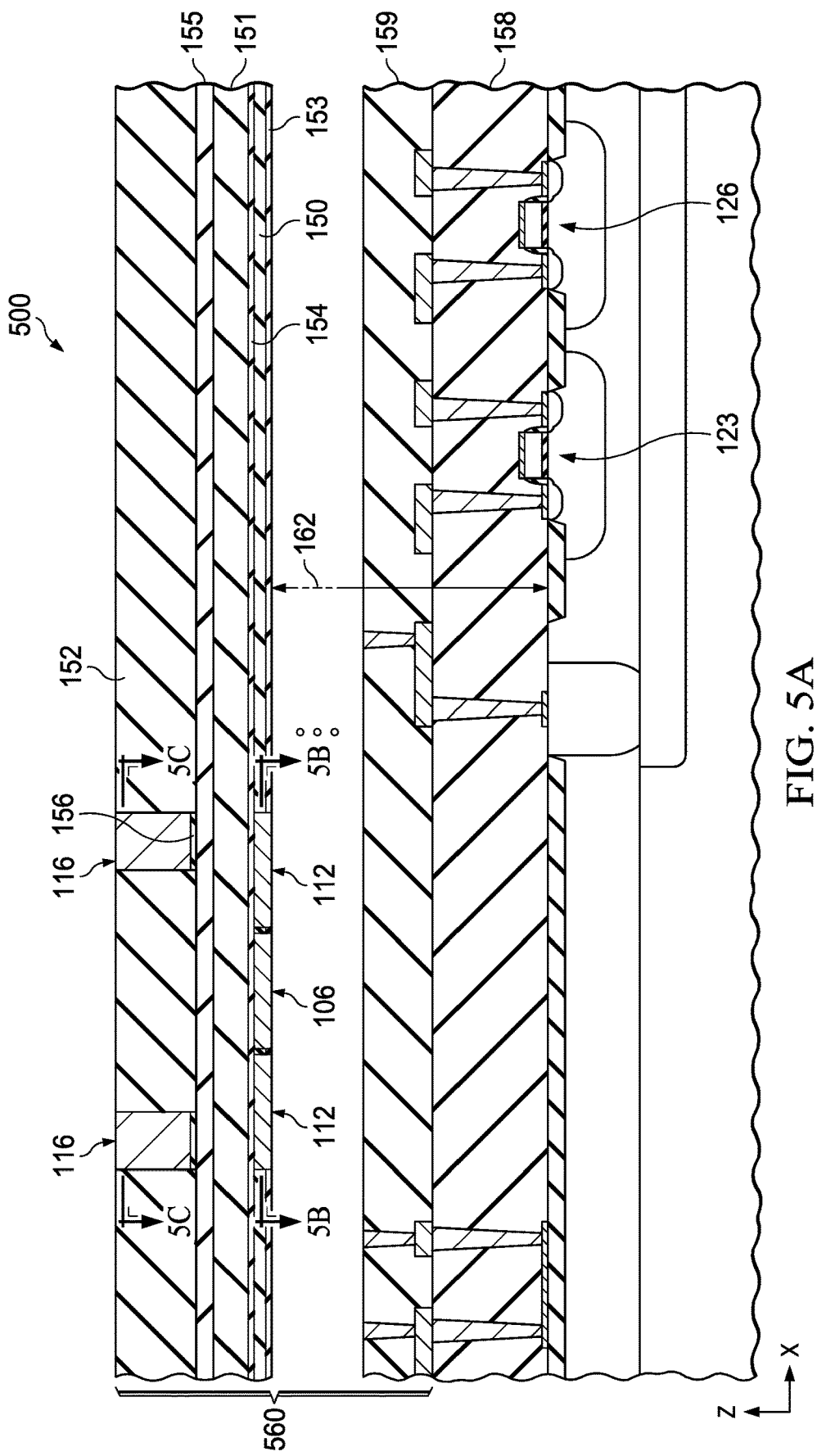
FIG. 5A is a partial sectional side elevation view of the electronic device of FIG. 5 taken along line 5A-5A of FIGS. 5B and 5C.
Figure 5B:
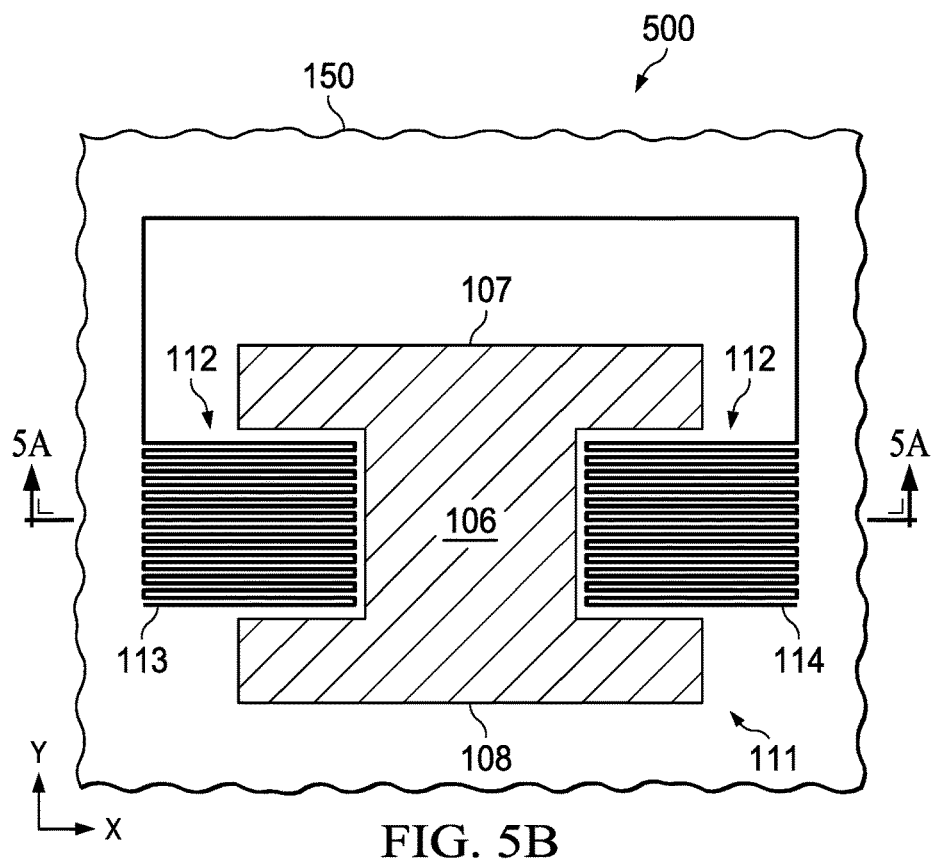
FIG. 5B is a partial sectional top plan view of the electronic device of FIG. 5 taken along line 5B-5B of FIG. 5A.
Figure 5C:
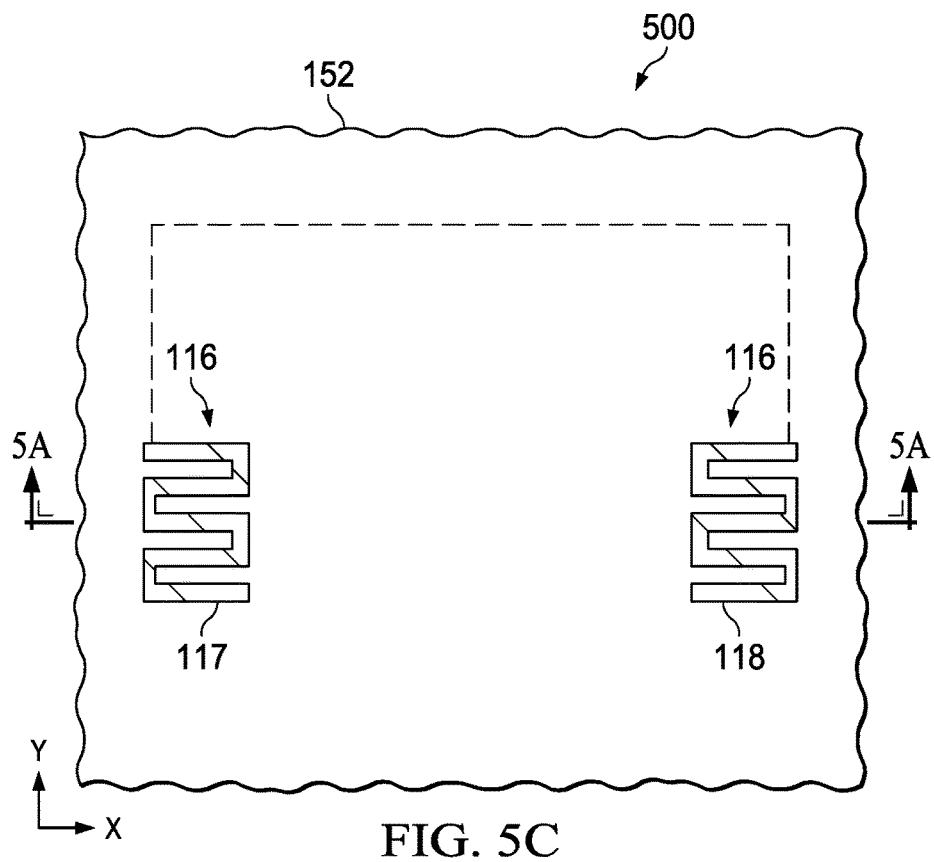
FIG. 5C is another partial sectional top plan view of the electronic device of FIG. 5 taken along line 5C-5C of FIG. 5A.

Referring now to FIGS. 5-5C, FIG. 5 shows another example integrated power limiting, surge protection electronic device 500 with integrated shutdown field effect transistors, a controlled shunt FET, and a fuse circuit having a metal fuse and side and upper active heaters proximate the metal fuse. FIG. 5A shows a partial side view of the electronic device 500 taken along line 5A-5A of FIGS. 5B and 5C. FIG. 5B shows a partial top view of the electronic device 500 taken along line 5B-5B of FIG. 5A. FIG. 5C shows another partial top view of the electronic device 500 taken along line 5C-5C of FIG. 5A. The electronic device 500 in this example includes similarly numbered components and structures as described above in connection with the electronic device 100 of FIGS. 1-1C. The electronic device 500 includes a fuse circuit 505 with the metal fuse 106, the first resistor 112, and the second resistor 116 as described above, but this example does not include the thermal conductor. As shown in FIGS. 5A-5C, the electronic device 500 includes a multilevel metallization structure 560 having the metal fuse 106 and the resistor 112 in the first level 150, and the second resistor 116 in the second level 152.

Figure 6:
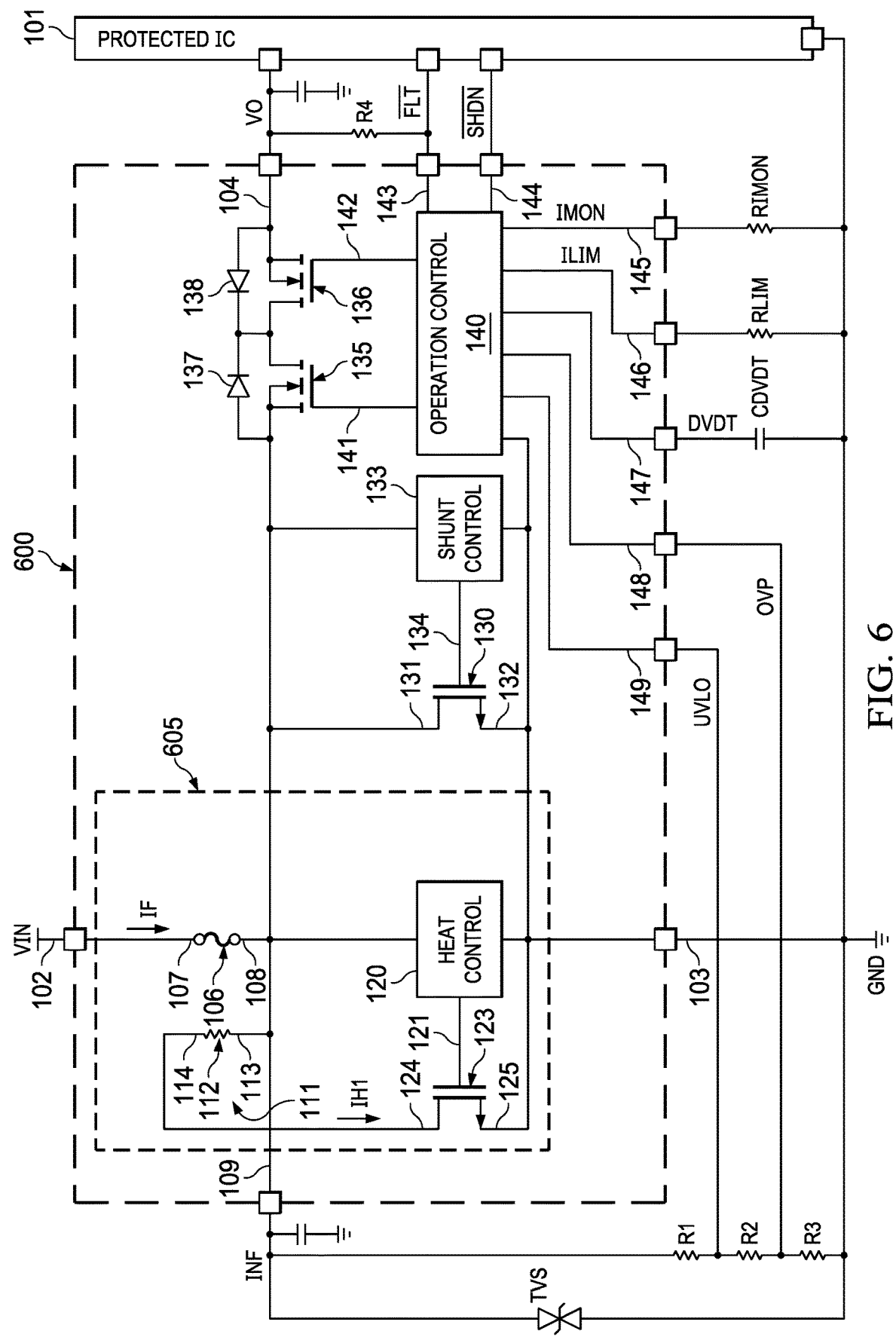
FIG. 6 is a schematic diagram of an integrated power limiting, surge protection electronic device with integrated shutdown field effect transistors, a controlled shunt FET, and a fuse circuit having a metal fuse and a side active heater proximate the metal fuse.
Figure 6A:
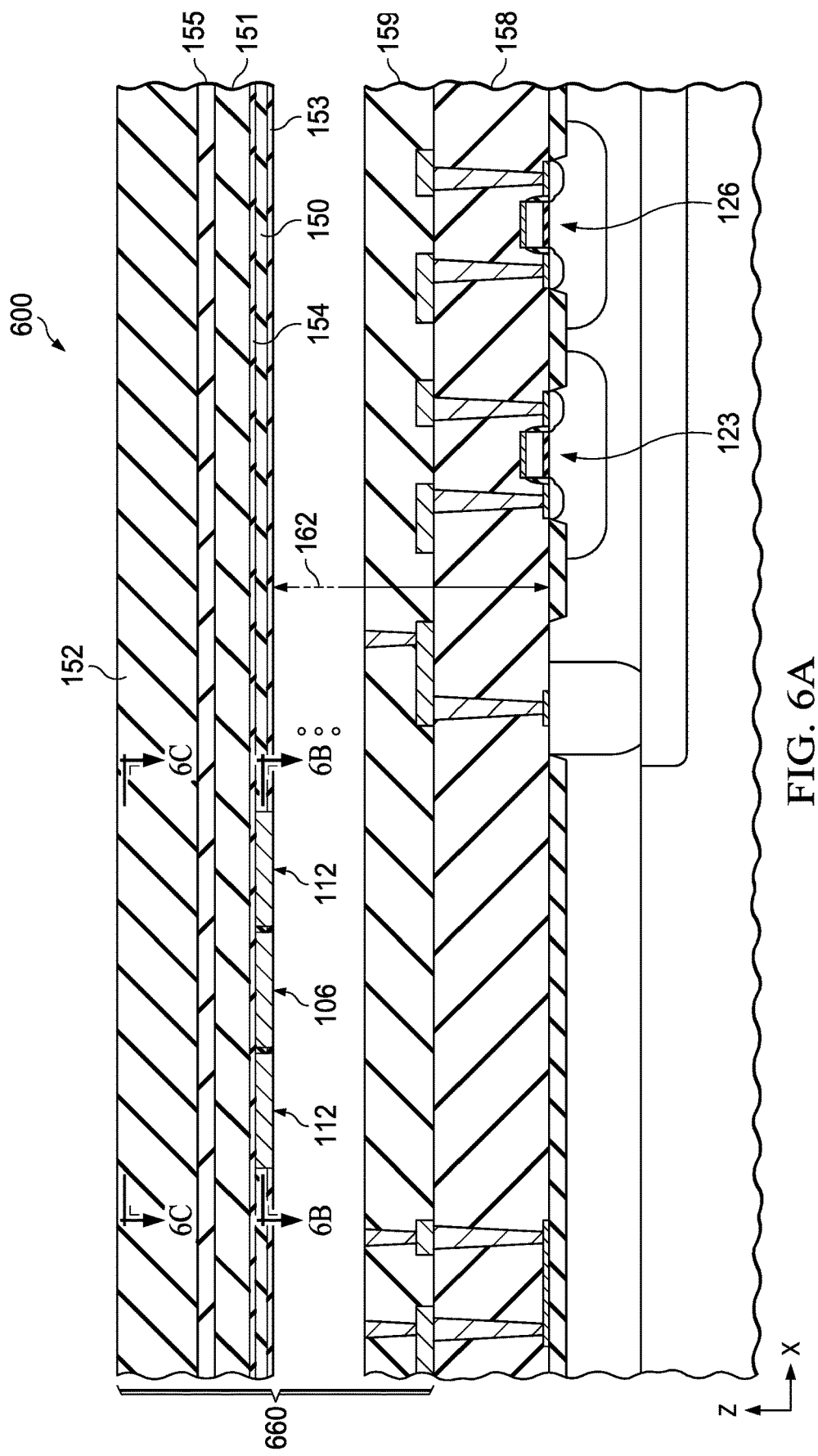
FIG. 6A is a partial sectional side elevation view of the electronic device of FIG. 6 taken along line 6A-6A of FIGS. 6B and 6C.
Figure 6B:
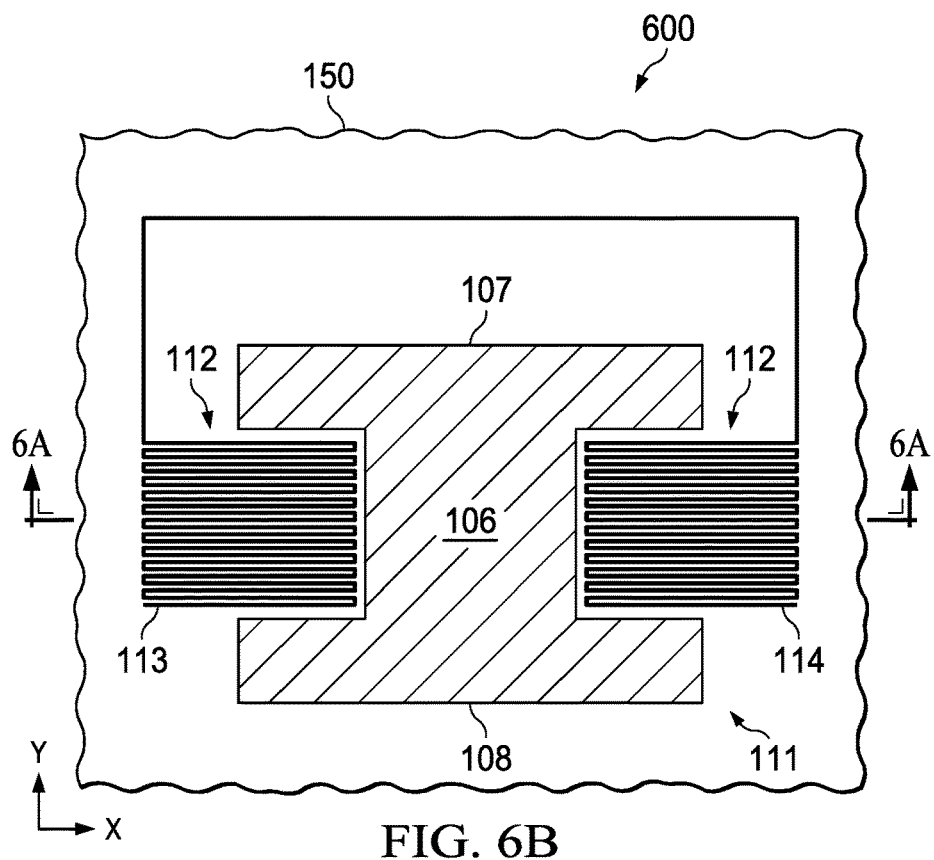
FIG. 6B is a partial sectional top plan view of the electronic device of FIG. 6 taken along line 6B-6B of FIG. 6A.
Figure 6C:
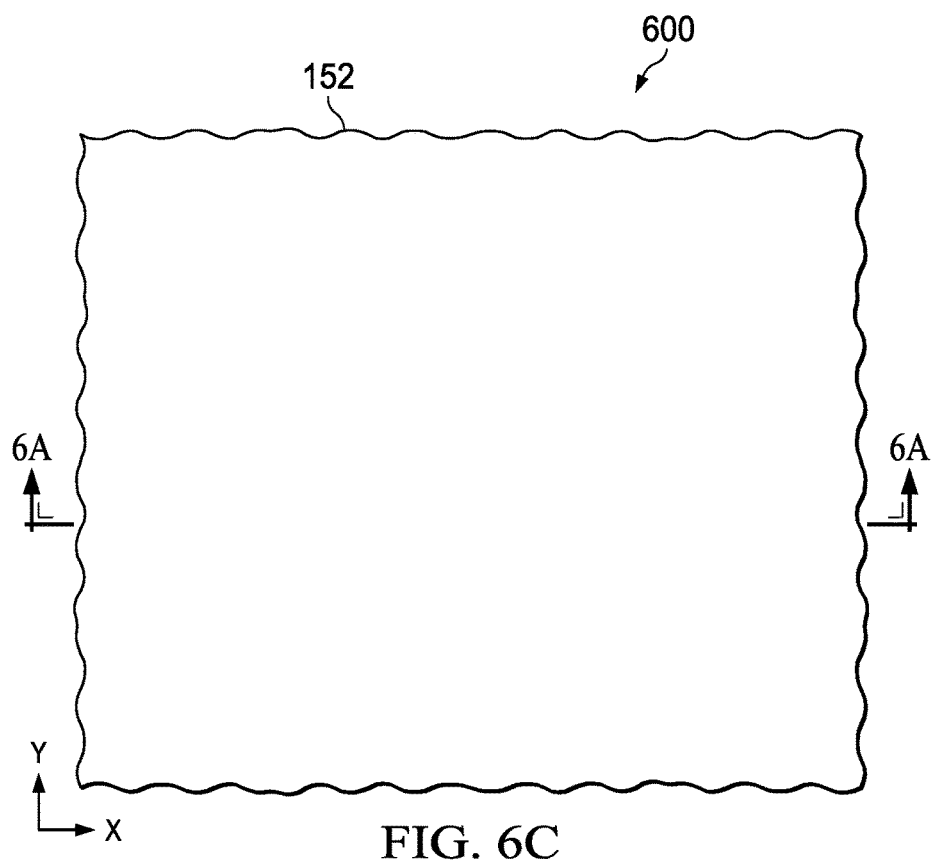
FIG. 6C is another partial sectional top plan view of the electronic device of FIG. 6 taken along line 6C-6C of FIG. 6A.

Referring now to FIGS. 6-6C, FIG. 6 shows another example integrated power limiting, surge protection electronic device 600 with integrated shutdown field effect transistors, a controlled shunt FET, and a fuse circuit having a metal fuse and a side active heater proximate the metal fuse. FIG. 6A shows a partial side view of the electronic device 600 taken along line 6A-6A of FIGS. 6B and 6C. FIG. 6B shows a partial top view of the electronic device 600 taken along line 6B-6B of FIG. 6A. FIG. 6C shows another partial top view of the electronic device 600 taken along line 6C-6C of FIG. 6A. The electronic device 600 in this example includes similarly numbered components and structures as described above in connection with the electronic device 100 of FIGS. 1-1C. The electronic device 600 includes a fuse circuit 605 with the metal fuse 106 and the first resistor 112 as described above, but this example does not include the thermal conductor, the second resistor, or the second thermal control transistor. As shown in FIGS. 6A-6C, the electronic device 600 includes a multilevel metallization structure 660 having the metal fuse 106 and the resistor 112 in the first level 150.

Figure 7:
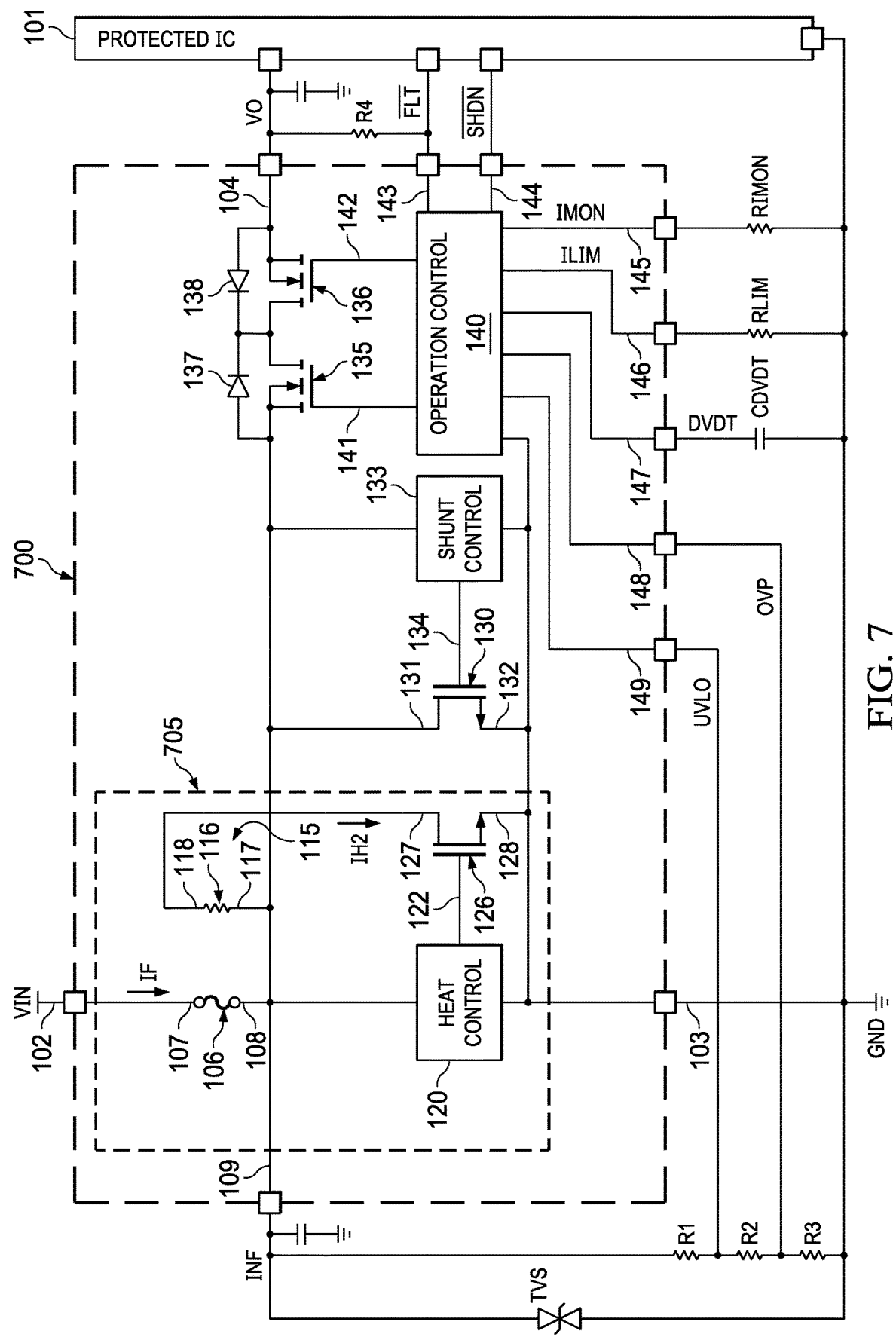
FIG. 7 is a schematic diagram of an integrated power limiting, surge protection electronic device with integrated shutdown field effect transistors, a controlled shunt FET, and a fuse circuit having a metal fuse and an upper active heater proximate the metal fuse.
Figure 7A:
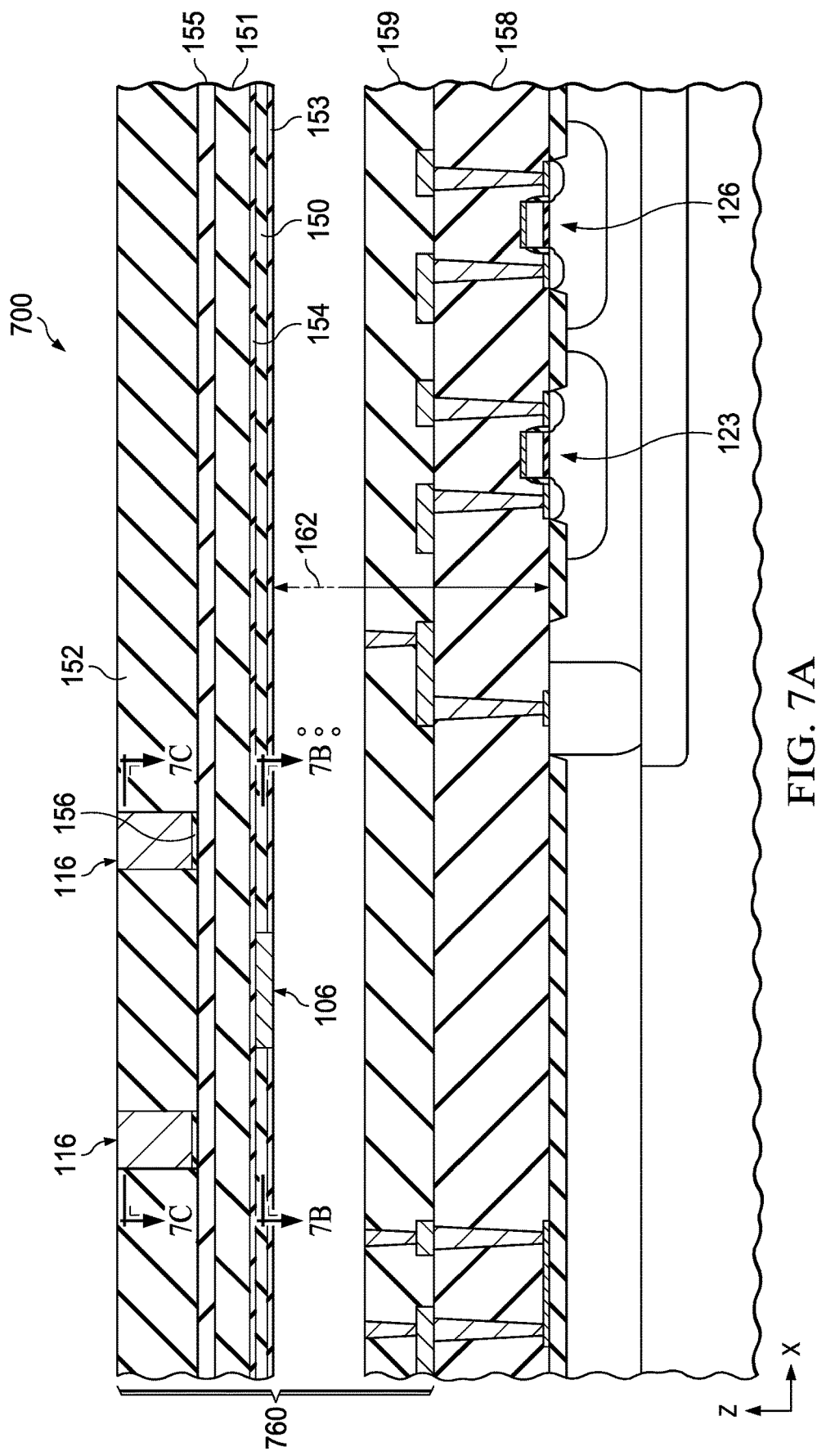
FIG. 7A is a partial sectional side elevation view of the electronic device of FIG. 7 taken along line 7A-7A of FIGS. 7B and 7C.
Figure 7B:
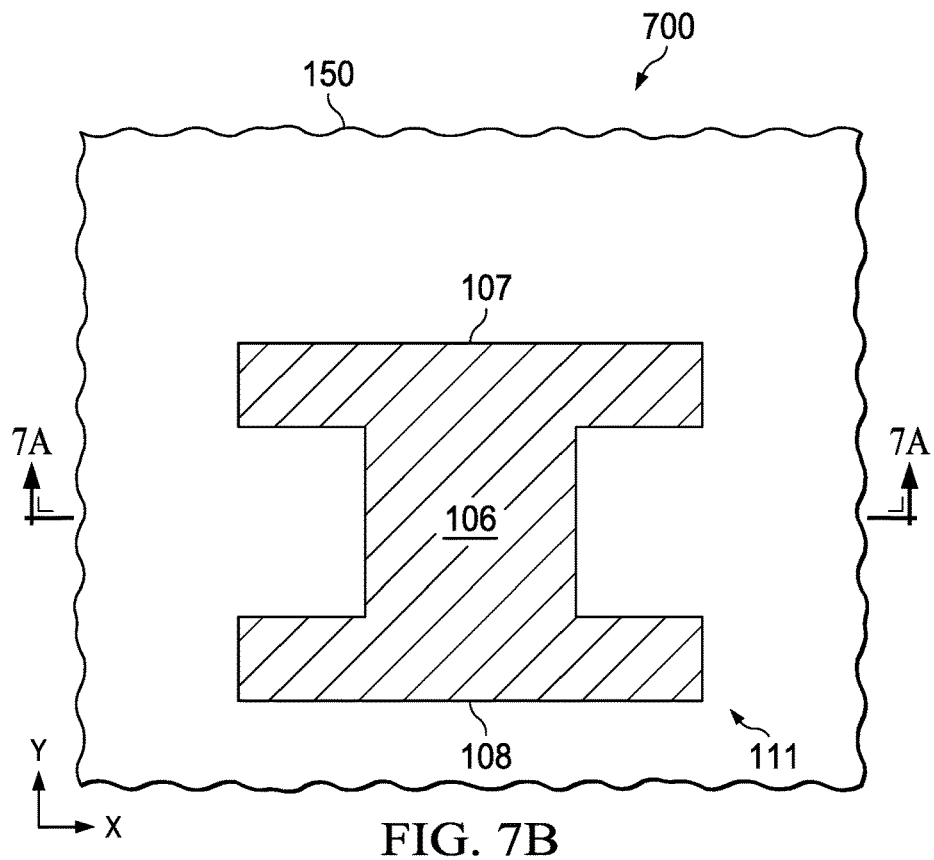
FIG. 7B is a partial sectional top plan view of the electronic device of FIG. 7 taken along line 7B-7B of FIG. 7A.
Figure 7C:
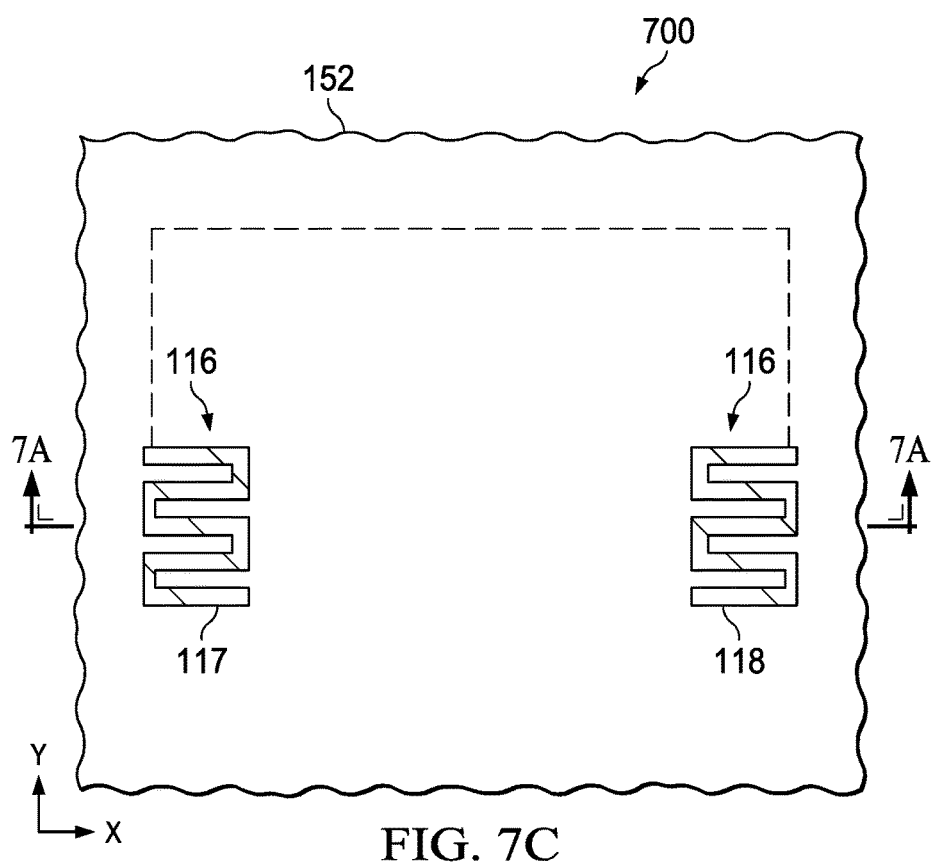
FIG. 7C is another partial sectional top plan view of the electronic device of FIG. 7 taken along line 7C-7C of FIG. 7A.

Referring now to FIGS. 7-7C, FIG. 7 shows another example integrated power limiting, surge protection electronic device 700 with integrated shutdown field effect transistors, a controlled shunt FET, and a fuse circuit having a metal fuse and an upper active heater proximate the metal fuse. FIG. 7A shows a partial side view of the electronic device 700 taken along line 7A-7A of FIGS. 7B and 7C. FIG. 7B shows a partial top view of the electronic device 700 taken along line 7B-7B of FIG. 7A. FIG. 7C shows another partial top view of the electronic device of 700 taken along line 7C-7C of FIG. 7A. The electronic device 700 in this example includes similarly numbered components and structures as described above in connection with the electronic device 100 of FIGS. 1-1C. The electronic device 700 includes a fuse circuit 705 with the metal fuse 106 and the second resistor 116 as described above, but this example does not include the thermal conductor or the first resistor. As shown in FIGS. 7A-7C, the electronic device 700 includes a multilevel metallization structure 760 having the metal fuse 106 in the first level 150, and the second resistor 116 in the second level 152.

As discussed above, the metal fuse 106 in the electronic devices 100, 200, 300, 400, 500, 600, and 700 has an "I" shape with a continuous narrower middle portion between the ends 107 and 108. In other examples described below, a meandering or serpentine shaped middle portion is provided with multiple adjacent turns between ends of a metal fuse, along or in combination with one or more of the thermal conductor 110, the resistor 112 and the second resistor 116. These examples facilitate self-heating of the metal fuse structure to control the fuse performance in operation.

Figure 8:
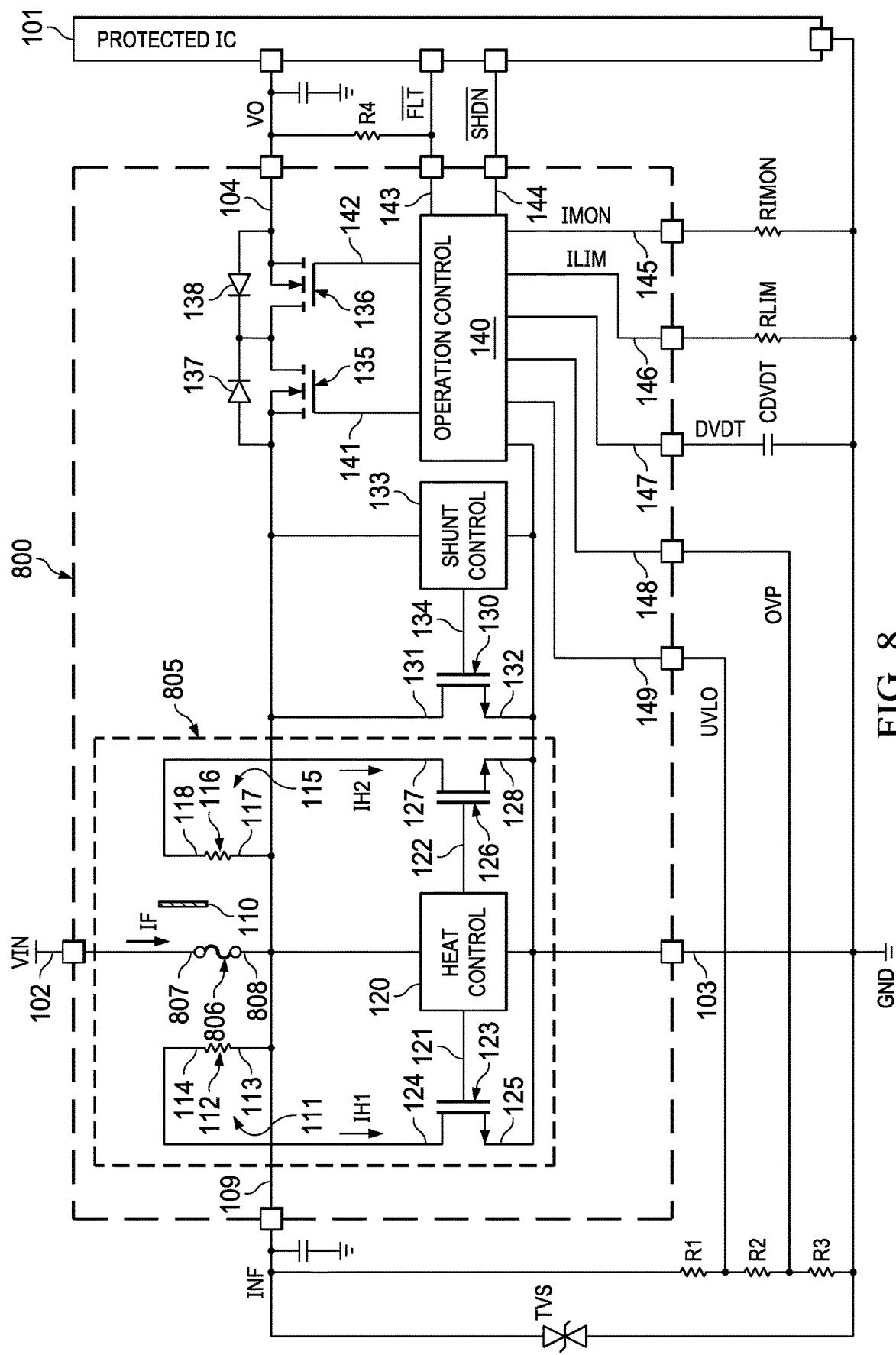
FIG. 8 is a schematic diagram of an integrated power limiting, surge protection electronic device with integrated shutdown field effect transistors, a controlled shunt FET, and a fuse circuit having a metal fuse with a meandering or serpentine shape, a thermal conductor, and side and upper active heaters proximate the metal fuse.
Figure 8A:
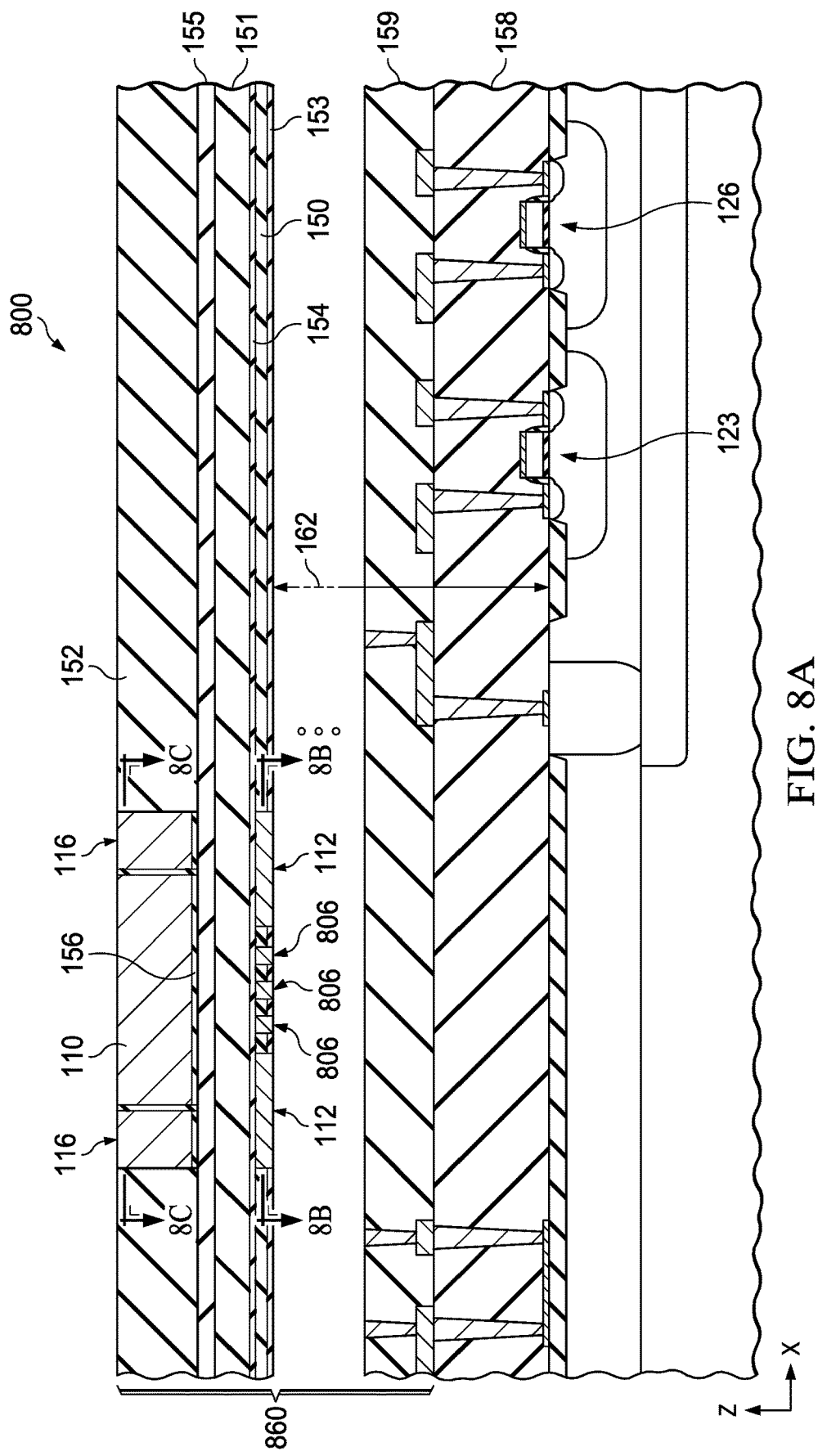
FIG. 8A is a partial sectional side elevation view of the electronic device of FIG. 8 taken along line 8A-8A of FIGS. 8B and 8C.
Figure 8B:
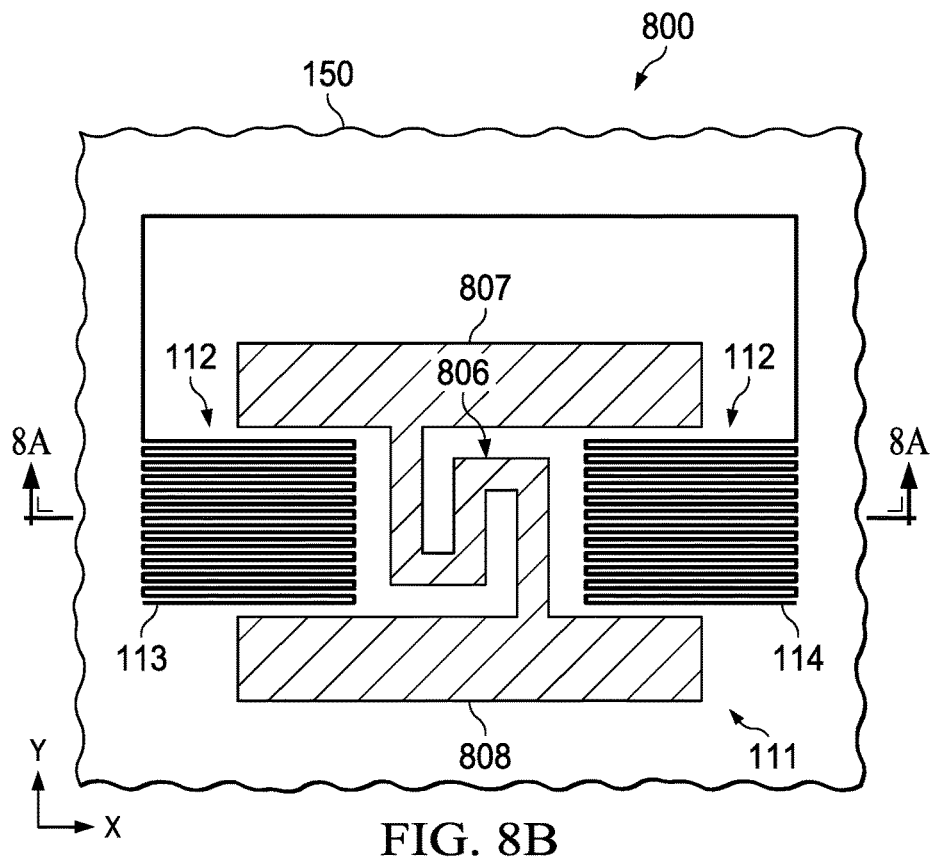
FIG. 8B is a partial sectional top plan view of the electronic device of FIG. 8 taken along line 8B-8B of FIG. 8A.
Figure 8C:
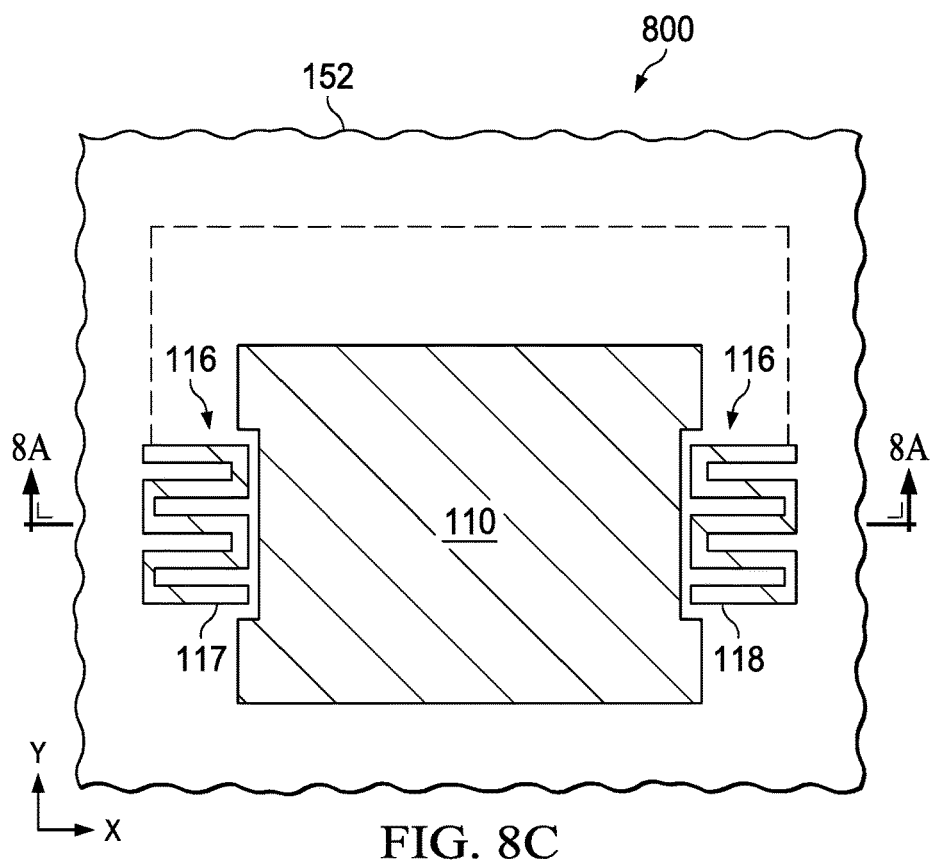
FIG. 8C is another partial sectional top plan view of the electronic device of FIG. 8 taken along line 8C-8C of FIG. 8A.

Referring now to FIGS. 8-8C, FIG. 8 shows another example integrated power limiting, surge protection electronic device 800 with integrated shutdown field effect transistors, a controlled shunt FET, and a fuse circuit 805 having a metal fuse 806 with a meandering or serpentine shape, a thermal conductor, and side and upper active heaters proximate the metal fuse 806. FIG. 8A shows a partial side view of the electronic device 800 taken along line 8A-8A of FIGS. 8B and 8C. FIG. 8B shows a partial top view of the electronic device 800 taken along line 8B-8B in FIG. 8. FIG. 8C shows another partial sectional top plan view of the electronic device 800 taken along line 8C-8C of FIG. 8A. The electronic device 800 in this example includes similarly numbered components and structures as described above in connection with the electronic device 100 of FIGS. 1-1C. The electronic device 800 includes a fuse circuit 805 with a serpentine shaped metal fuse 806 with a first end 807 coupled to the input 102 and a second end 808 coupled to the output 804, as well as the thermal conductor 110, the first resistor 112, and the second resistor 116 as described above. As shown in FIGS. 8A-8C, the electronic device 800 includes a multilevel metallization structure 860 having the metal fuse 806 and the resistor 112 in the first level 150, and the thermal conductor 110 and the second resistor 116 in the second level 152. As shown in FIG. 8B, moreover, the metal fuse 806 has a serpentine shape with the first end 807, the second end 808, and a serpentine middle portion. The middle portion of the metal fuse 806 includes a first portion that extends downward from the first end 807 to a first turn, a second portion that extends upward from the first turn back toward a second turn, and a third portion that extends downward from the second turn to the second end 808.

The first, second, and third portions in the example of FIG. 8B are substantially parallel with one another. In other implementations, at least some of the portions are not parallel with one another. In addition, the first, second, and third portions, as well as the first and second turns in this example have substantially equal widths. In other implementations, at least some of the portions and/or some of the turns have different widths. Moreover, the first, second, and third portions in FIG. 8B are laterally spaced from one another by a spacing distance that is approximately equal to the widths of the portion. The serpentine shaped metal fuse 806 is thermally coupled with the thermal conductor 110, the first resistor 112, and the second resistor 116 as described above. As shown in FIGS. 8A-8C, the electronic device 800 includes a multilevel metallization structure 860 having the metal fuse 806 and the first resistor 112 in the first level 150, and the thermal conductor 110 and the second resistor 116 in the second level 152.

Figure 9:
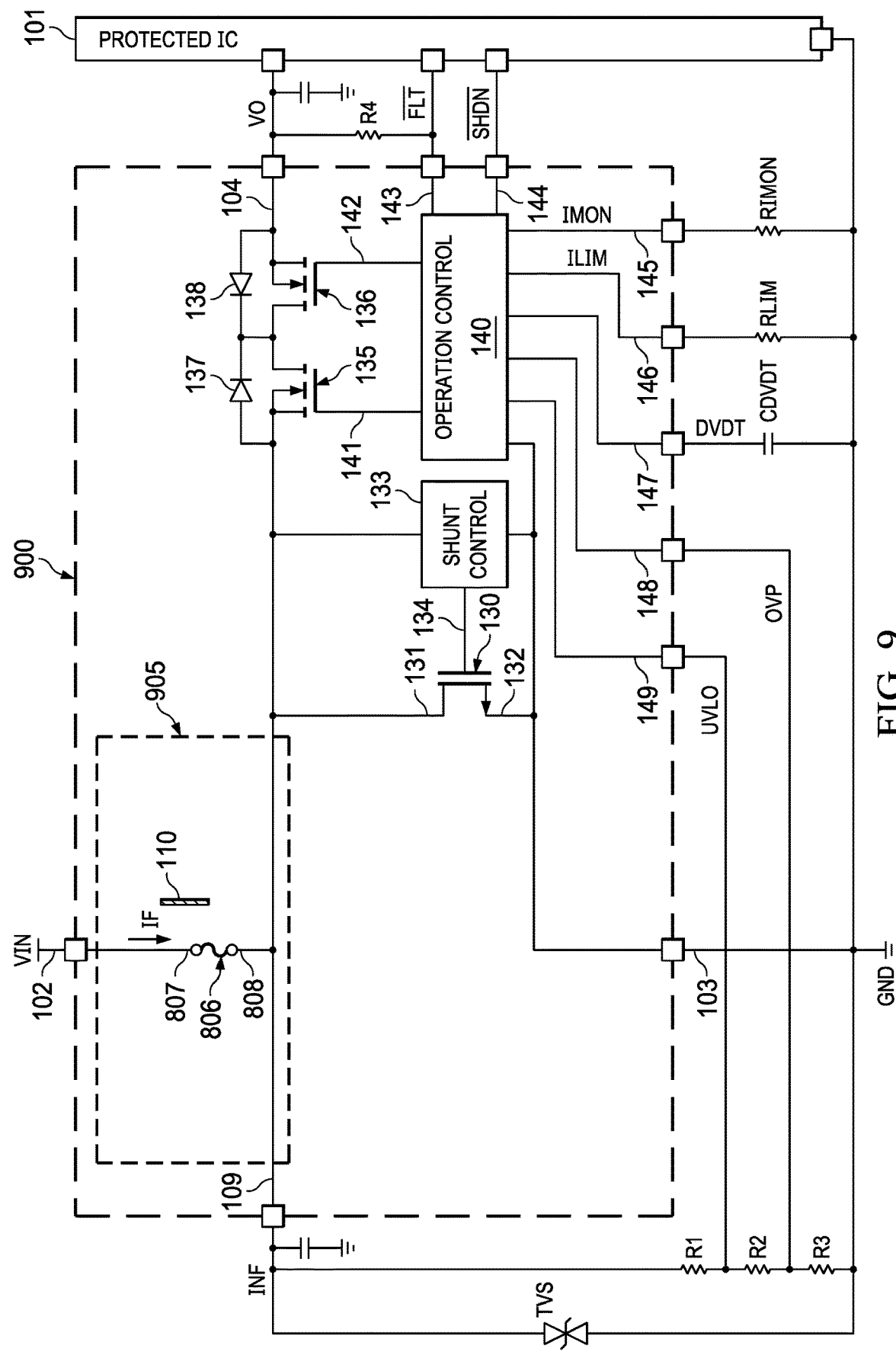
FIG. 9 is a schematic diagram of an integrated power limiting, surge protection electronic device with integrated shutdown field effect transistors, a controlled shunt FET, and a fuse circuit having a metal fuse with a meandering or serpentine shape and a thermal conductor proximate the metal fuse.
Figure 9A:
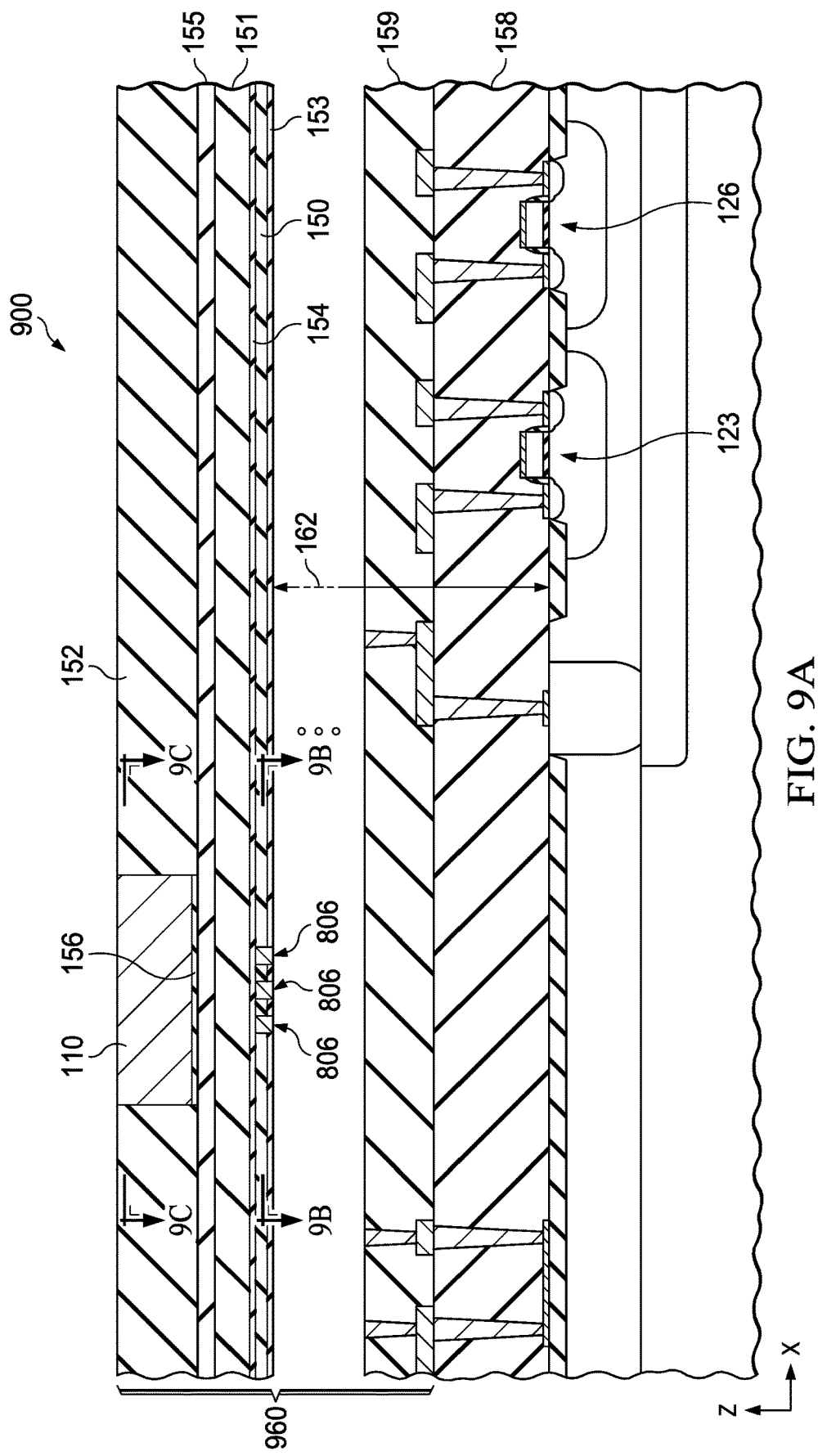
FIG. 9A is a partial sectional side elevation view of the electronic device of FIG. 9 taken along line 9A-9A of FIGS. 9B and 9C.
Figure 9B:
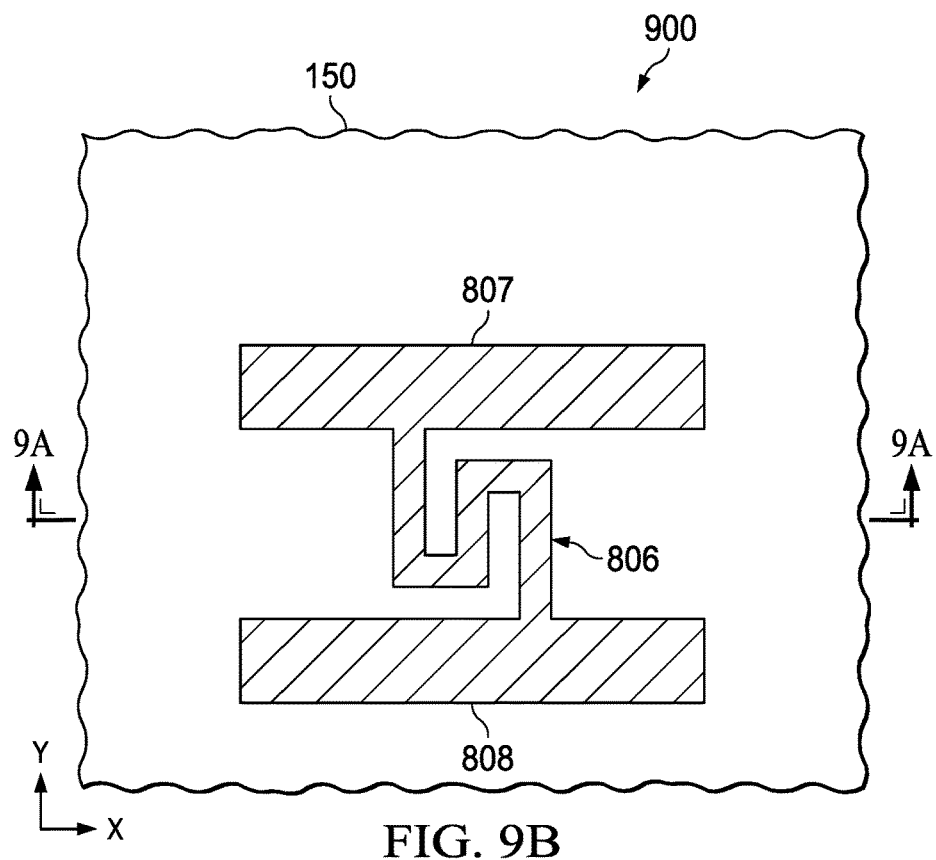
FIG. 9B is a partial sectional top plan view of the electronic device of FIG. 9 taken along line 9B-9B of FIG. 9A.
Figure 9C:
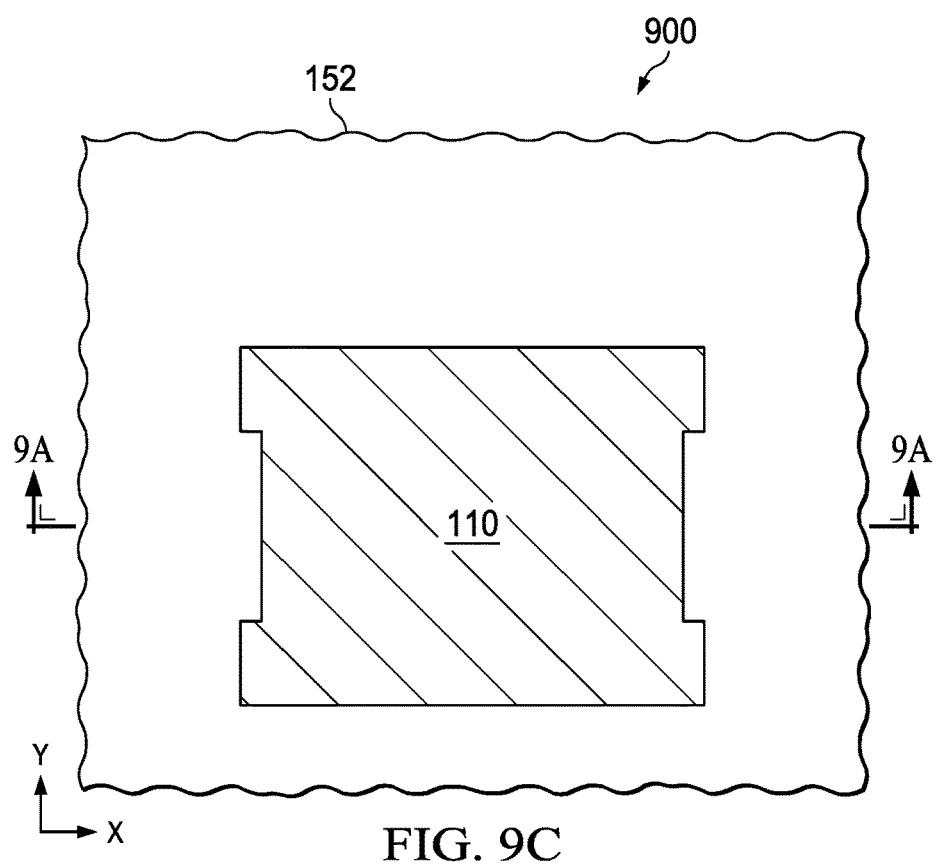
FIG. 9C is another partial sectional top plan view of the electronic device of FIG. 9 taken along line 9C-9C of FIG. 9A.

Referring now to FIGS. 9-9C, FIG. 9 shows another example integrated power limiting, surge protection electronic device 900 with integrated shutdown field effect transistors, a controlled shunt FET, and a fuse circuit having the serpentine shaped metal fuse 806 with a meandering or serpentine shape and a thermal conductor proximate the metal fuse. FIG. 9A shows a partial side view of the electronic device 900 taken along line 9A-9A of FIGS. 9B and 9C. FIG. 9B shows a partial top view of the electronic device 900 taken along line 9B-9B of FIG. 9A. FIG. 9C shows another partial top view of the electronic device 900 taken along line 9C-9C of FIG. 9A. The electronic device 900 in this example includes similarly numbered components and structures as described above in connection with the electronic device 100 of FIGS. 1-1C. The electronic device 900 includes a fuse circuit 905 with the serpentine shaped metal fuse 806 and the thermal conductor 110 as described above, but this example does not include thermally coupled resistors and heat control transistors. As shown in FIGS. 9A-9C, the electronic device 900 includes a multilevel metallization structure 960 having the metal fuse 806 in the first level 150, and the thermal conductor 110 in the second level 152.

Figure 10:
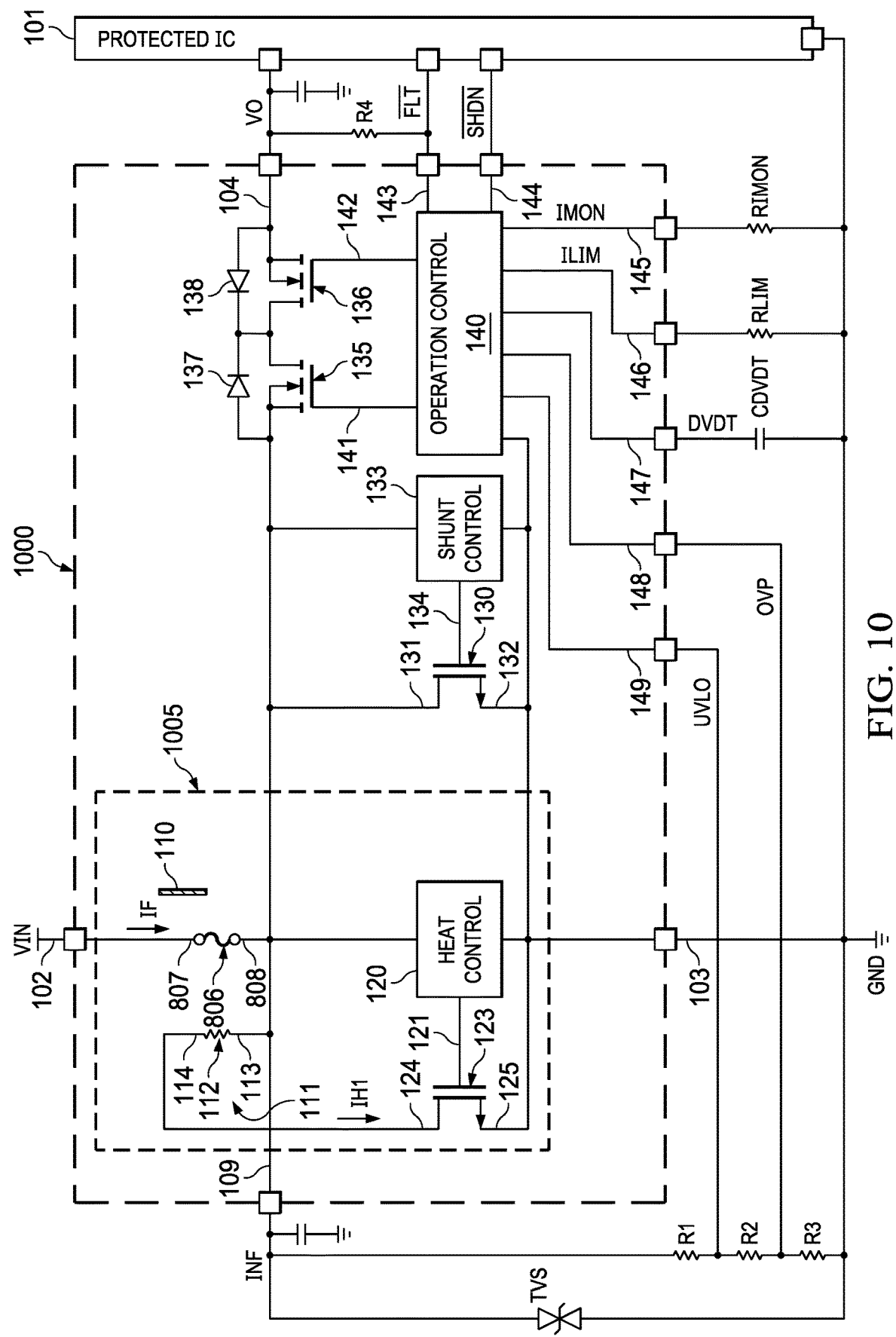
FIG. 10 is a schematic diagram of an integrated power limiting, surge protection electronic device with integrated shutdown field effect transistors, a controlled shunt FET, and a fuse circuit having a metal fuse with a meandering or serpentine shape, a thermal conductor, and a side active heater proximate the metal fuse.
Figure 10A:
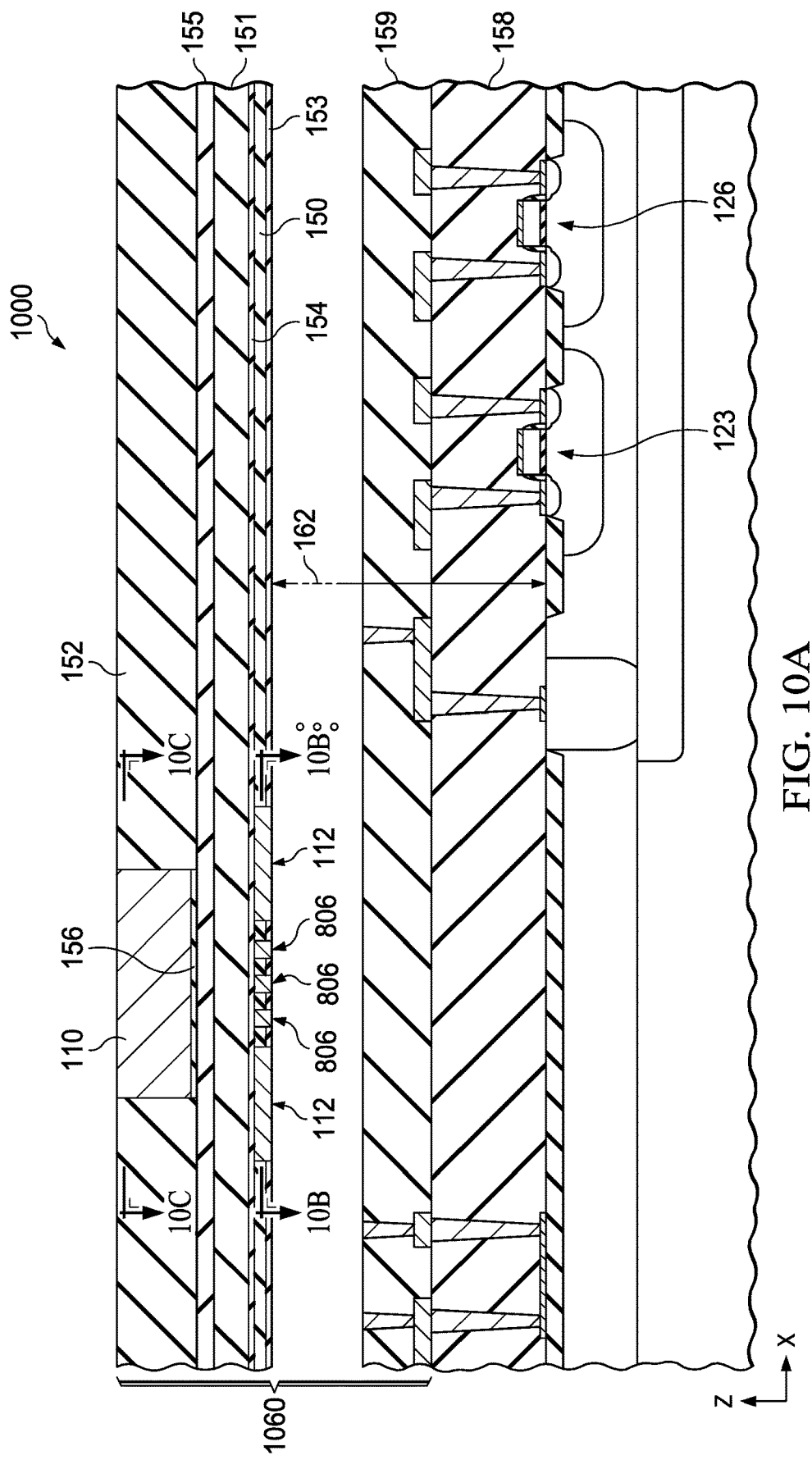
FIG. 10A is a partial sectional side elevation view of the electronic device of FIG. 10 taken along line 10A-10A of FIGS. 10B and 10C.
Figure 10B:
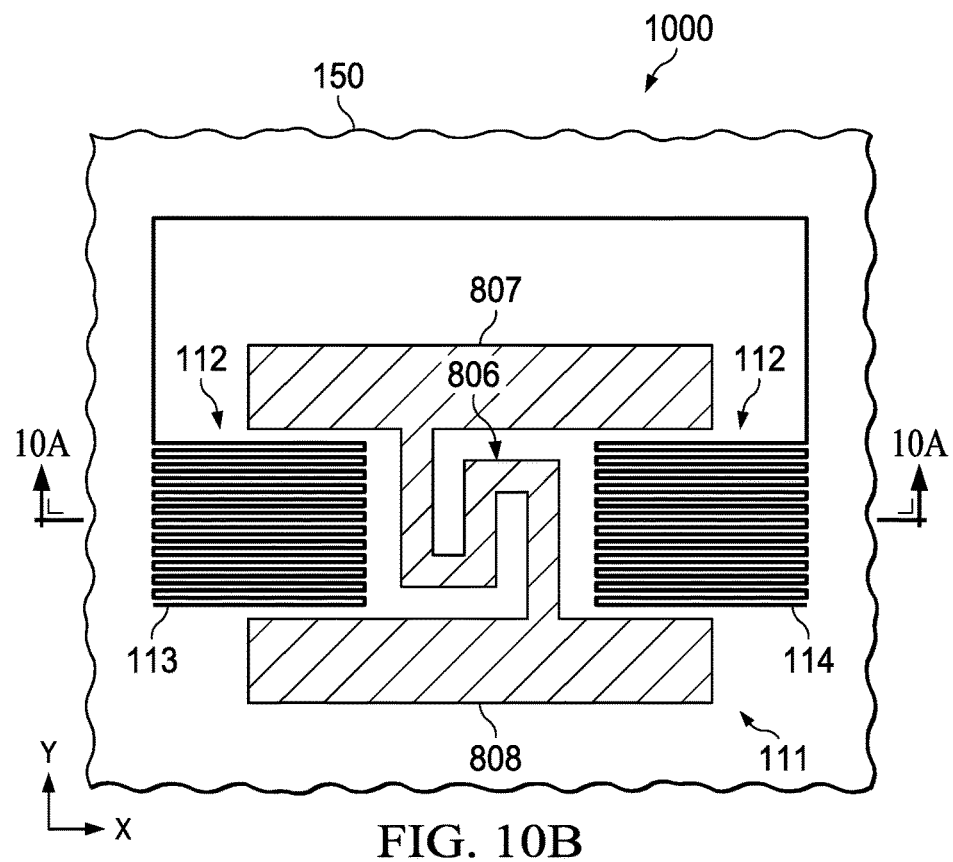
FIG. 10B is a partial sectional top plan view of the electronic device of FIG. 10 taken along line 10B-10B of FIG. 10A.
Figure 10C:
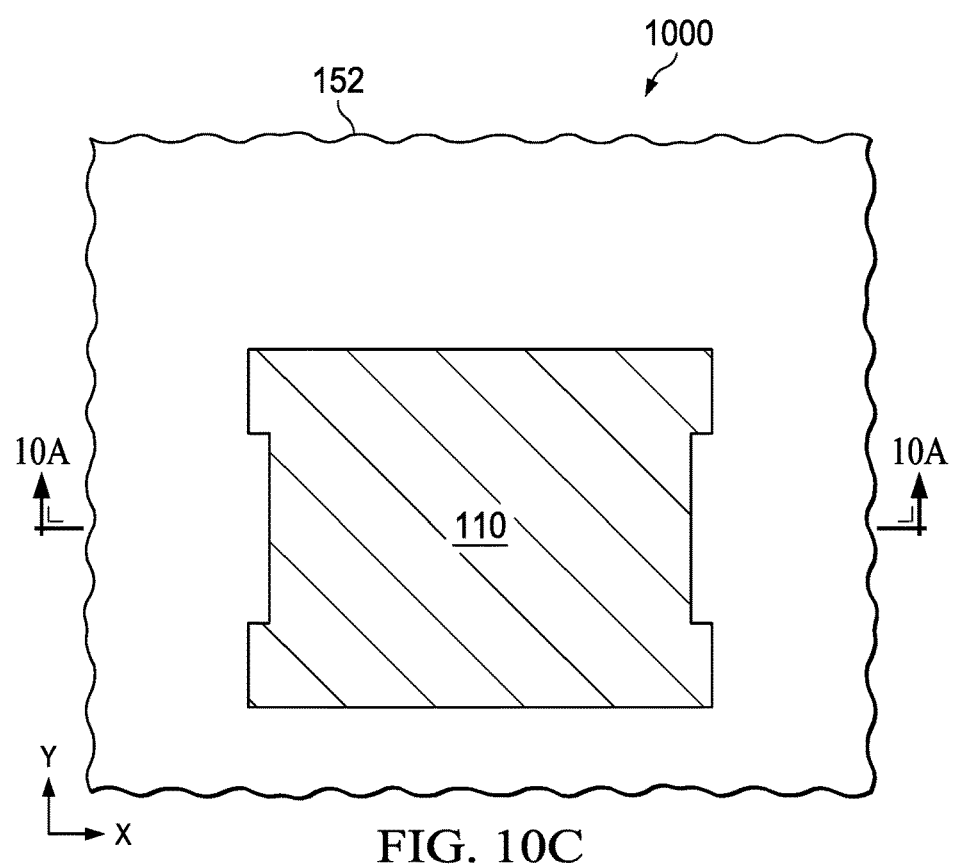
FIG. 10C is another partial sectional top plan view of the electronic device of FIG. 10 taken along line 10C-10C of FIG. 10A.

Referring now to FIGS. 10-10C, FIG. 10 shows another example integrated power limiting, surge protection electronic device 1000 with integrated shutdown field effect transistors, a controlled shunt FET, and a fuse circuit 1005 having a metal fuse with a meandering or serpentine shape, a thermal conductor, and a side active heater proximate the metal fuse. FIG. 10A shows a partial side view of the electronic device 1000 taken along line 10A-10A of FIGS. 10B and 10C. FIG. 10B shows a partial top view of the electronic device 1000 taken along line 10B-10B of FIG. 10A. FIG. 10C shows another partial top view of the electronic device 1000 taken along line 10C-10C of FIG. 10A. The electronic device 1000 in this example includes similarly numbered components and structures as described above in connection with the electronic device 100 of FIGS. 1-1C. The electronic device 1000 includes a fuse circuit 1005 with the metal fuse 806, the thermal conductor 110, the resistor 112, the controller 120 and the heat control transistor 123 as described above, but this example does not include the second resistor or the second heat control transistor. As shown in FIGS. 10A-10C, the electronic device 1000 includes a multilevel metallization structure 1060 having the metal fuse 806 and the resistor 112 in the first level 150, and the thermal conductor 110 in the second level 152.

Figure 11:
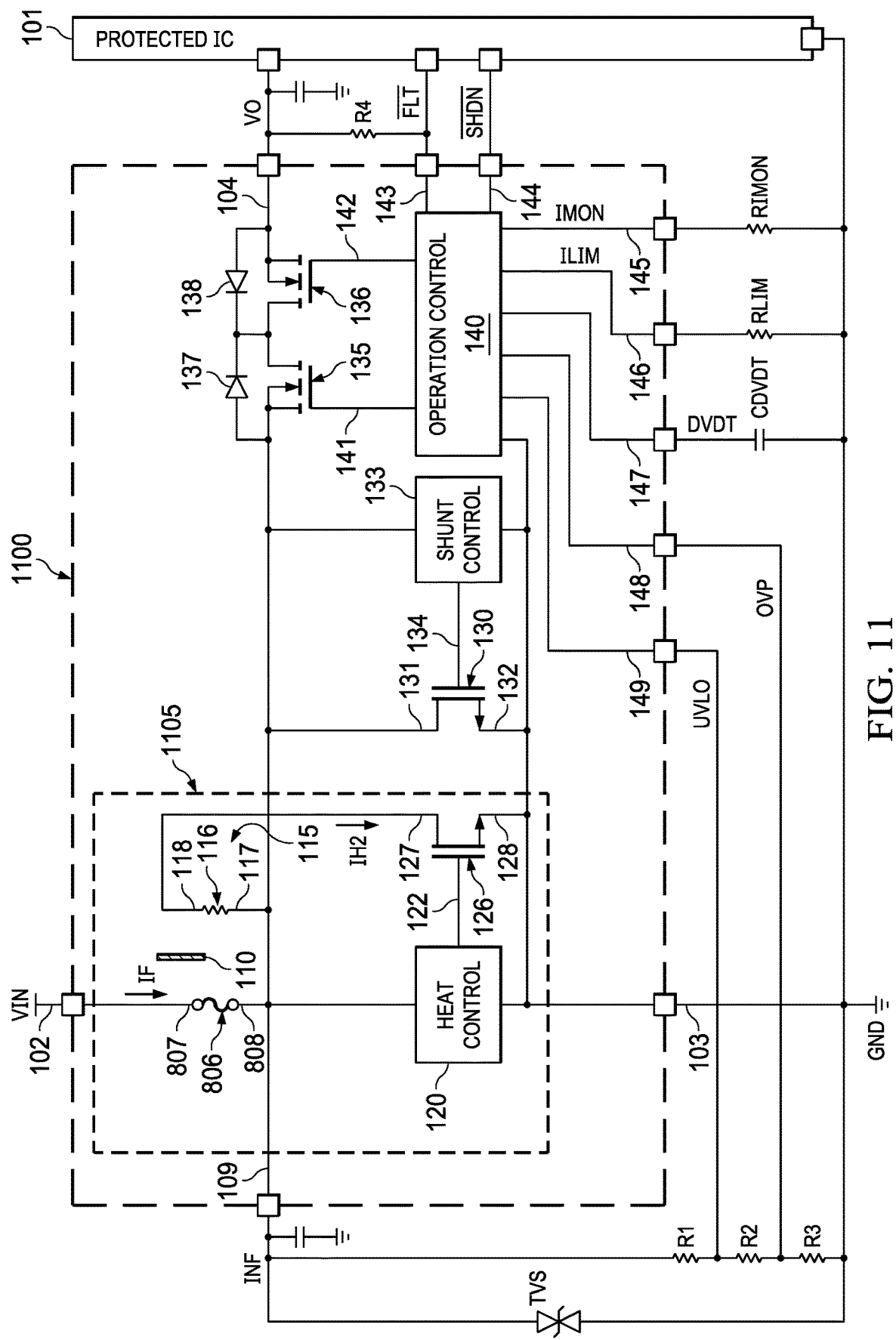
FIG. 11 is a schematic diagram of an integrated power limiting, surge protection electronic device with integrated shutdown field effect transistors, a controlled shunt FET, and a fuse circuit having a metal fuse with a meandering or serpentine shape, a thermal conductor, and an upper active heater proximate the metal fuse.
Figure 11A:
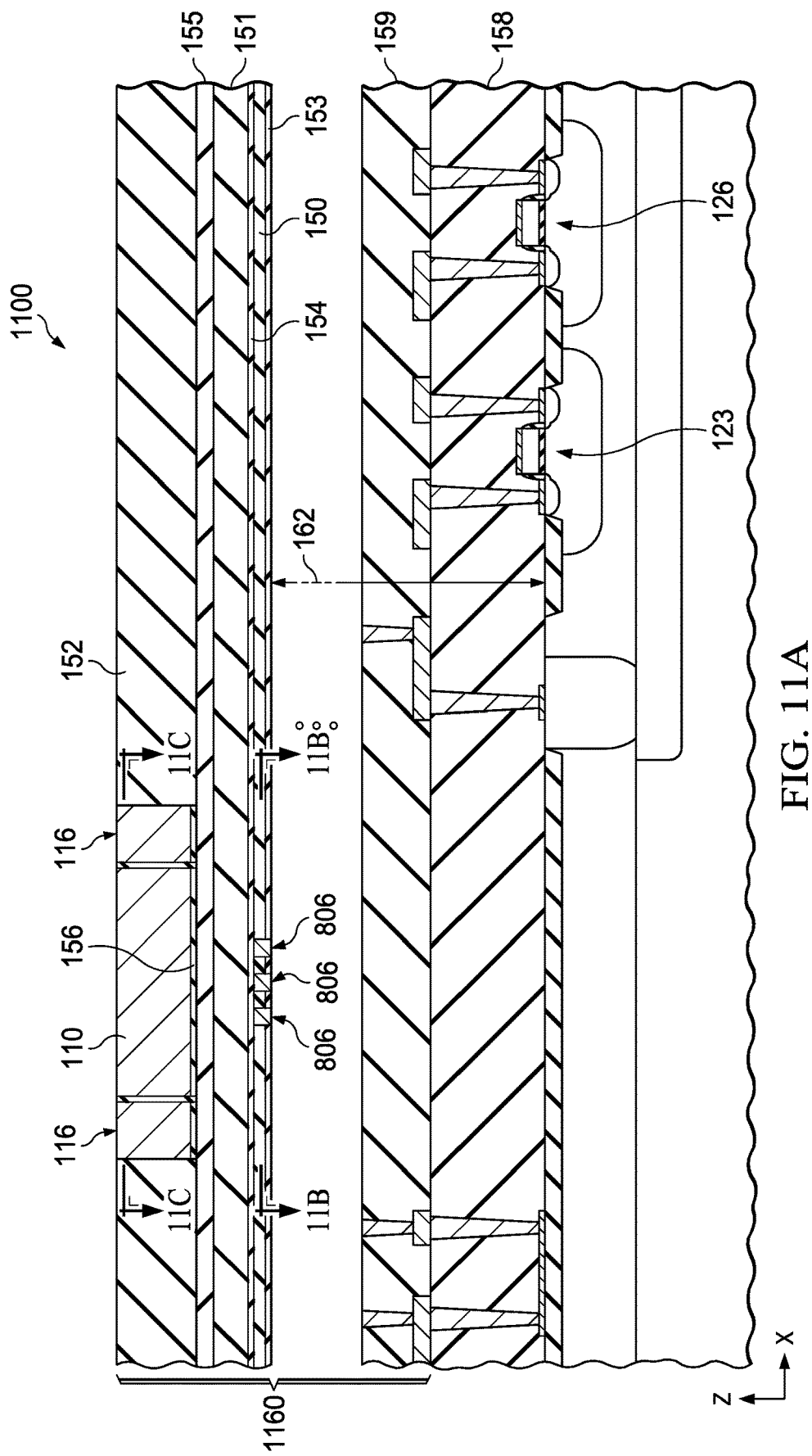
FIG. 11A is a partial sectional side elevation view of the electronic device of FIG. 11 taken along line 11A-11A of FIGS. 11B and 11C.
Figure 11B:
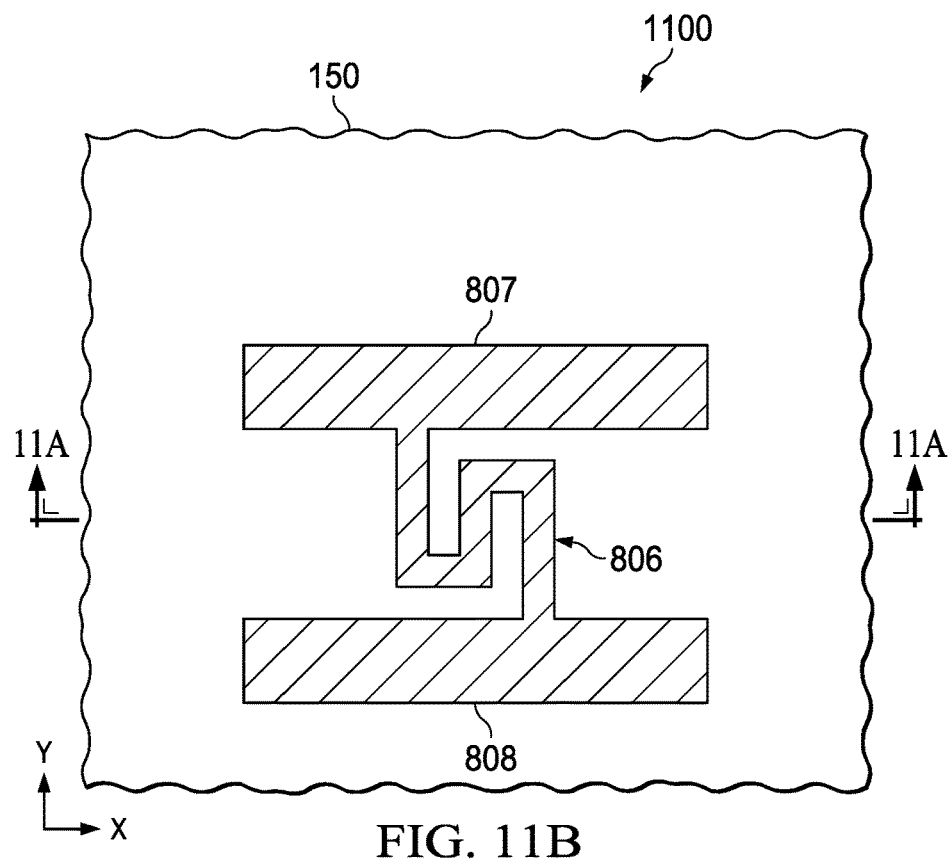
FIG. 11B is a partial sectional top plan view of the electronic device of FIG. 11 taken along line 11B-11B of FIG. 11A.
Figure 11C:
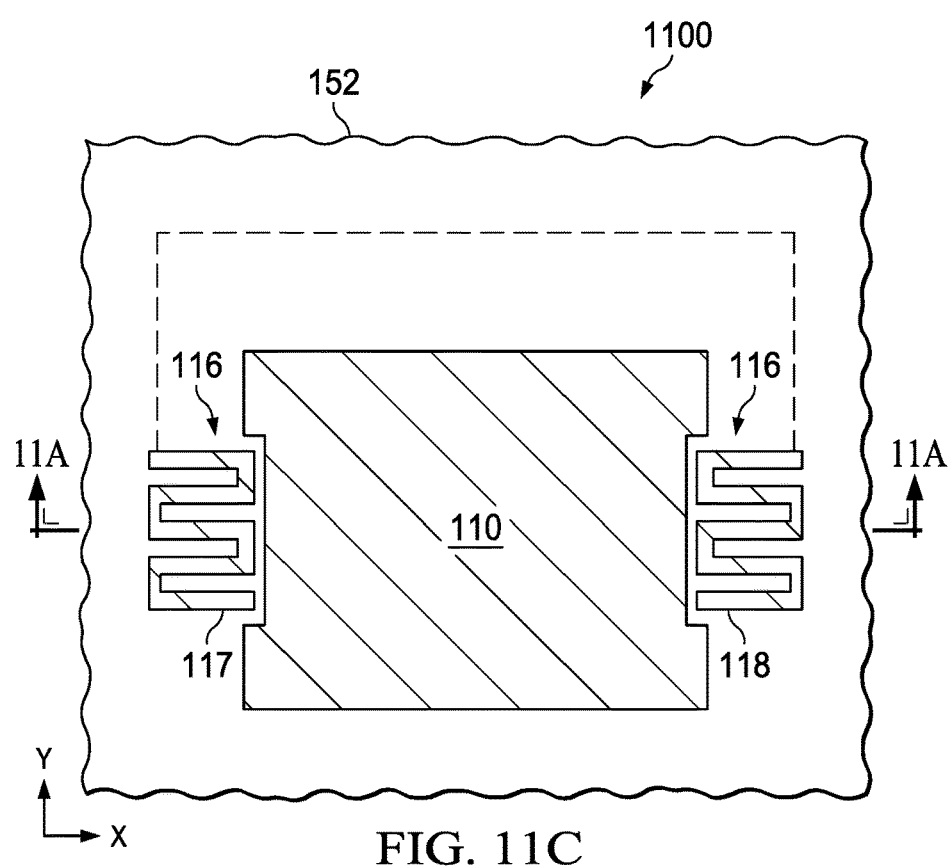
FIG. 11C is another partial sectional top plan view of the electronic device of FIG. 11 taken along line 11C-11C of FIG. 11A.

Referring now to FIGS. 11-11C, FIG. 11 shows another example integrated power limiting, surge protection electronic device 1100 with integrated shutdown field effect transistors, a controlled shunt FET, and a fuse circuit having a metal fuse 806 with a meandering or serpentine shape, a thermal conductor, and an upper active heater proximate the metal fuse. FIG. 11A shows a partial side view of the electronic device of 1100 taken along line 11A-11A of FIGS. 11B and 11C. FIG. 11B shows a partial top view of the electronic device 1100 taken along line 11B-11B of FIG. 11A. FIG. 11C shows another partial top view of the electronic device 1100 taken along line 11C-11C of FIG. 11A. The electronic device 1100 in this example includes similarly numbered components and structures as described above in connection with the electronic device 100 of FIGS. 1-1C. The electronic device 1100 includes a fuse circuit 1105 with the metal fuse 806, the thermal conductor 110, and the second resistor 116 as described above, but this example does not include the first level resistor or the first control transistor. As shown in FIGS. 11A-11C, the electronic device 1100 includes a multilevel metallization structure 1160 having the metal fuse 806 in the first level 150, and the thermal conductor 110 and the second resistor 116 in the second level 152.

Figure 12:
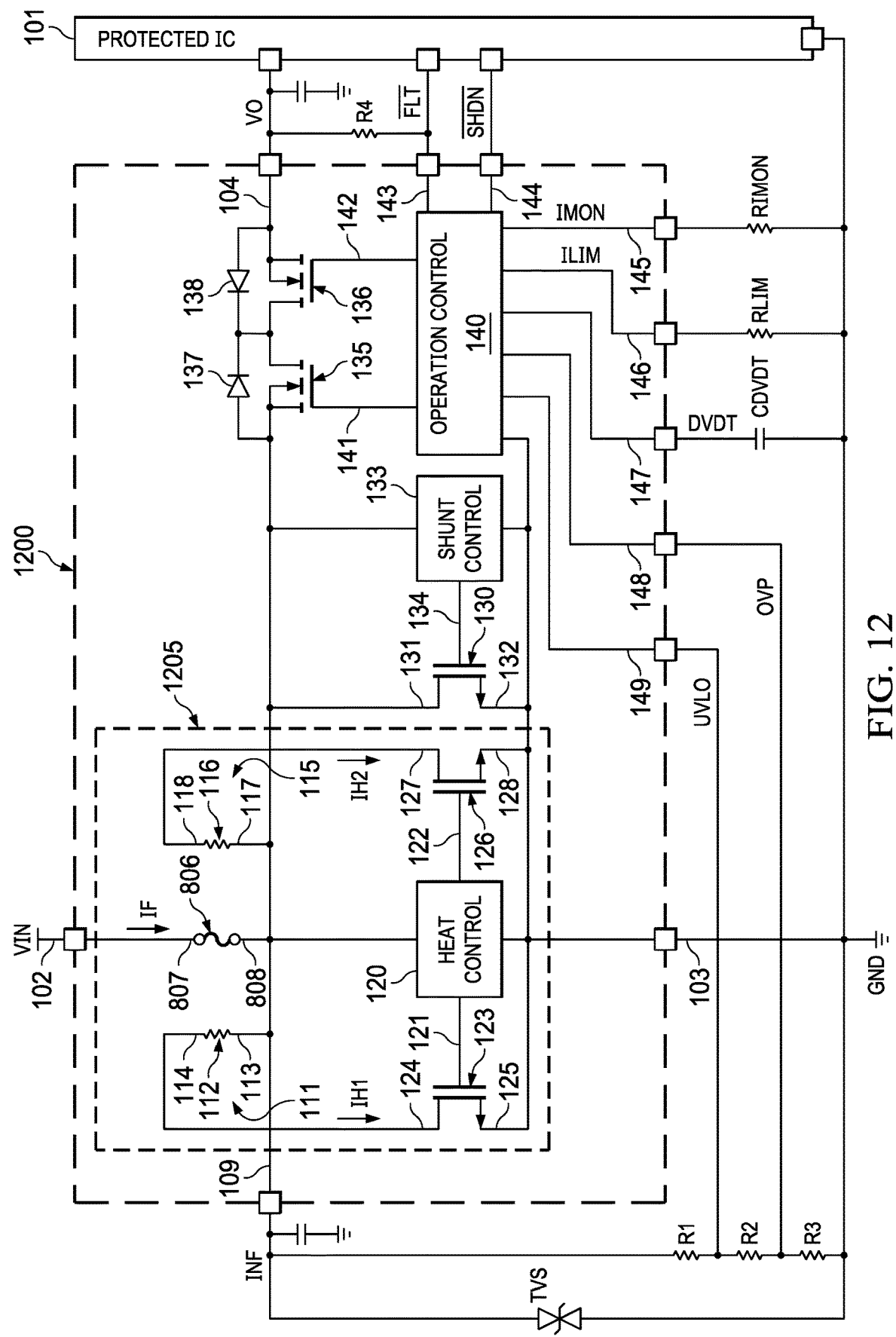
FIG. 12 is a schematic diagram of an integrated power limiting, surge protection electronic device with integrated shutdown field effect transistors, a controlled shunt FET, and a fuse circuit having a metal fuse with a meandering or serpentine shape, and side and upper active heaters proximate the metal fuse.
Figure 12A:
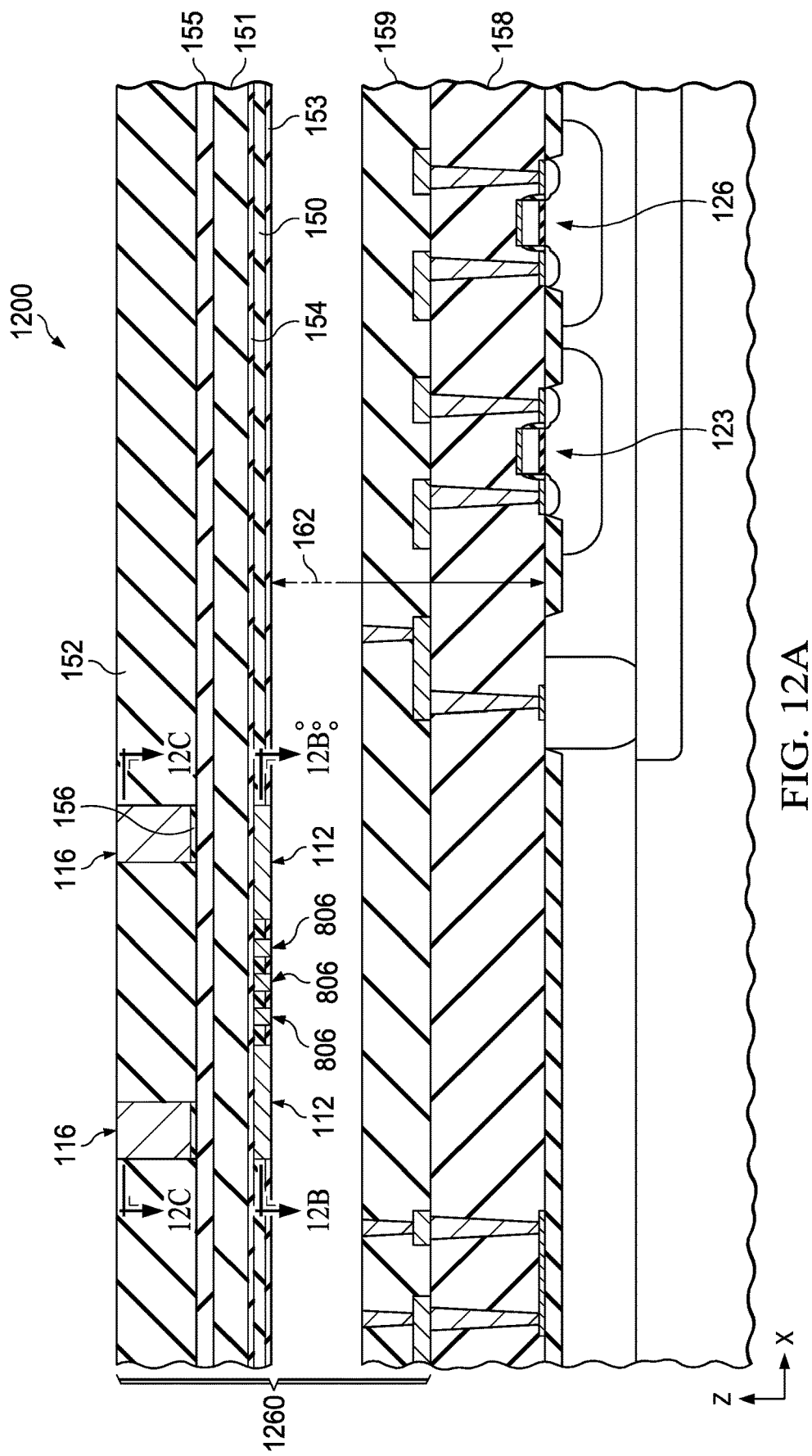
FIG. 12A is a partial sectional side elevation view of the electronic device of FIG. 12 taken along line 12A-12A of FIGS. 12B and 12C.
Figure 12B:
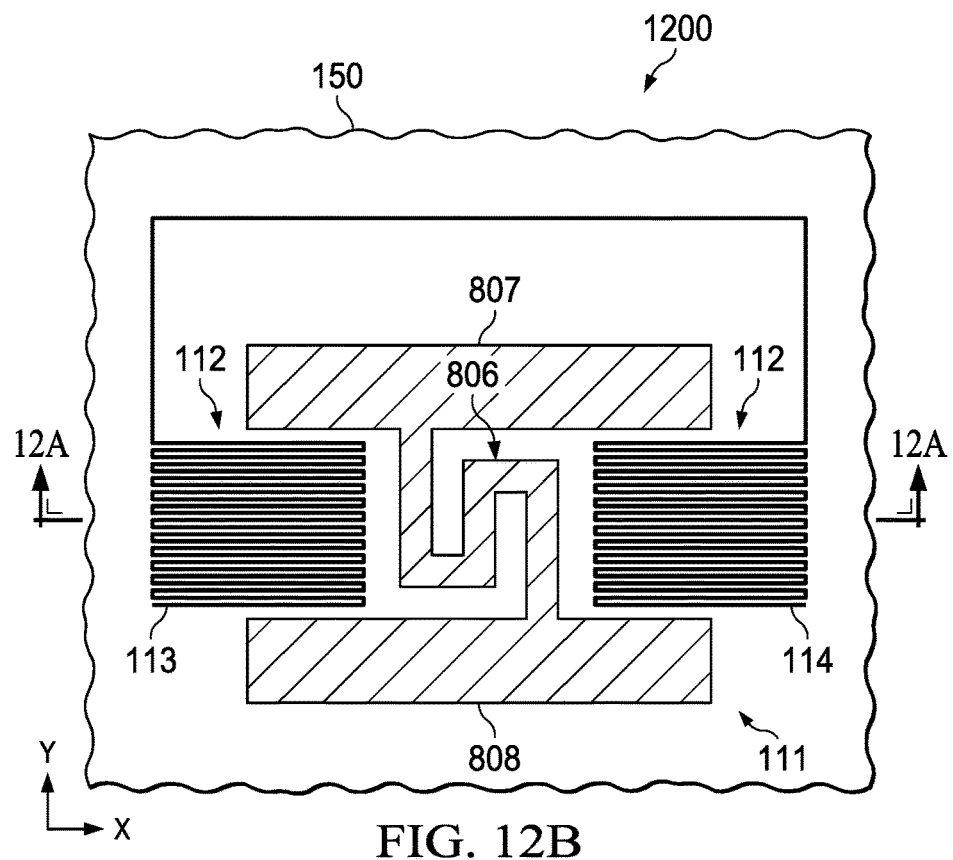
FIG. 12B is a partial sectional top plan view of the electronic device of FIG. 12 taken along line 12B-12B of FIG. 12A.
Figure 12C:
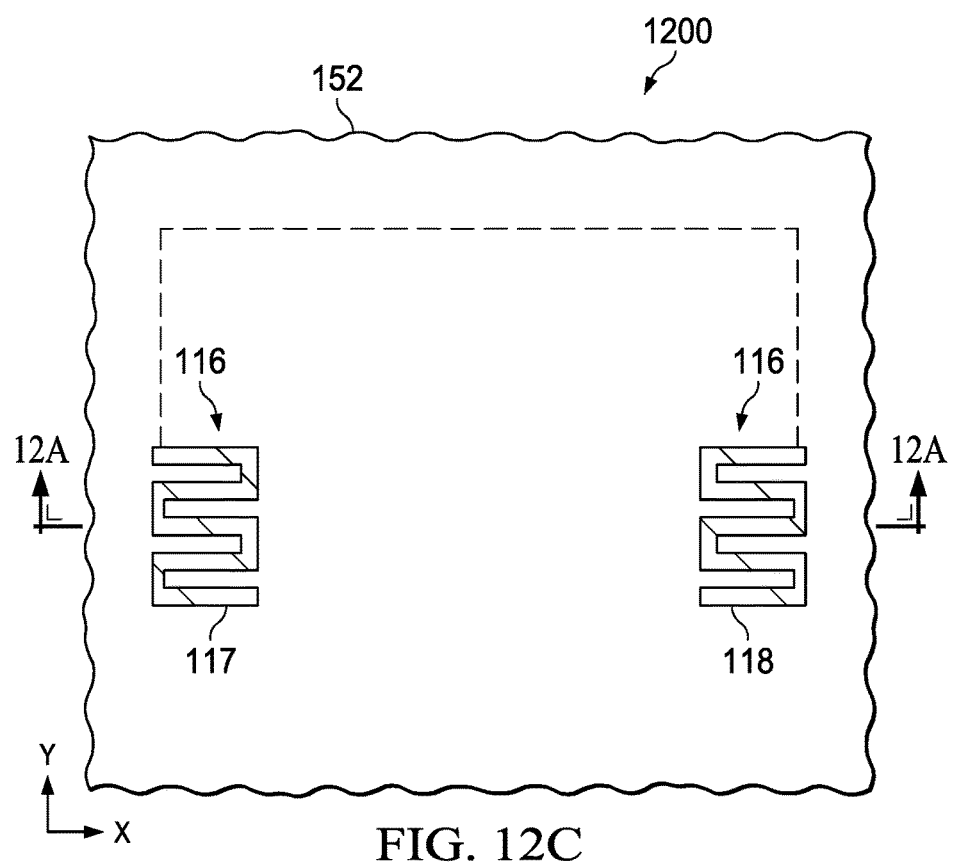
FIG. 12C is another partial sectional top plan view of the electronic device of FIG. 12 taken along line 12C-12C of FIG. 12A.

Referring now to FIGS. 12-12C, FIG. 12 shows another example integrated power limiting, surge protection electronic device 1200 with integrated shutdown field effect transistors, a controlled shunt FET, and a fuse circuit having a metal fuse with a meandering or serpentine shape, and side and upper active heaters proximate the metal fuse. FIG. 12A shows a partial side view of the electronic device 1200 taken along line 12A-12A of FIGS. 12B and 12C. FIG. 12B shows a partial top view of the electronic device 1200 taken along line 12B-12B of FIG. 12A. FIG. 12C shows another partial top view of the electronic device 1200 taken along line 12C-12C of FIG. 12A. The electronic device 1200 in this example includes similarly numbered components and structures as described above in connection with the electronic device 100 of FIGS. 1-1C. The electronic device 1200 includes a fuse circuit 1205 with the metal fuse 806, the first resistor 112, and the second resistor 116 as described above, but this example does not include the thermal conductor. As shown in FIGS. 12A-12C, the electronic device 1200 includes a multilevel metallization structure 1260 having the metal fuse 806 and the resistor 112 in the first level 150, and the second resistor 116 in the second level 152.

Figure 13:
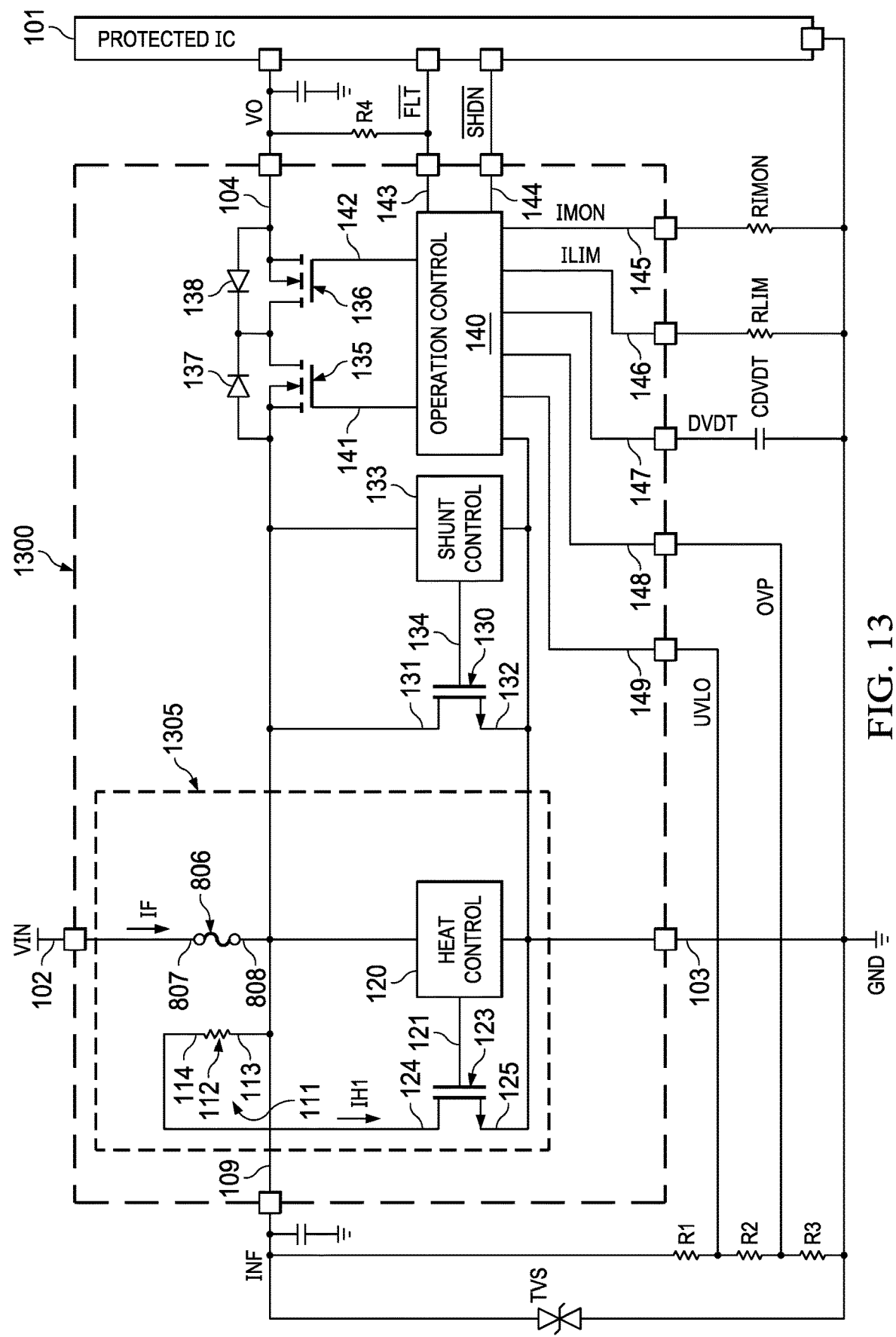
FIG. 13 is a schematic diagram of an integrated power limiting, surge protection electronic device with integrated shutdown field effect transistors, a controlled shunt FET, and a fuse circuit having a metal fuse with a meandering or serpentine shape, and a side active heater proximate the metal fuse.
Figure 13A:
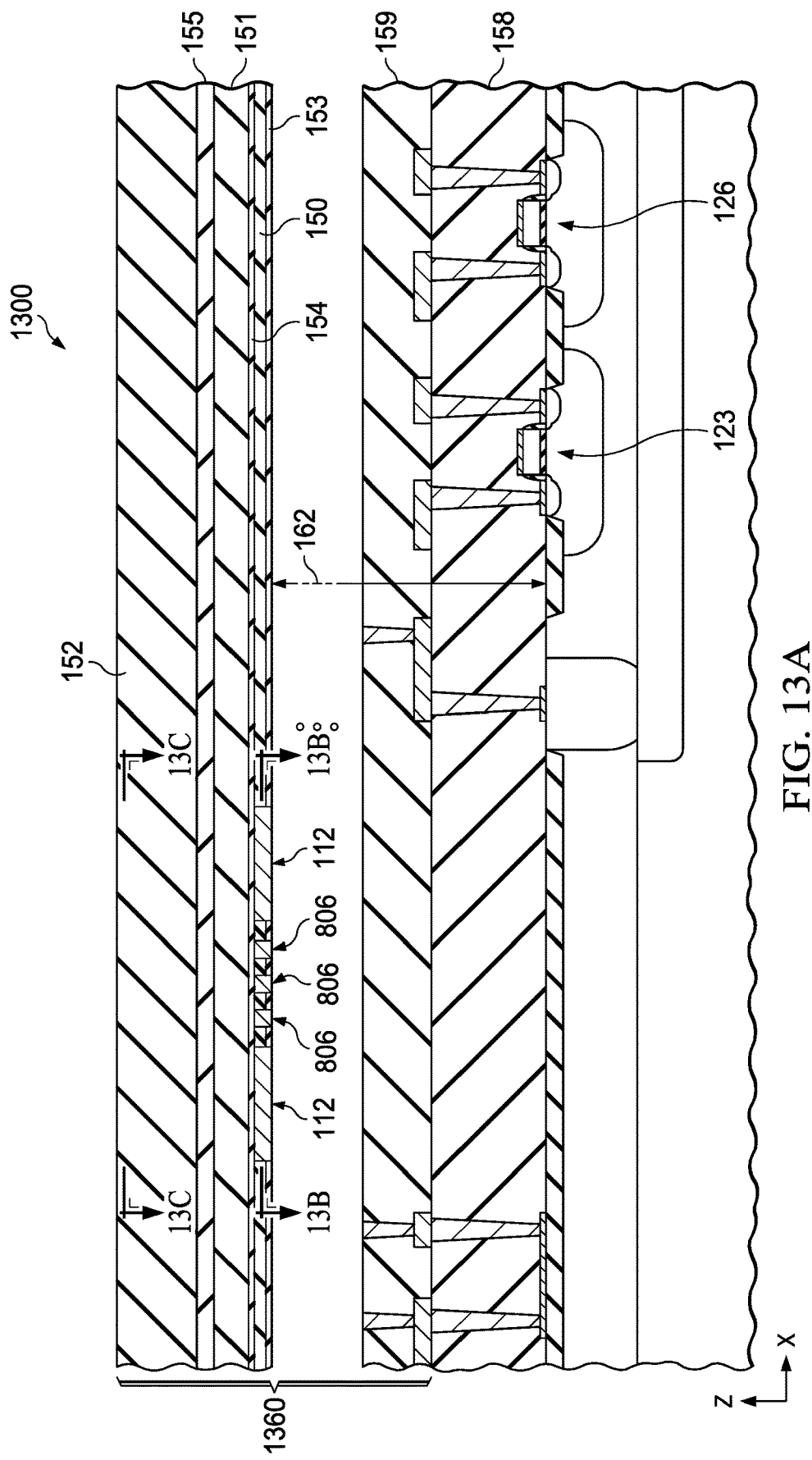
FIG. 13A is a partial sectional side elevation view of the electronic device of FIG. 13 taken along line 13A-13A of FIGS. 13B and 13C.
Figure 13B:
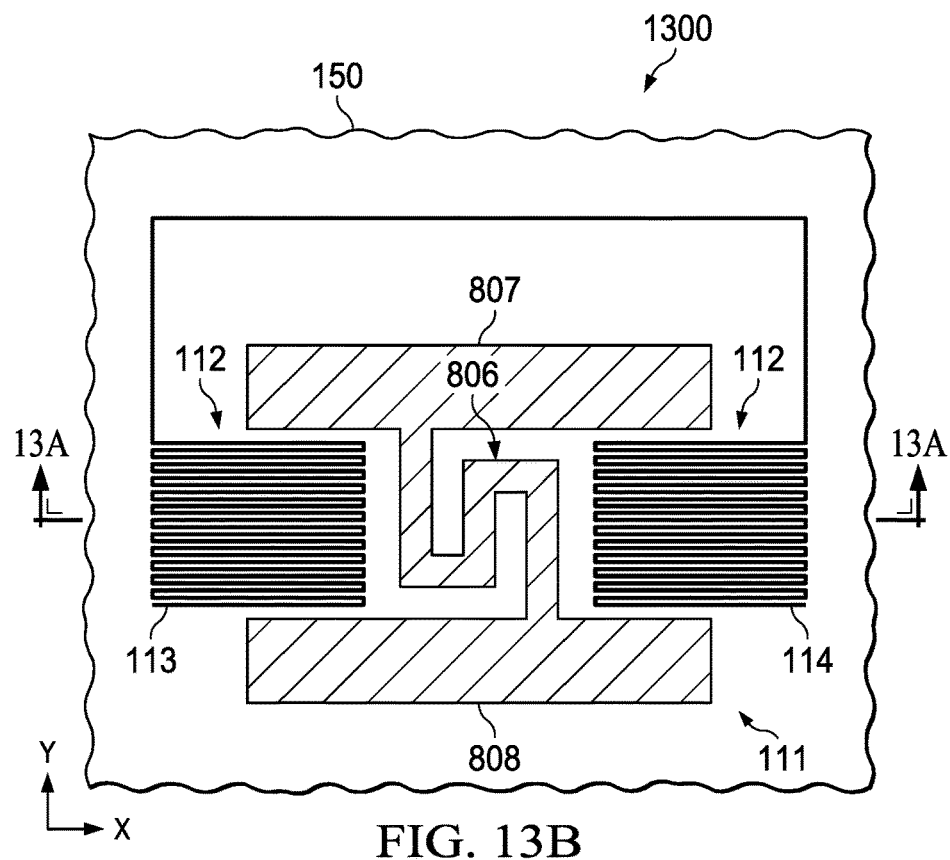
FIG. 13B is a partial sectional top plan view of the electronic device of FIG. 13 taken along line 13B-13B of FIG. 13A.
Figure 13C:
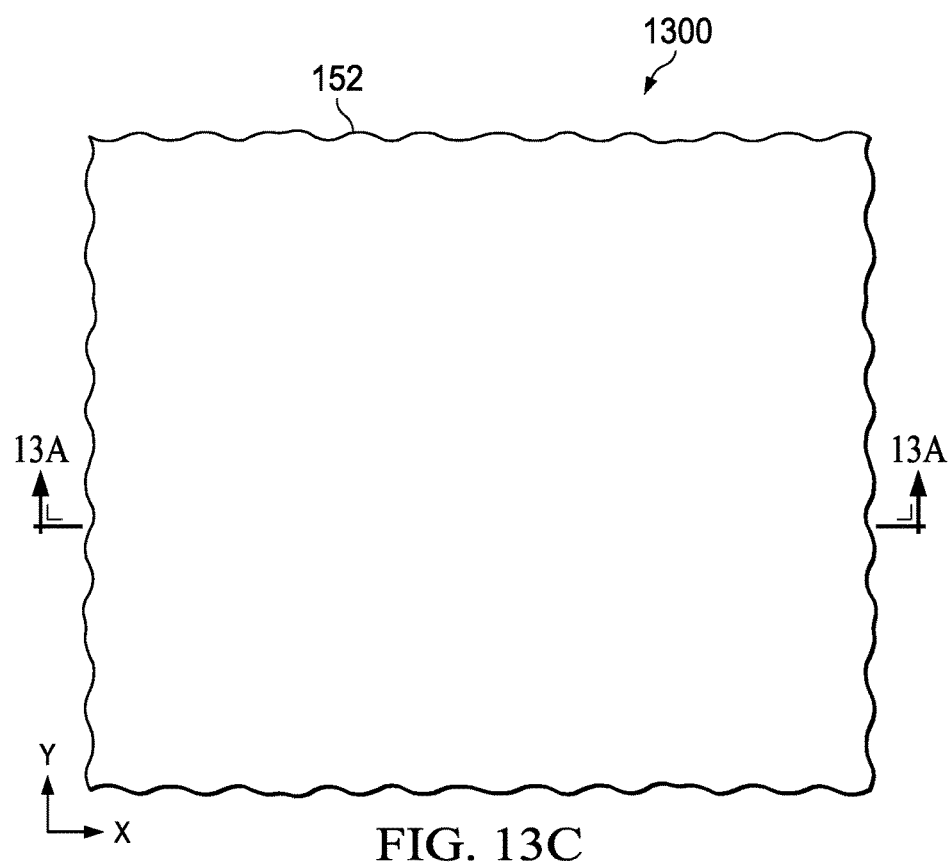
FIG. 13C is another partial sectional top plan view of the electronic device of FIG. 13 taken along line 13C-13C of FIG. 13A.

Referring now to FIGS. 13-13 C, FIG. 13 shows another example integrated power limiting, surge protection electronic device 1300 with integrated shutdown field effect transistors, a controlled shunt FET, and a fuse circuit having a metal fuse with a meandering or serpentine shape, and a side active heater proximate the metal fuse. FIG. 13A shows a partial side view of the electronic device 1300 taken along line 13A-13A of FIGS. 13B and 13C. FIG. 13B shows a partial top view of the electronic device 1300 taken along line 13B-13B of FIG. 13A. FIG. 13C shows another partial top view of the electronic device 1300 taken along line 13C-13C of FIG. 13A. The electronic device 1300 in this example includes similarly numbered components and structures as described above in connection with the electronic device 100 of FIGS. 1-1C. The electronic device 1300 includes a fuse circuit 1305 with the metal fuse 806 and the first resistor 112 as described above, but this example does not include the thermal conductor, the second resistor, or the second thermal control transistor. As shown in FIGS. 13A-13C, the electronic device 1300 includes a multilevel metallization structure 1360 having the metal fuse 806 and the resistor 112 in the first level 150.

Figure 14:
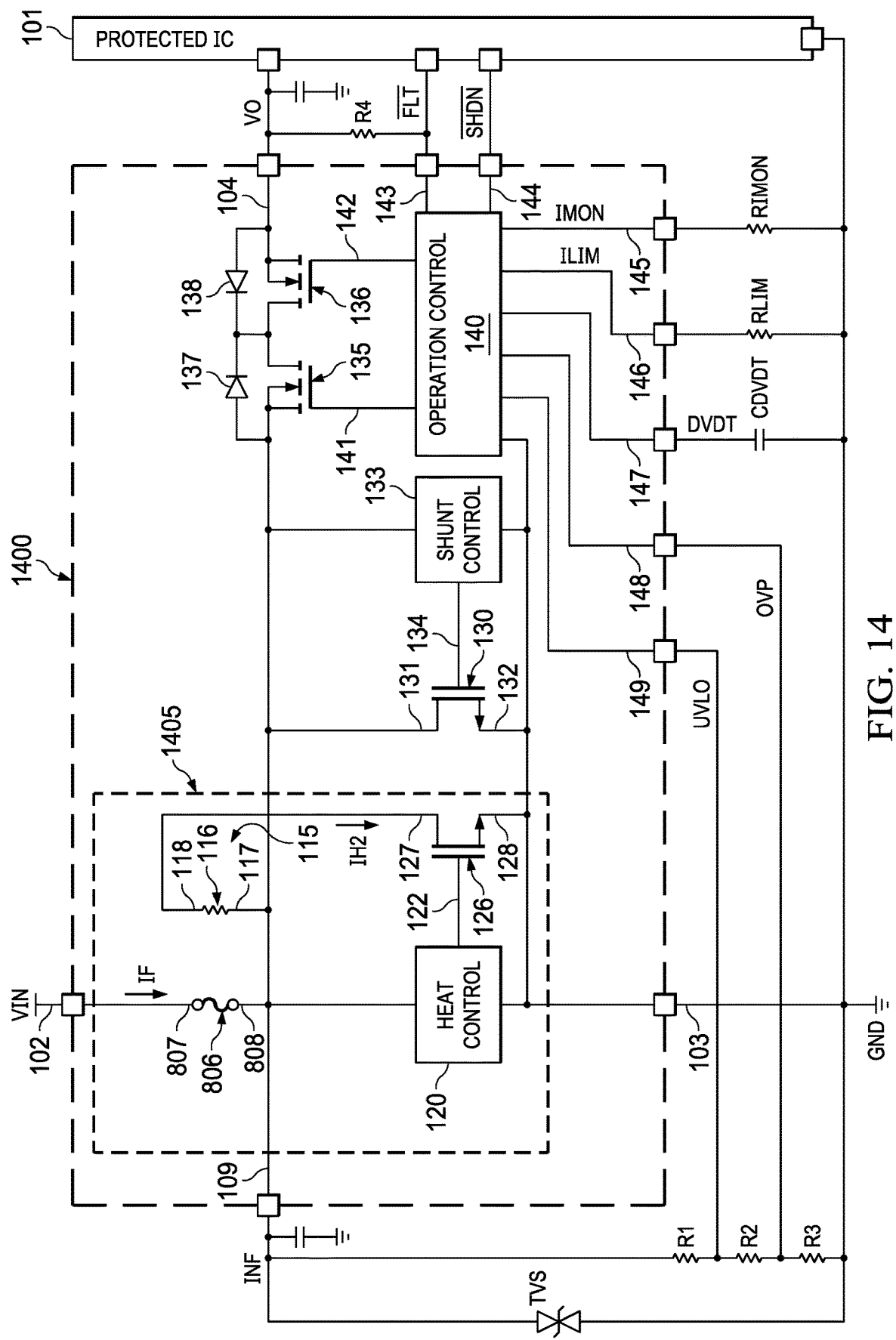
FIG. 14 is a schematic diagram of an integrated power limiting, surge protection electronic device with integrated shutdown field effect transistors, a controlled shunt FET, and a fuse circuit having a metal fuse with a meandering or serpentine shape, and an upper active heater proximate the metal fuse.
Figure 14A:
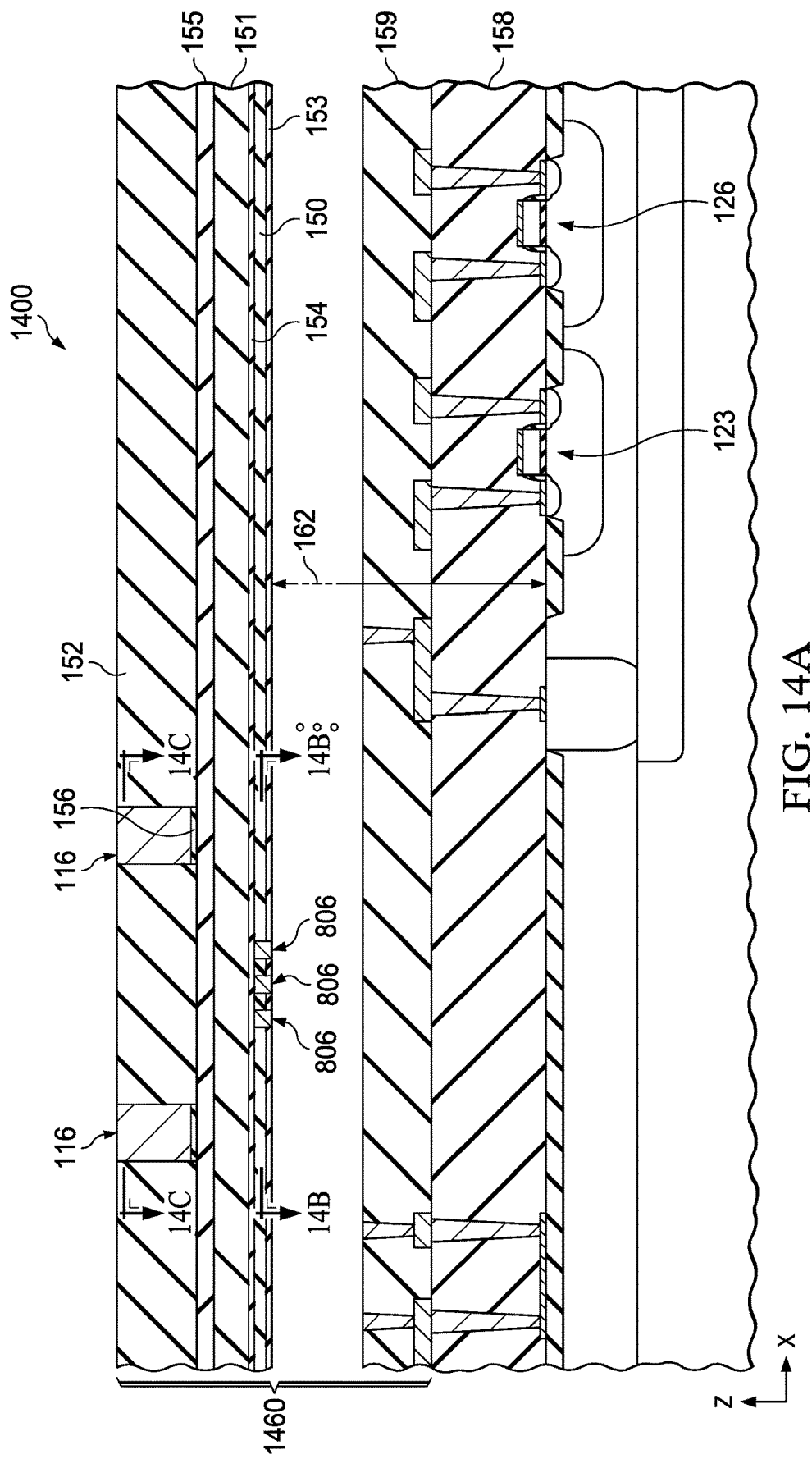
FIG. 14A is a partial sectional side elevation view of the electronic device of FIG. 14 taken along line 14A-14A of FIGS. 14B and 14C.
Figure 14B:
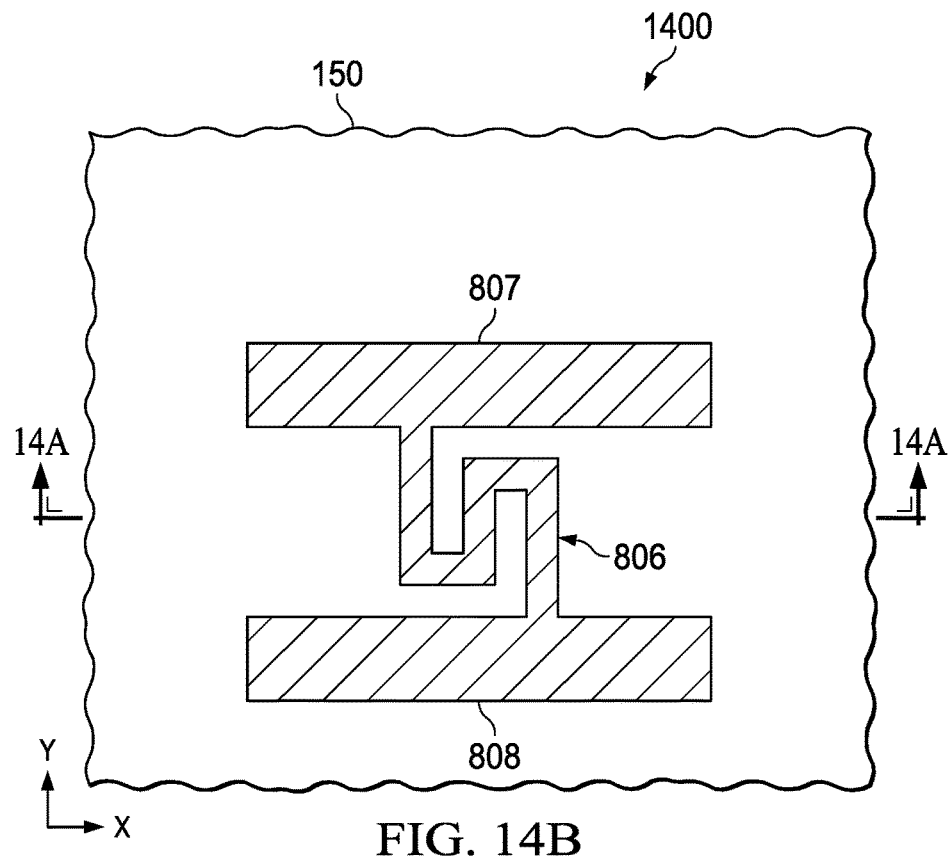
FIG. 14B is a partial sectional top plan view of the electronic device of FIG. 14 taken along line 14B-14B of FIG. 14A.
Figure 14C:
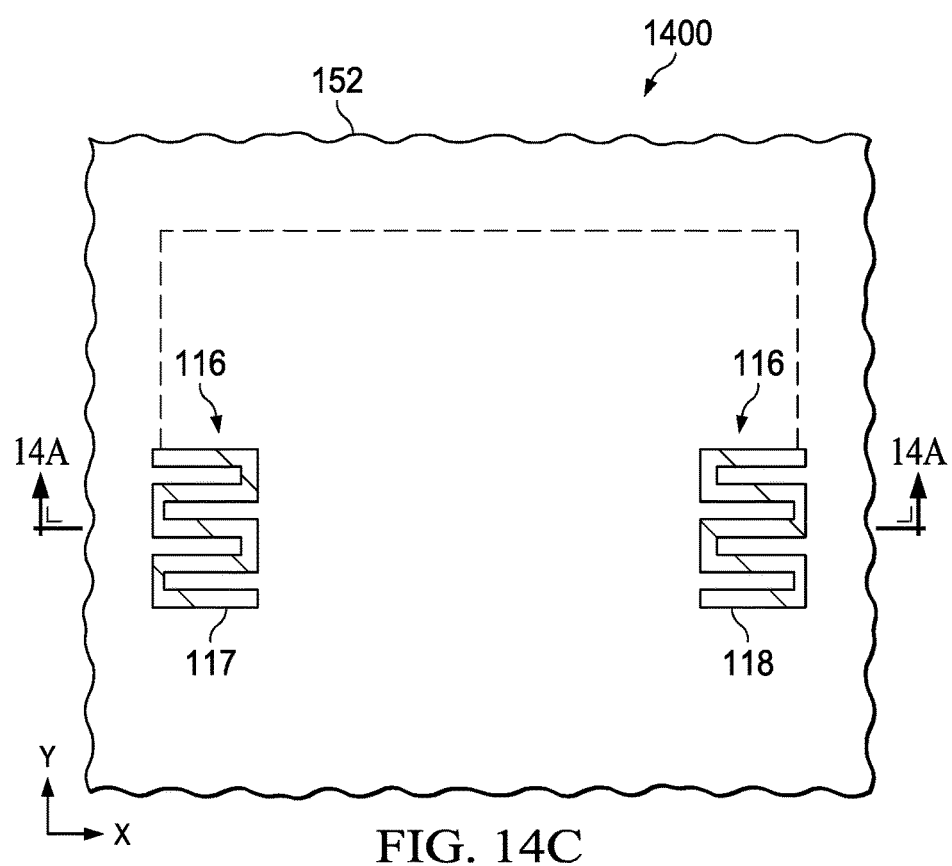
FIG. 14C is another partial sectional top plan view of the electronic device of FIG. 14 taken along line 14C-14C of FIG. 14A.

Referring now to FIGS. 14-14C, FIG. 14 shows another example integrated power limiting, surge protection electronic device 1400 with integrated shutdown field effect transistors, a controlled shunt FET, and a fuse circuit having a metal fuse 806 with a meandering or serpentine shape, and an upper active heater proximate the metal fuse. FIG. 14A shows a partial side view of the electronic device 1400 taken along line 14A-14A of FIGS. 14B and 14C. FIG. 14B shows a partial top view of the electronic device 1400 taken along line 14B-14B of FIG. 14A. FIG. 14C shows another partial top view of the electronic device 1400 taken along line 14C-14C of FIG. 14A. The electronic device 1400 in this example includes similarly numbered components and structures as described above in connection with the electronic device 100 of FIGS. 1-1C. The electronic device 1400 includes a fuse circuit 1405 with the metal fuse 806 and the second resistor 116 as described above, but this example does not include the thermal conductor or the first resistor. As shown in FIGS. 14A-14C, the electronic device 1400 includes a multilevel metallization structure 1460 having the metal fuse 806 in the first level 150, and the second resistor 116 in the second level 152.

Figure 15:
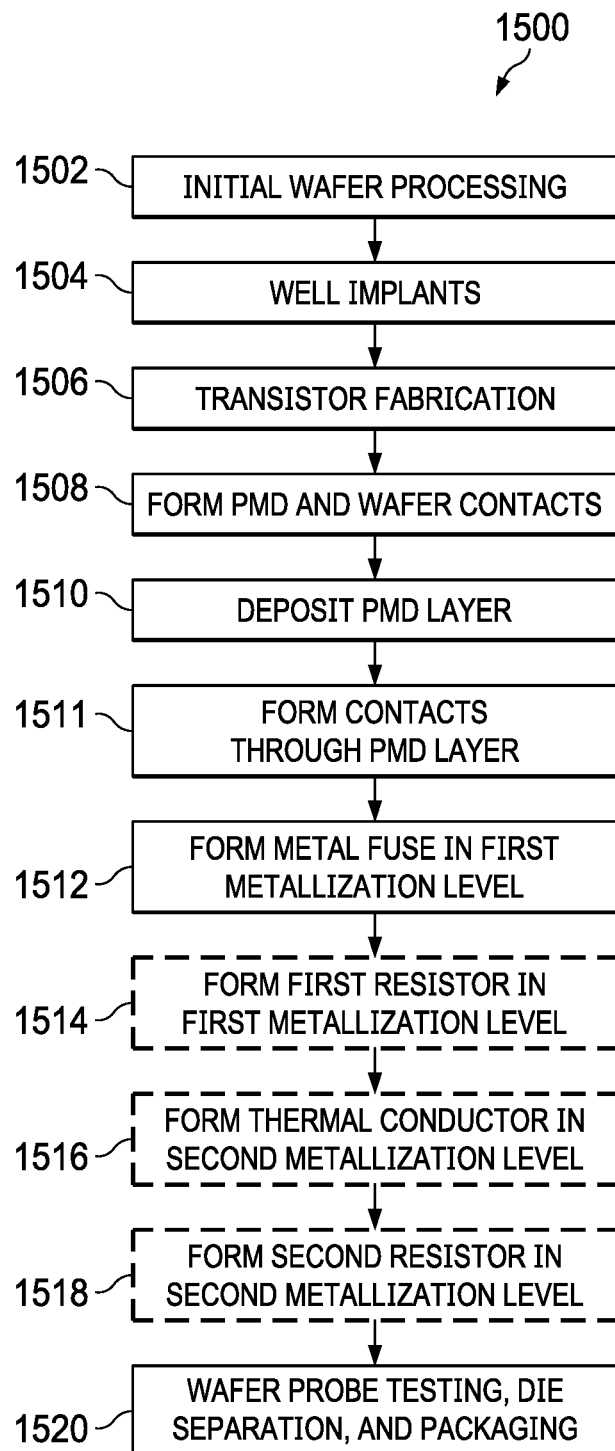
FIG. 15 is a flow diagram of a method for fabricating an electronic device.

FIG. 15 shows a method for fabricating an electronic device, which can be employed for fabricating the example electronic devices 100, 200, 300, 400, 500, 600, 700, 800, 900, 1000, 1100, 1200, 1300, and 1400 above. The method 1500 begins at 1502 with initial wafer processing at 1502, well implants at 1504, and transistor fabrication at 1506. At 1508 and 1510, the method includes forming the PMD layer (e.g., PMD layer 158 above) and wafer contacts, respectively. At 1511, the method 1500 includes forming a metal fuse and a first metallization level (e.g., the metal fuse 106 and 108 in the first metallization level 150 above). In one implementation, the method 1500 also includes forming a first resistor (e.g., resistor 112 above) in the first metallization level 150 at 1514. In another example, the first resistor formation at 1514 is omitted. In these or another example, the method 1500 also includes forming a thermal conductor and a second metallization level at 1516 (e.g., thermal conductor 110 above). In another example, the thermal conductor formation at 1516 is omitted. In these or another example, the method 1500 also includes forming a second resistor and the second metallization level at 1518 (e.g., second resistor 116 above). In another example, the second resistor formation at 1518 is omitted. The method 1500 in this example also includes wafer probe testing, die separation, and packaging at 1520.

Figure 16:
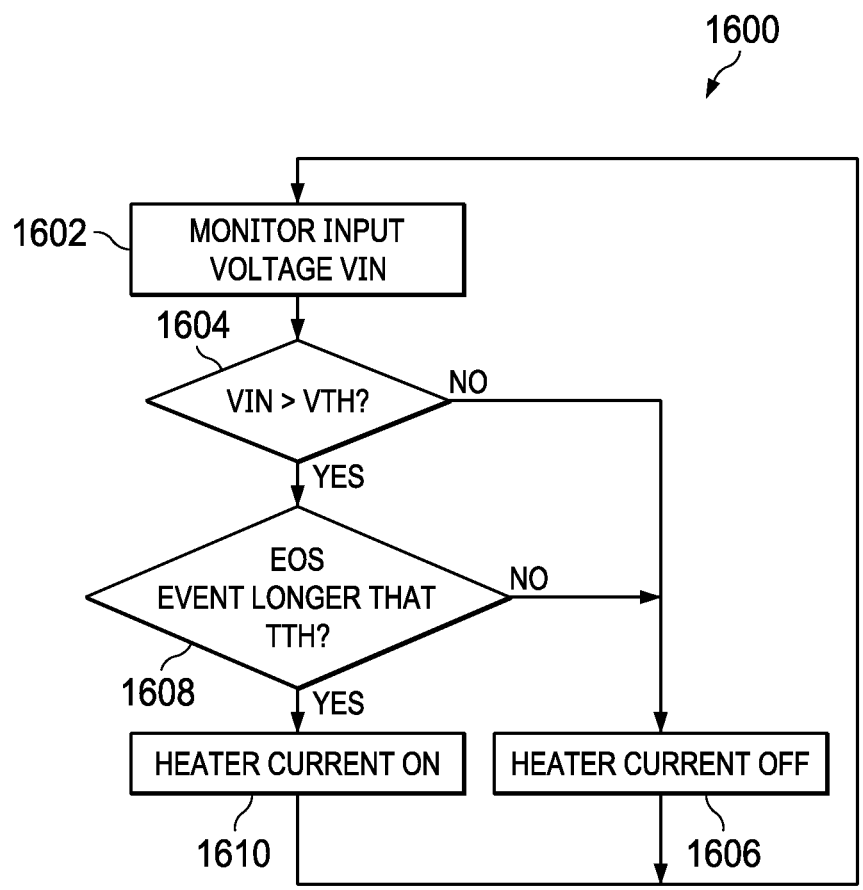
FIG. 16 is a flow diagram of a method of operating an efuse electronic device.

FIG. 16 shows a method 1600 of operating an efuse electronic device, which can be performed in operation of the example electronic devices 100, 200, 300, 400, 500, 600, 700, 800, 900, 1000, 1100, 1200, 1300, and 1400 above. The method 1600 includes monitoring an input voltage (e.g., VIN above) at 1602. In one example, one or both of the heat controller 120 and the operation controller 140 monitor the input voltage, directly, or the voltage signal INF after the fuse 106, 806 above. At 1604, one or both of the controllers 120, 140 determine whether the input voltage is above a threshold VTH. If not (NO at 1604), the controller or controllers 120, 140 turn off the heater current or currents IH1, IH2 at 1606, and the method 1600 returns for further input voltage monitoring at 1602 as described above. If the input voltage exceeds a threshold (YES at 1604), one or both of the controllers 120, 140 determine whether the duration of the electrical overstress event exceeds a time threshold TTH. If not (NO at 1608), the controller or controllers 120, 140 turn off the heater current or currents IH1, IH2 at 1606, and the method 1600 returns for further input voltage monitoring at 1602 as described above. Otherwise (YES at 1608), the controller or controllers 120, 140 turn on the heater current or currents IH1, IH2 at 1610, and the method 1600 returns for further input voltage monitoring at 1602 as described above.

Figure 17:
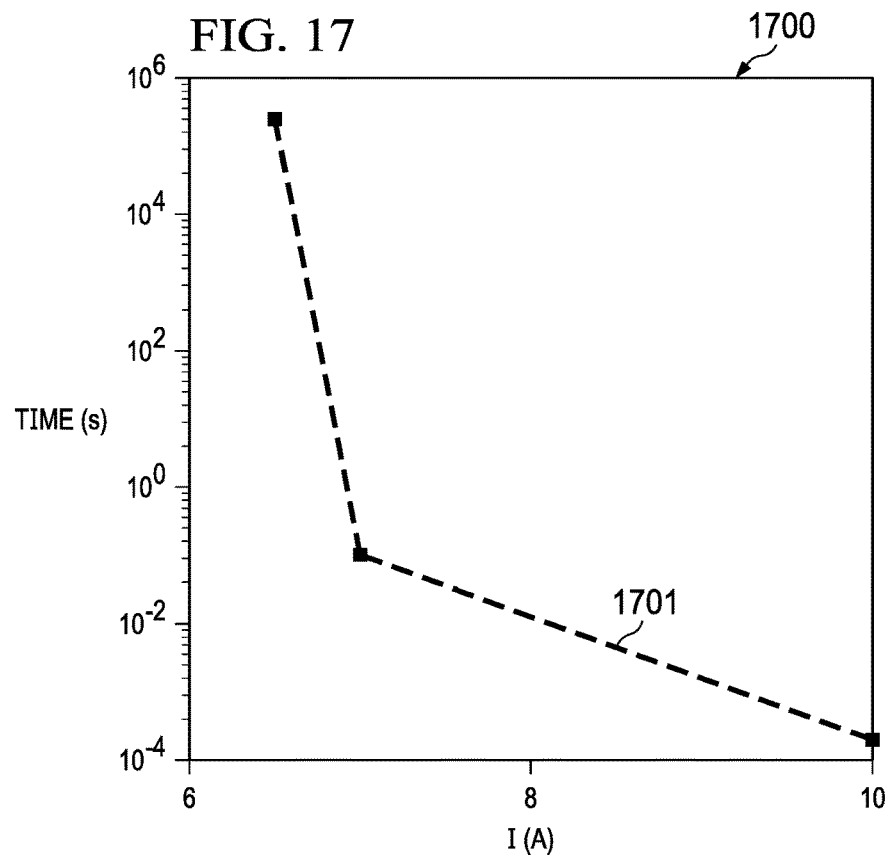
FIG. 17 is a graph of time versus current showing a performance acceptance curve in one example.
Figure 18:
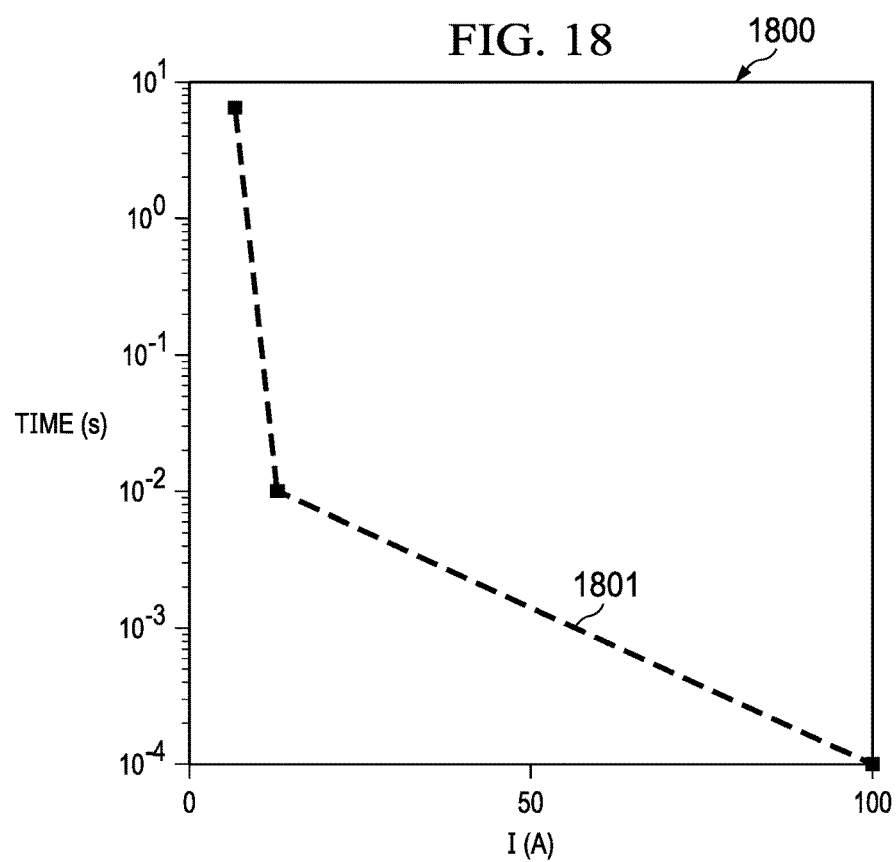
FIG. 18 is a graph time versus current showing another performance acceptance curve.

Referring also to FIGS. 17 and 18, FIG. 17 shows a graph 1700 with an example electronic fuse performance acceptance curve 1701. FIG. 18 shows a graph 1800 that illustrates another time versus current performance acceptance curve 1801. The thermal coupling of the metal fuse 106, 806 with one or more of the thermal conductor 110, the first resistor 112 and/or the second resistor 116, the provision of a serpentine shaped metal fuse 806, and/or the adaptive or programmed control of the heater current or currents IH1, IH2 facilitate improved electronic fuse performance compared with conventional electronic fuse technology. One, some, or all of these features and techniques facilitate providing electronic fuse performance improvements in either or both of IDC, BO and $I^2t$, compared with the performance shown in the acceptance curve 1701. Increased thermal capacitance (e.g., via thermal coupling of the metal fuse 106, 806 to the thermal conductor 110 and/or to the thermally conductive structures of one or both of the resistors 112, 116) tends to reduce the DC blowout current IDC, BO for protection against DC electrical overstress events.

In combination, the additive heating provided by one or both of the resistors 112 and 116 when conducting respective heater current IH1 and/or IH2 increases the $I^2t$. In the example graph 1800 of FIG. 18, the IDC, BO is greater than 6.5 A, and the $I^2t$ performances greater than 0.03 $A^2s$. The graph 1900 in FIG. 19 shows performance improvement related to the combined use of the thermal conductor 110 that is thermally coupled to the metal fuse 106, in addition to side and upper heating provided by the resistors 112 and 116 while conducting the respective heater currents IH1 and IH2. This provides IDC, BO performance that is still below 15 A, while significantly increasing the $I^2t$ performances to or above 1.1 $A^2s$ for a similarly sized metal fuse 106 without the thermal conductor 110 or the resistors 112, 116. This performance improvement facilitates the use of integrated electronic fuse circuitry within a packaged electronic device (e.g., the example electronic devices 100, 200, 300, 400, 500, 600, 700, 800, 900, 1000, 1100, 1200, 1300, 1400, and 1500 above) to meet potentially strict performance specifications for sustaining transients and protecting the protected IC 101, and without requiring the use of an external fuse in series. These improvements can facilitate surge and DC-EOS performance in a small footprint design, particularly for dense circuit board designs. The described examples facilitate decoupling of desired low IDC, BO requirements while also providing low $I^2t$ performance to survive surges.

Modifications are possible in the described examples, and other implementations are possible, within the scope of the claims.

What is claimed is:

1. A method, comprising:
   forming a first metallization layer on a semiconductor die, the first metallization layer including a metal fuse; and
   forming a second metallization layer on the first metallization layer, in which the second metallization layer includes a thermal conductor spaced from the metal fuse, and the first metallization layer is between the second metallization layer and the semiconductor die.

2. The method of claim 1, wherein the thermal conductor overlaps at least partially with the metal fuse.

3. The method of claim 1, further comprising forming a pre-metal dielectric (PMD) layer on the semiconductor die, wherein forming the first metallization layer on the semiconductor die includes forming the first metallization layer on the PMD layer.

4. The method of claim 1, further comprising forming a transistor on the semiconductor die.

5. The method of claim 4, further comprising forming a resistor in at least one of the first or second metallization layers, and connecting the resistor to a current terminal of the transistor.

6. The method of claim 5, wherein the metal fuse has an indent, and forming the resistor includes forming at least a part of the resistor in the indent.

7. The method of claim 5, wherein the resistor includes a serpentine portion.

8. The method of claim 5, wherein the resistor is a first resistor formed in the first metallization layer, the transistor is a first transistor, and the current terminal is a first current terminal;

wherein the method further comprises:
forming a second transistor on the semiconductor die;
forming a second resistor in the second metallization layer; and
connecting the second resistor to a second current terminal of the second transistor.

9. The method of claim 8, wherein the thermal conductor has an indent, and forming the second resistor includes forming at least a part of the second resistor in the indent.

10. The method of claim 8, wherein the second resistor includes a serpentine portion.

11. The method of claim 1, wherein the metal fuse includes a serpentine portion.

12. The method of claim 1, further comprising:
forming conductive contacts through the first and second metallization layers; and
connecting the conductive contacts to the metal fuse.

13. The method of claim 12, wherein the conductive contacts include Titanium Tungsten.

14. The method of claim 12, further comprising performing wafer probe testing using the conductive contacts.

15. The method of claim 1, further comprising forming a silicon nitride layer on the first metallization layer, wherein forming the second metallization layer includes forming the second metallization layer on the silicon nitride layer.

* * * * *